United States Patent
Burdick et al.

(10) Patent No.: US 6,424,820 B1
(45) Date of Patent: Jul. 23, 2002

(54) INDUCTIVELY COUPLED WIRELESS SYSTEM AND METHOD

(75) Inventors: Wayne A. Burdick, Belmont; James H. Boyden, Los Altos Hills; William C. Lynch, Palo Alto, all of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/285,511

(22) Filed: Apr. 2, 1999

(51) Int. Cl.[7] .................................................. H04B 5/00
(52) U.S. Cl. ....................... 455/41; 455/568; 455/151.2; 455/132
(58) Field of Search .......................... 455/41, 568, 569, 455/575, 66, 95, 129, 149, 151.2, 103, 132

(56) References Cited

U.S. PATENT DOCUMENTS

| | | | | |
|---|---|---|---|---|
| 4,019,141 A | * | 4/1977 | Numan et al. ............... 325/357 |
| 4,229,829 A | * | 10/1980 | Grunwald ..................... 455/41 |
| 5,264,795 A | * | 11/1993 | Rider .......................... 324/326 |
| 5,404,577 A | * | 4/1995 | Zuckerman et al. .......... 455/66 |
| 5,437,057 A | * | 7/1995 | Richley et al. ............... 455/41 |
| 5,568,516 A | * | 10/1996 | Strohallen et al. ............ 455/41 |
| 5,694,467 A | * | 12/1997 | Young, III .................. 379/403 |
| 5,771,438 A | * | 6/1998 | Palermo et al. .............. 455/41 |
| 5,771,441 A | * | 6/1998 | Altstatt ........................ 455/66 |
| 5,867,223 A | * | 2/1999 | Schindler et al. ............ 455/6.3 |
| 5,978,689 A | * | 11/1999 | Tuoriniemi et al. ......... 455/569 |
| 6,006,115 A | * | 12/1999 | Wingate ..................... 455/568 |

* cited by examiner

Primary Examiner—William Trost
Assistant Examiner—Simon Nguyen
(74) Attorney, Agent, or Firm—Van Pelt & Yi LLP

(57) ABSTRACT

A short range inductively coupled wireless communication system employs analog frequency modulation of a high frequency carrier and magnetic coupling between a transmitting antenna and a receiving antenna. A transmitter coupled to the transmitting antenna modulates multiple high-fidelity analog audio signals and digital control messages onto separate high frequency ("HF") carriers. The electric field portion of the transmitted electromagnetic field is substantially eliminated during transmission, while the magnetic field portion is substantially unaffected. The receiving antenna is coupled to a demodulator which reproduces the audio frequency signals and decodes control messages sent by the transmitter.

6 Claims, 20 Drawing Sheets

INDUCTIVELY COUPLED WIRELESS SYSTEM AND METHOD

BACKGROUND OF THE INVENTION

1. Field of the Invention

The present invention relates generally to short-range wireless communication systems. More particularly, the present invention relates to an inductively coupled high frequency wireless link between transceiver units for unidirectional or bidirectional transmission of high-fidelity signals.

2. Description of Related Art

Personal entertainment and communication devices continually integrate more functions in a single package, and exploit new user interface concepts. However, less progress has been made in eliminating the ubiquitous headset cord, which is widely regarded as the most cumbersome element of many body-mounted devices. The headset cord reduces freedom of movement, compromises usability and aesthetics, and is usually the first thing to break.

Prior art systems have employed a variety of wireless communication techniques for eliminating the need for a headset cord. Most wireless communication systems generally fall into three categories, depending on the transmission medium employed: ultrasonic, infrared, and radio frequency. Each of these categories exhibits unique performance characteristics, as well as attendant advantages and limitations, well known to those skilled in the art. Ultrasonic communication systems are typically limited to short range applications, and can cover relatively large groups of people. However, they are highly sensitive to interference. Because the signals are in the audio range, discrimination among users is difficult to achieve.

Infrared ("IR") communication systems are generally limited to short range, line-of-sight applications and are generally immune to non-optical forms of interference. Some existing wireless IR systems employ analog frequency modulation ("FM") techniques. However, IR analog FM systems are impractical for on-body use because their transmit power requirements are too high and thus, cannot be supported by a small capacity battery. More importantly, IR systems inherently require an unobstructed line-of-sight between the transmitter and receiver. Such an unobstructed line-of-sight cannot be guaranteed with on-body applications. The transmitted IR signals might be obscured by the user's body (e.g., arms, shoulder) or attire as a result of normal body movement.

In contrast, radio frequency ("RF") communication systems can transmit over relatively long distances and can employ many different forms of modulation including amplitude modulation ("AM") and frequency modulation ("FM") for transmitting signals via an RF carrier. However, the operating frequency band for transmission must be carefully selected to achieve optimal performance. For example, the use of the commercial FM band in short range wireless communication systems has several disadvantages. Because of the existing high concentration of high-power commercial FM signals in the 88–108 MHz frequency band, users may commonly be located within range of powerful broadcast stations that could overwhelm the front end (RF input circuits) of the user's receiver, causing undesirable de-sensing and spurious modulation. Also, it may be impossible to prevent stray electric field ("E-field") radiation beyond the user's receiver if the commercial FM band is used. For example, if the intended user receives the desired signal from the body-worn transmitter at a signal-to-noise ratio ("SNR") of 60 dB, a lower quality signal (30 dB SNR) might be audible at tens of meters distant, and would interfere with commercial FM receivers in its vicinity.

Accordingly, a need exists in this industry for a short-range wireless communication system that minimizes or eliminates the deficiencies of the prior art. The many embodiments of the present invention, as described below, satisfy such a need.

SUMMARY OF THE INVENTION

An object of the present invention is to provide a wireless communication system that provides small radio coverage "spheres" or micro-cells, especially for on-body use.

A further object of the present invention is to optimize the transmission coverage area that also minimizes interference. Specifically, wireless systems according to the present invention should not interfere with other wireless systems in their vicinity. Other related objects of the present invention are to minimize the loss of signal quality in the presence of similar units operating nearby, to facilitate compliance with FCC emission regulations by sharply reducing the field strength of the transmitted electric field, and to eliminate the need for head-mounted controls by implementing a low-speed data network from control unit to earpiece.

Another object of the present invention is to minimize the physical dimensions of the body-worn control unit and head-mounted earpiece to enhance user comfort and convenience.

Still another object of the present invention is to minimize the power consumption of the body-worn control unit and head-mounted earpiece to maximize battery life.

These and other objects are provided by a short range, high-fidelity, stereophonic wireless system with an inductively coupled wireless link suitable for on-body use. The transmitted audio signals exhibit FM broadcast-band quality audio or better. Another embodiment employs analog frequency modulation ("FM") of an HF carrier (3 to 30 MHz) and inductive coupling between a transmitting antenna and a receiving antenna. The body-worn master control unit may be mounted on the belt of the user or other convenient location and the head-mounted slave unit is designed as an earpiece.

In one embodiment, the wireless communication is unidirectional on one channel. The control unit includes one transmitter and each slave unit includes one receiver. Communication between the control unit and the slave unit is accomplished via inductively coupled coils.

In another embodiment, the wireless communication is unidirectional on multiple channels. The control unit includes a plurality of transmitters, preferably two, where each transmitter operates at a distinct carrier frequency associated with a particular slave unit. In this embodiment, the user employs two earpieces (one for each ear) where each earpiece includes a receiver tuned to one of the carrier frequencies of the control unit's transmitters. Thus, stereophonic transmission is made possible in this two-transmitter, two-receiver configuration. Since two separate carrier frequencies are used for left and right channel audio, fidelity is improved over traditional FM-MPX stereo transmissions used in the FM broadcast band. Communication between the control unit and the slave unit is accomplished via inductively coupled coils.

In a further embodiment, the wireless communication is bidirectional on multiple channels. The control unit includes multiple transmitters and multiple receivers for coupling with one or more transmitters and one or more receivers in each slave unit. Communication between the control unit and the slave unit is accomplished via inductively coupled coils.

In another embodiment, the control unit is coupled to a conventional audio device or electronic device such as a CD player, tape player, commercial FM receiver, cellular telephone, cordless telephone, or a computer system and transmits two channels of high-fidelity audio to the head-mounted earpiece, along with an additional slow-speed digital control channel. The head-mounted earpiece contains a stereophonic receiver that demodulates the signals transmitted from the control unit and outputs high-fidelity audio signals to conventional headphones or other audio transducers. The head-mounted earpiece also decodes the slow-speed digital control channel, which includes commands for receiver configuration, user interface, power control, and channel synchronization. A single voice-band audio signal is modulated onto an HF carrier at the earpiece, and the modulated signal is transmitted from the earpiece to the control unit over the same inductively-coupled communication channel used for stereophonic belt-to-ear communication, as described above. A receiver at the control unit demodulates this additional channel and outputs the resulting audio signal to a transducer or other device. For example, the audio signal may be sent to a computer, cellular phone, or intercom system for further processing or to communicate with other users.

In another embodiment of the present invention, the wireless system uses Faraday shielding techniques, in which the electric field portion of the transmitted electromagnetic field is substantially eliminated during transmission, while the magnetic field portion is substantially unaffected.

A variety of alternate embodiments and optional features of the present invention are described, including (1) bidirectional ("two-way") belt-to-ear connections to facilitate telephony and voice commands, (2) multiple carrier channels with automatic transmitter/receiver synchronization, (3) automatic power control based on audio input and carrier detection, (4) average transmit power reduction using voice-operated relays ("VOX"), (5) diversity antenna reception schemes, and (6) advanced wireless control device applications. All system variations of the present invention are adaptable for on-body use, although in some cases additional devices in the user's environment may also be accessed or controlled (for example, wireless computer workstation audio).

Accordingly, it will be appreciated by those skilled in the art that the present invention provides a short range, inductively coupled, high-fidelity wireless communication system which overcomes many of the problems associated with prior art systems. For example, at VLF, larger coils are needed; also, it is difficult to obtain more than one channel at VLF. The above objects and description of the present invention may be better appreciated with the aid of the following text and accompanying drawings.

BRIEF DESCRIPTION OF THE DRAWINGS

FIG. 11(A) illustrates one embodiment in which the antenna coil is wound around a straight ferrite rod. FIG. 11(B) illustrates another embodiment in which the antenna coil is wound around a circular rod.

FIG. 19(A) shows two antennas oriented non-orthogonally; that is, the antennas are not oriented at 90 degrees. FIG. 19(B) shows two antennas oriented orthogonally to each other; that is, the antennas are oriented at 90 degrees.

DETAILED DESCRIPTION OF THE INVENTION

Figure 1:
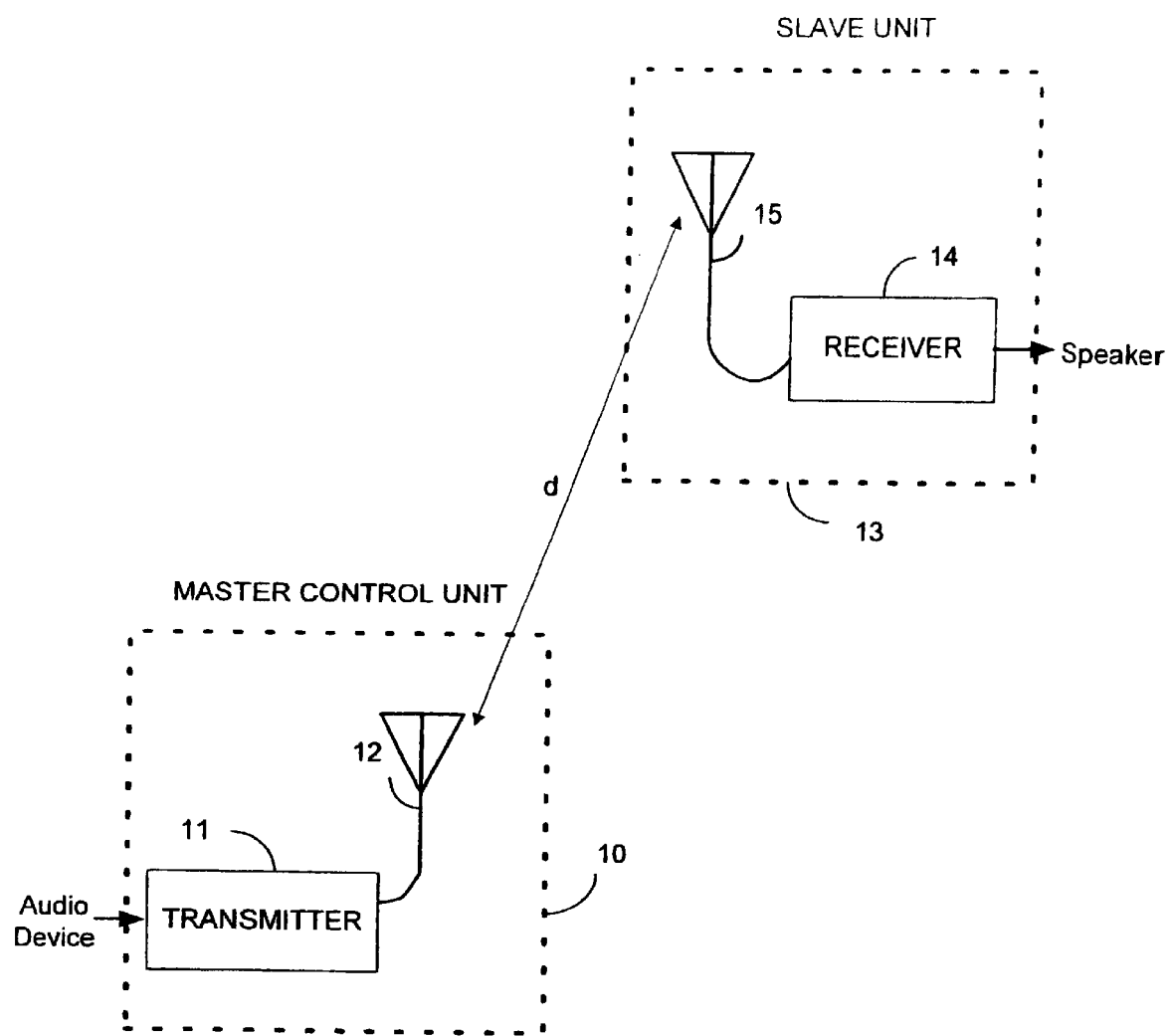
FIG. 1 is a block diagram illustrating one embodiment of present invention, in which a unidirectional wireless system includes a single channel.

The wireless communication system according to the present invention solves many of the problems associated with other known wireless communication systems. In describing the invention and the principles therein, this document will follow the outline structure provided below:

I. General System
   A. Unidirectional Single Channel System
   B. Unidirectional Multiple Channel System
   C. Bidirectional Multiple Channel System
   D. Recharging Station
   E. Enclosure and Audio Device Interface
   F. Power-Saving Techniques
   G. General Summary
II. Master Control Unit
III. Slave Unit
IV. Multichannel Systems
   A. General
   B. Microcontroller
   C. Capacity
   D. Channel Synchronization and Tuning
V. Specialized Transceiver Integrated Circuit (HFIX)
   A. General System
   B. HFIX
      1. Functional Block Diagram of IC
      2. Receiver in the HFIX
      3. Transmitter in HFIX
      4. HFIX I/O Pins
      5. HFIX Control Registers
VI. Antennas
   A. General Considerations
   B. Antenna Structure
   C. Antenna Orientation
      1. General
      2. Space Diversity
   D. Electromagnetic Design Considerations
      1. System optimization
      2. Fields from a Magnetic Dipole
      3. Fields from an Electric Dipole
      4. Antenna Design Guidelines
         a. Transmitter Antenna System Design
         b. Receiver Antenna System Design
         c. Low frequency design
      5. Electric field shielding ("Faraday shielding")
VII. Industrial Applications I. General System Generally, one embodiment of the present invention comprises a transmitter, a receiver, and inductive coils for the transmitting and receiving antennas where the transmitter and receiver are inductively coupled for short-range wireless communication. First, the selected operating frequency range is in the high frequency ("HF") range, spanning approximately from 3 to 30 MHz. Much lower frequency ranges (i.e., 100–200 kHz) were avoided because of the need for large bulky antennas, high transmission power levels, and limited number of channels. Furthermore, unlike IR systems, the use of the HF band eliminates the need to provide an unobstructed line-of-sight between the transmitter and receiver. Moreover, the use of the HF band facilitates the use of smaller antenna coils and enables a broader transmission bandwidth than currently known wireless communication systems operating in lower frequency bands.

Note that FCC Part 15 regulations specify that in the frequency range of 3 to 30 MHz, the maximum allowable signal strength is 30 $\mu$V per meter, measured at a range of 30 meters from the transmitter. Thus, the transmitter of the present invention does not interfere with primary users of the HF band, including military, amateur radio, and shortwave broadcasters. In addition, several "forbidden" zones exist within this frequency band at which even lower signal radiation levels apply.

As discussed more fully below, by employing inductively coupled transmission schemes and novel Faraday shielding techniques, the electric field portion of the transmitted electromagnetic field is substantially reduced during transmission, while the magnetic field portion is substantially unaffected. Also, because the transmitting and receiving antennas are inductively coupled, signal strength falls off rapidly with distance and thus, many users can be accommodated in a small physical area without interference. The transmitted signal is received by the matching receiver located a short distance (i.e., 1–3 meters) away so that, in effect, the coverage area can be roughly represented by a sphere around the user. Because the size of the sphere is small (i.e., 1–3 meters in radius), one user's wireless system does not interfere with another user's system. Also, one effective means to reduce inductive coupling between receiver system elements such as the voltage controlled oscillator and magnetic antenna, is to reduce the size of the VCO inductor, especially if the inductor is toroidal. Leakage can be reduced by 10–15 dB by shrinking the toroid from 0.25 inch OD (outer diameter) to 0.12 inch OD.

The specifics of the various embodiments of the present invention will now be discussed. When necessary, like numerals will be used for like components.

A. Unidirectional Single Channel System

FIG. 1 illustrates, in block diagram form, one embodiment of the wireless communication system of the present invention. In this embodiment, the wireless link is unidirectional, the carrier is in the HF band, and the sound is monophonic. As shown, the system includes a master control unit 10 comprising a transmitter 11 electrically coupled to a transmitting antenna 12, and a slave unit 13 comprising a receiver 14 electrically coupled to a receiving antenna 15. The master control unit 10 can be coupled to an external device, such as a compact disc (CD) player, commercial FM radio, audio tape player, cellular telephone, cordless telephone, or other device that provides a source of information (e.g., music, data). The receiver 14 is coupled to an audio transducer, such as a speaker. A power supply (e.g., rechargeable battery, conventional battery) is used to run the system but is not shown in FIG. 1.

Although only one slave unit 13 is shown in FIG. 1, multiple slave units can be used (e.g., one slave unit for each ear). A variable distance "d" physically separates the transmitting antenna 12 from the receiving antenna 15. In one embodiment, the transmitting antenna 12 and the receiving antenna 15 are inductors. Accordingly, the wireless system of the present invention employs inductive coupling, also known as magnetic coupling, between the transmitting antenna 12 and the receiving antenna. The details of the inductive coupling mechanism will be discussed further later.

The transmitter 11 shown in FIG. 1 is electrically coupled to the transmitting antenna 12, and modulates a modulating signal onto a HF carrier. In one embodiment, the modulating signal includes an information signal and a control signal. The information signal can be a single high-fidelity analog audio signal. Control signals can include operating parameters such as audio signal volume. In one embodiment, the HF carrier frequency lies generally in the 3 to 30 MHz band. At the slave unit 13, a receiving antenna 15 is electrically coupled to a receiver 14, which reproduces the modulating signal and decodes control messages sent by the transmitter 11.

In one embodiment, the wireless link is based on inductive coupling between the transmitter 11 and receiver 14 via their respective antennas 12 and 15 to create a small, spherically shaped electromagnetic field around the transmitter 11. The terms "sphere" and "spherically shaped" are meant to be descriptive. In other words, the locus of points that provide a constant signal power level from the transmitter roughly define a sphere. As described more fully below, signal power falls off rapidly ($1/r^6$) as a function of the distance from the transmitter r. This feature allows many users to be accommodated in a small physical area.

Figure 6:
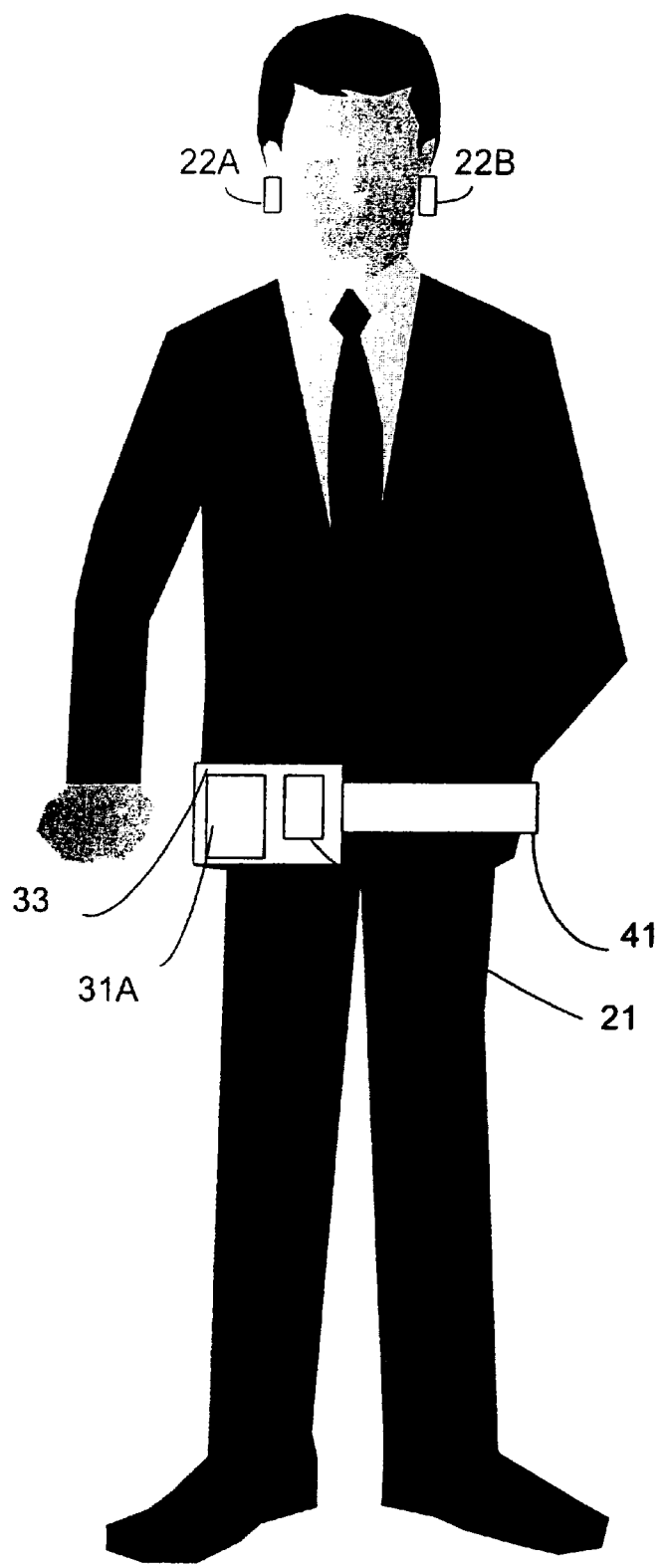
FIG. 6 is a perspective drawing that shows one method of adapting the present invention for on-body use.

The transmission distance d, as shown in FIG. 1, is selected such that satisfactory communication coverage exists between the master control unit 10 and the slave unit 13; that is, if "D" represents the maximum distance or separation between the master control unit 10 and the slave unit 13 such that communication therebetween is possible, $0 < d \leq D$. In one embodiment, the wireless communication system of the present invention is designed for short-range communication. Specifically, transmission distance d is approximately one meter. Thus, if the master control unit 10 is worn as a belt unit and the slave unit 13 is worn as an earpiece, the approximate distance d between the waist and the ear on a typical human user is less than one meter. FIG. 6, to be discussed later, illustrates this particular configuration. A longer range for transmission distance d is possible. For example, in another embodiment, the distance d is 3 meters. In some applications, a minimal distance d is preferred minimize or eliminate interference from and to adjacent users and electrical equipment nearby.

B. Unidirectional Multiple Channel System

Figure 2:
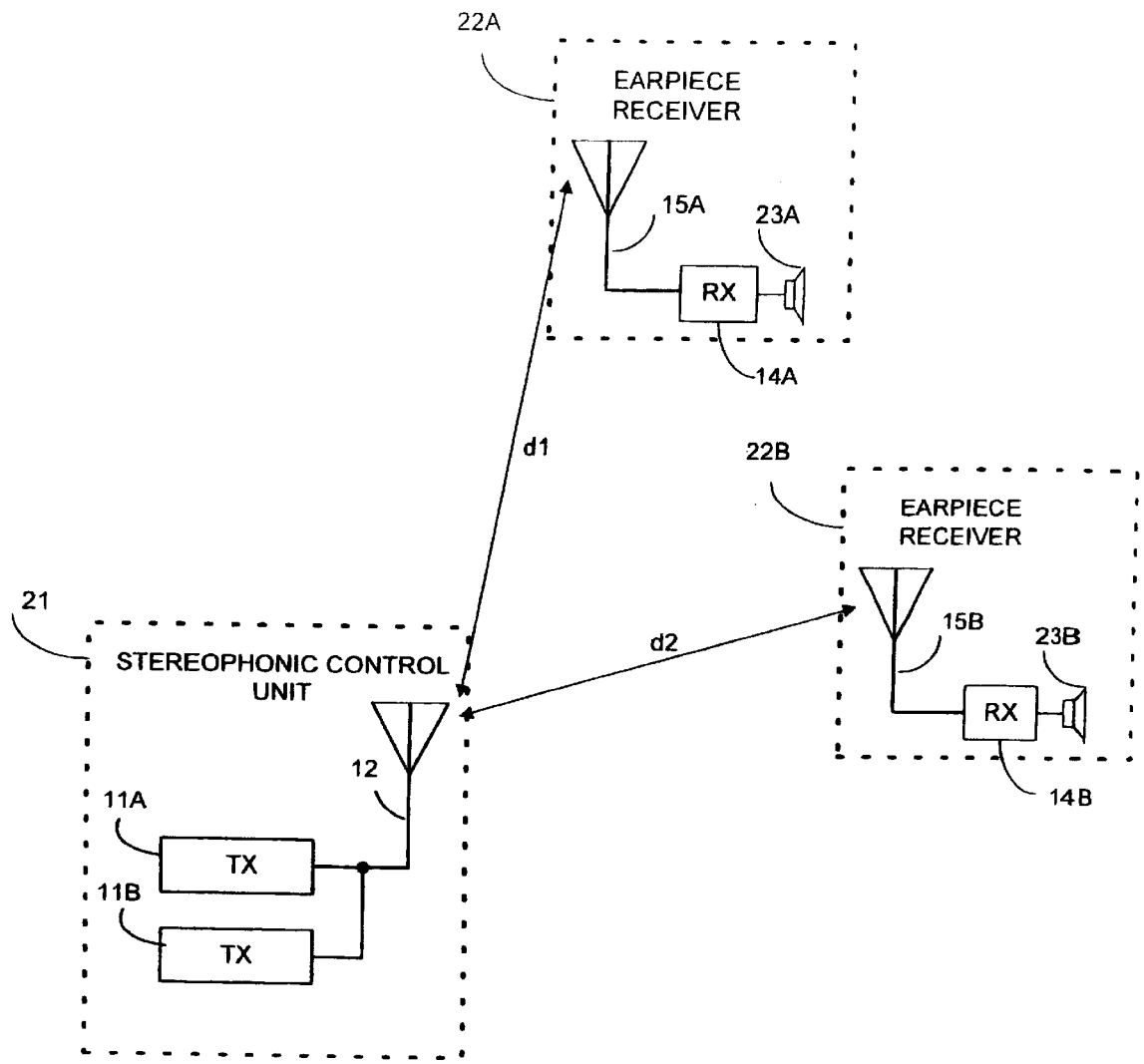
FIG. 2 is a block diagram illustrating a second embodiment of the present invention, in which a unidirectional wireless system includes multiple channels.

Another embodiment of the present invention is shown in FIG. 2. Here, the wireless link is unidirectional, the carrier is in the HF band, and the sound is stereophonic. The wireless communication system consists of two basic component types: a stereophonic control unit 21, and a pair of slave units 22A, 22B. In one embodiment, the slave units are in the form of small earpiece receivers that can be implemented as earrings, earpieces, headphones, or as part of a headset or hat. Preferably, each slave unit or earpiece receiver 22A, 22B should be significantly smaller in size than the control unit 21.

The stereophonic control unit 21 shown in FIG. 2 consists of a pair of transmitters 11A, 11B, electrically coupled to a single transmitting antenna 12 which is shared by the two transmitters 11A, 11B. Alternatively, each transmitter 11A and 11B can be coupled to its own separate antenna (not shown) instead of sharing a single antenna. Earpiece receiver 22A includes a receiving antenna 15A, a receiver 14A, and audio transducer/speaker 23A. The receiving antenna 15A is coupled to the input of receiver 14A. The output of receiver 14A is coupled to transducer/speaker 23A. Similarly, earpiece receiver 22B includes a receiving antenna 15B, a receiver 14B, and audio transducer/speaker 23B. The receiving antenna 15B is coupled to the input of receiver 14B. The output of receiver 14B is coupled to transducer/speaker 23B. In another embodiment (not shown), the two receivers 14A, 14B share a single receiving antenna.

In one embodiment, the transmitter 11A uses operating carrier frequency $f_A$ and transmitter 11B uses operating carrier frequency $f_B$, where $f_A \neq f_B$. On the receiver side, receiver 14A in earpiece receiver 22A is tuned to frequency $f_A$ and receiver 14B in earpiece receiver 22B is tuned to frequency $f_B$. The frequencies $f_A$ and $f_B$ are separated from each other by at least 200 kHz. Thus, earpiece receiver 22A receives signals from transmitter 11A and earpiece receiver 22B receives signals from transmitter 11B. In one embodiment, transmitter 11A may be configured to transmit the left audio signal of the audio source over one HF channel, while transmitter 11B may be configured to transmit the right audio signal of the audio source over a different HF channel. In this exemplary configuration, earpiece receiver 22A would then be worn on or near the user's left ear, and would be tuned to the transmit frequency used by transmitter 11A. Similarly, earpiece receiver 22B would be worn on or near the user's right ear, and would be tuned to the transmit frequency used by transmitter 11B. Thus, each receiver 14A, 14B reproduces the modulating signal sent by the corresponding transmitter 11A or 11B and decodes any control messages sent by that transmitter. This configuration of using different frequencies for the links substantially minimizes the chance of interference between one link (transmitter 11A to earpiece receiver 22A) and the other link (transmitter 11B to earpiece receiver 22B).

Like the monophonic system shown in FIG. 1, the stereophonic wireless system shown in FIG. 2 employs inductive coupling between the transmitting antenna 12 and the receiving antennas 15A and 15B, to be discussed further below. Accordingly, signals emanating from the transmitting antenna 12 induce signals in the receiving antennas 15A and 15B by the mutual magnetic coupling of the two circuits formed by these two antennas. Moreover, by employing inductively coupled transmission schemes and novel Faraday shielding techniques, the electric field portion of the transmitted electromagnetic field is substantially reduced during transmission, while the magnetic field portion is substantially unaffected. This feature will be discussed more fully below.

As shown in FIG. 2, variable distances d1 and d2 physically separate the transmitting antenna 12 and the receiving antennas 15A, 15B; transmission antenna 12 and receiving antenna 15A are separated by distance d1, and transmission antenna 12 and receiving antenna 15B are separated by distance d2. The wireless system is designed such that satisfactory communication can be established and maintained at distances d1 and d2. Because the wireless communication system of the present invention is designed for short-range communication, transmission distances d1 and d2 are each approximately one meter. Thus, if the stereophonic control unit 21 is worn as a belt unit and the earpiece receivers 22A and 22B are implemented in the form of earrings or as part of a headset or hat, the distance between the waist and the ears on a typical human user is approximately less than one meter. Longer ranges for transmission distances d1 and d2 are possible.

C. Bidirectional Multiple Channel System

Figure 3:
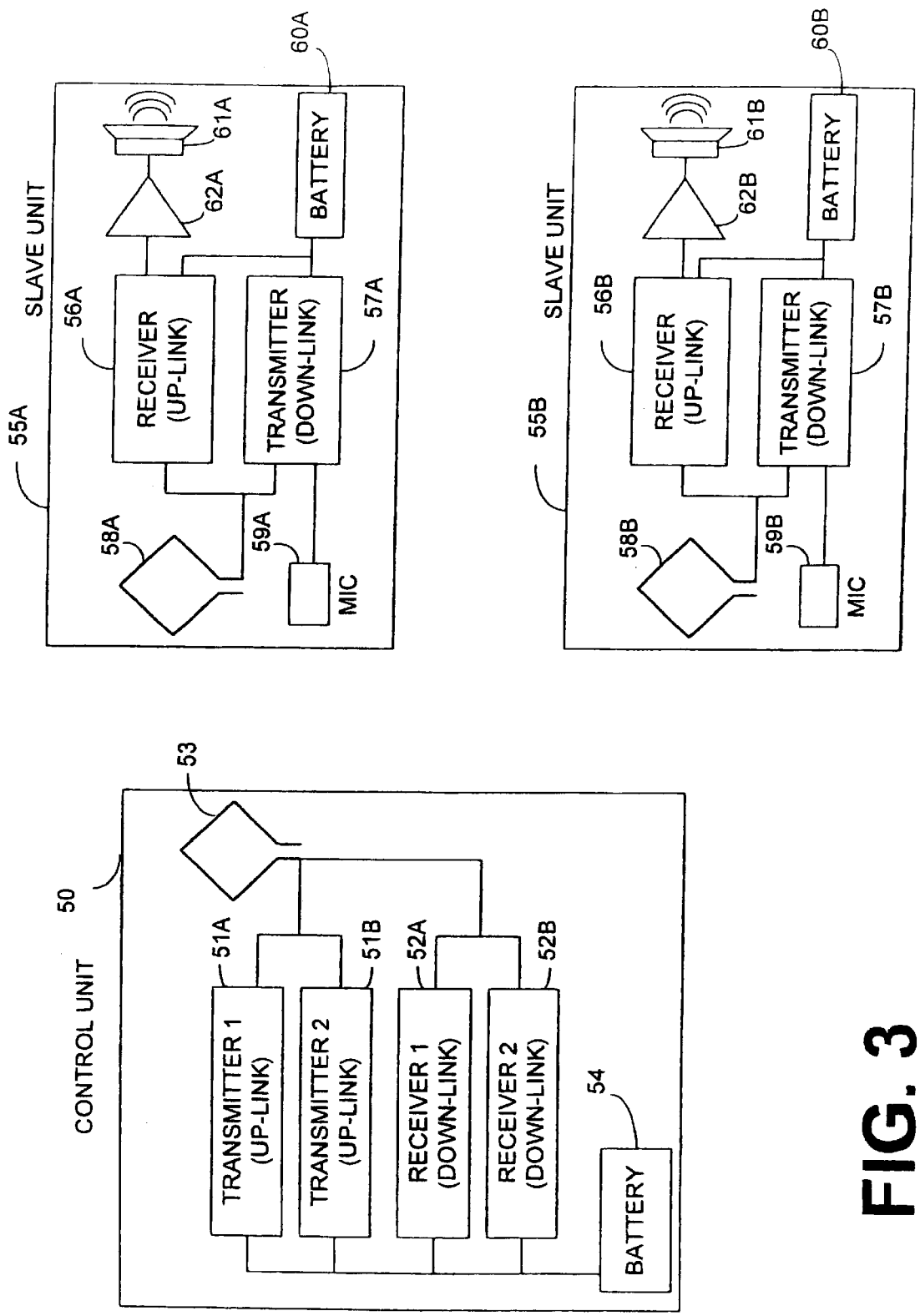
FIG. 3 is a block diagram illustrating a third embodiment of the present invention, in which a bidirectional wireless system includes multiple channels.

Referring now to FIG. 3, another embodiment of the present invention is illustrated. Whereas the embodiments shown in FIGS. 1 and 2 are designed for one-way communication between a control unit and at least one slave unit, the embodiment shown in FIG. 3 is set up for two-way communication between a master control unit and at least one slave unit. As discussed more fully below, the system shown in FIG. 3 may be selectively configured as follows: (1) one-way or two-way, and (2) monophonic or stereophonic. For the purposes of the discussion with respect to FIG. 3, the wireless system is configured for two-way communication and stereophonic quality.

FIG. 3 shows two up-link channels (separate channel transmissions from the master control unit to each slave unit) and two down-link channels (separate channel transmissions from the slave unit to the master control unit). As shown in FIG. 3, the control unit 50 includes a first stereophonic "up-link" transmitter 51A, a second stereophonic "up-link" transmitter 51B, a monophonic or stereophonic first "down-link" receiver 52A, a monophonic or stereophonic second "down-link" receiver 52B, antenna 53, and power supply (e.g., battery) 54. The outputs of transmitters 51A, 51B are coupled to antenna 53. The inputs of receivers 52A, 52B are also coupled to the antenna 53. The transmitters 51A, 51B and the receivers 52A, 52B are powered by the battery 54. Alternatively, each transmitter 51A and 51B can be coupled to its own separate antenna (not shown) instead of sharing a single antenna. Similarly, first transmitter 51A and first receiver 52A can share one antenna, while second transmitter 51B and second receiver 52B can share another antenna.

To minimize interference and allow duplex operation, all operating frequencies are different from each other. The operating frequency $f_{up-link\_A}$ of the first transmitter 51A and the operating frequency $f_{up-link\_B}$ of the second transmitter 51B are different from the operating frequencies $f_{down-link\_A}$ and $f_{down-link\_B}$ of the receivers 52A and 52B. Also, the transmitter frequencies $f_{up-link\_A}$ and $f_{up-link\_B}$ are different from each other. Similarly, the receiver frequencies $f_{down-link\_A}$ and $f_{down-link\_B}$ are different from each other. Thus, $f_{up-link\_A} \neq f_{up-link\_B} \neq f_{down-link\_A} \neq f_{down-link\_B}$. The control unit 50 should be small enough so that in many cases, it may be incorporated into the enclosure of an audio source device.

A first slave unit 55A includes an antenna 58A, up-link receiver 56A, down-link transmitter 57A, low noise amplifier 62A, speaker 61A, microphone 59A, and battery 60A. Similarly, a second slave unit 55B includes an antenna 58B, up-link receiver 56B, down-link transmitter 57B, low noise amplifier 62B, speaker 61B, microphone 59B, and battery 60B. In first slave unit 55A, antenna 58A is coupled to the input of receiver 56A and the output of transmitter 57A. Both the receiver 56A and transmitter 57A are coupled to the battery 60A. The output of the receiver 56A is coupled to the input of the low noise amplifier 62A. The output of the low noise amplifier 62A is coupled to the speaker 61A. Microphone 59A is coupled to the input of transmitter 57A. In second slave unit 55B, antenna 58B is coupled to the input of receiver 56B and the output of transmitter 57B. Both the receiver 56B and transmitter 57B are coupled to the battery 60B. The output of the receiver 56B is coupled to the input of the low noise amplifier 62B. The output of the low noise amplifier 62B is coupled to the speaker 61B. Microphone 59B is coupled to the input of transmitter 57B. To retain the small size and minimize the cumbersomeness, microphones 59A and 59B are bone conducting microphones in one embodiment of the present invention. In other embodiments, these microphones can be conventional microphones coupled to the slave unit via extension devices.

The operating frequencies are set up so that interference is minimized, duplex communication is possible, and up-link and down-link are stereophonic. The operating frequency of the receiver 56 in the first slave unit 55A is $f_{up-link\_A}$, which is the same operating frequency for the first up-link transmitter 51A in the control unit 50. The operating frequency of the transmitter 57A in the first slave unit 55A is $f_{down-link\_A}$, which is the same operating frequency of the receiver 52A in the control unit 50. The operating frequency of the receiver 56B in the second slave unit 55B is $f_{up-link\_B}$, which is the same operating frequency for the second up-link transmitter 51B in the control unit 50. The operating frequency of the transmitter 57B in the second slave unit 55B is $f_{down-link\_B}$ which is the same operating frequency of the receiver 52B in the control unit 50.

Although this embodiment shows four separate channels (i.e., two up-link channels and two down-link channels) for a completely stereo bidirectional system, other embodiments may use only three channels (i.e., two up-link channels and one monophonic down-link channel). In the three channel embodiment, the transmitters 57A, 57B in both slave units 55A, 55B can transmit using a common frequency $f_{down-link}$. Furthermore, other embodiments may require only one of the slave unit transmitters 57A or 57B to transmit the down-link signal. In further embodiments, each slave unit transmitter 57A and 57B can transmit alternately in time using the same frequency $f_{down-link}$. In still other embodiments, each transmitter 57A and 57B can transmit when necessary but only one transmitter (either transmitter 57A or 57B) can transmit at any given time; that is, both transmitters 57A and 57B will not be transmitting at the same time.

Of course, this four-channel bidirectional system can be configured to operate as a two-channel unidirectional system. The two transmitters 51A, 51B in the control unit 50 transmit signals to the slave units 55A, 55B using distinct carrier frequencies. The slave units 55A, 55B, however, do not transmit any signals back to the control unit 50; that is, the transmitters 57A, 57B in the slave units 55A, 55B can be disabled.

As shown in FIG. 3, low noise amplifiers 62A and 62B in the slave units 55A and 55B, respectively, are used to boost the received signal at the slave units 55A and 55B, respectively, to headphone levels. Low-impedance audio transducers 61A and 61B, such as 8-Ohm headphone speakers, in the slave units 55A and 55B permit the use of a low system supply voltage of approximately 2.5 V to 3 V to provide acceptable volume without clipping, and without the need for a separate audio transformer. Preferably, the operating current of the low noise audio amplifiers 62A and 62B should be less than 10 mA each. In one embodiment of the present invention, the receiver 14 exhibits a typical operating current of only 7 to 9 mA.

In one embodiment of the present invention, the audio amplifiers 62A and 62B at the slave units 55A and 55B, respectively, are each based on the LM4880 Audio Power Amplifier, an integrated circuit commercially available from National Semiconductor Corporation. The LM4880 is particularly well suited for use in the earpiece receiver of the present invention because it features a dual channel audio power amplifier capable of delivering 250 mW per channel of continuous average power into 8-ohm headphone speaker loads with less than 0.1% total harmonic distortion ("THD") using a single 5 V power supply voltage. Moreover, the LM4880 can be operated with a power supply voltage as low as 2.7 Volts. Also, the maximum quiescent power supply current required by the LM4880 is relatively low, at 6.0 mA. The LM4880 is intended for use in high-fidelity audio applications such as the inductively coupled wireless system of the present invention, and exhibits a good 3-dB audio frequency bandwidth of 50 Hz–16 kHz with a signal-to-noise ratio ("SNR") of 60 dB.

In one embodiment of the present invention, the modulating signal is an audio frequency signal. The fidelity of the audio channel of a wireless communication system according to the present invention is limited primarily by the SNR of the RF carrier. At the requisite minimum signal level, SNR can be as high as 60 dB, which is significantly better than the SNR achieved with prior art systems using low frequency pulse width modulation schemes and/or FM MPX encoding.

The small size of the control units and the slave units permits portability. In one embodiment, the control unit 50 is implemented in the form of a thin, business-card-size unit. To improve usability and cost-effectiveness, the control unit 50 and the slave units 55A, 55B, shown in FIG. 3, are designed to accommodate rechargeable batteries 54, 60A, and 60B. Because minimizing receiver size is one of the objects of the present invention, battery size is a design issue for the receiver. Thus, the battery 60A and 60B may be implemented as a single 3V lithium coin cell, although a pair of silver oxide cells would have the additional advantage of a more predictable battery voltage under all load conditions. In one embodiment, circuitry may be provided to emit a distinct, low-level audio signal to remind the user when the battery charge state is low. To implement a near-field inductive coupling scheme, the antennas 53, 58A, and 58B are inductive coils designed to operate in the HF band.

As with the unidirectional system discussed earlier, the fidelity of the return audio channel of the bidirectional system is limited primarily by the signal-to-noise ratio ("SNR") of the RF carrier, which operates in the HF band. At the requisite minimum signal level, the SNR can be as high as 60 dB. Such a high SNR is significantly better than SNRs achieved by prior art systems employing low-frequency pulse-width modulation schemes and/or FM MPX encoding.

D. Recharging Station

Figure 7:
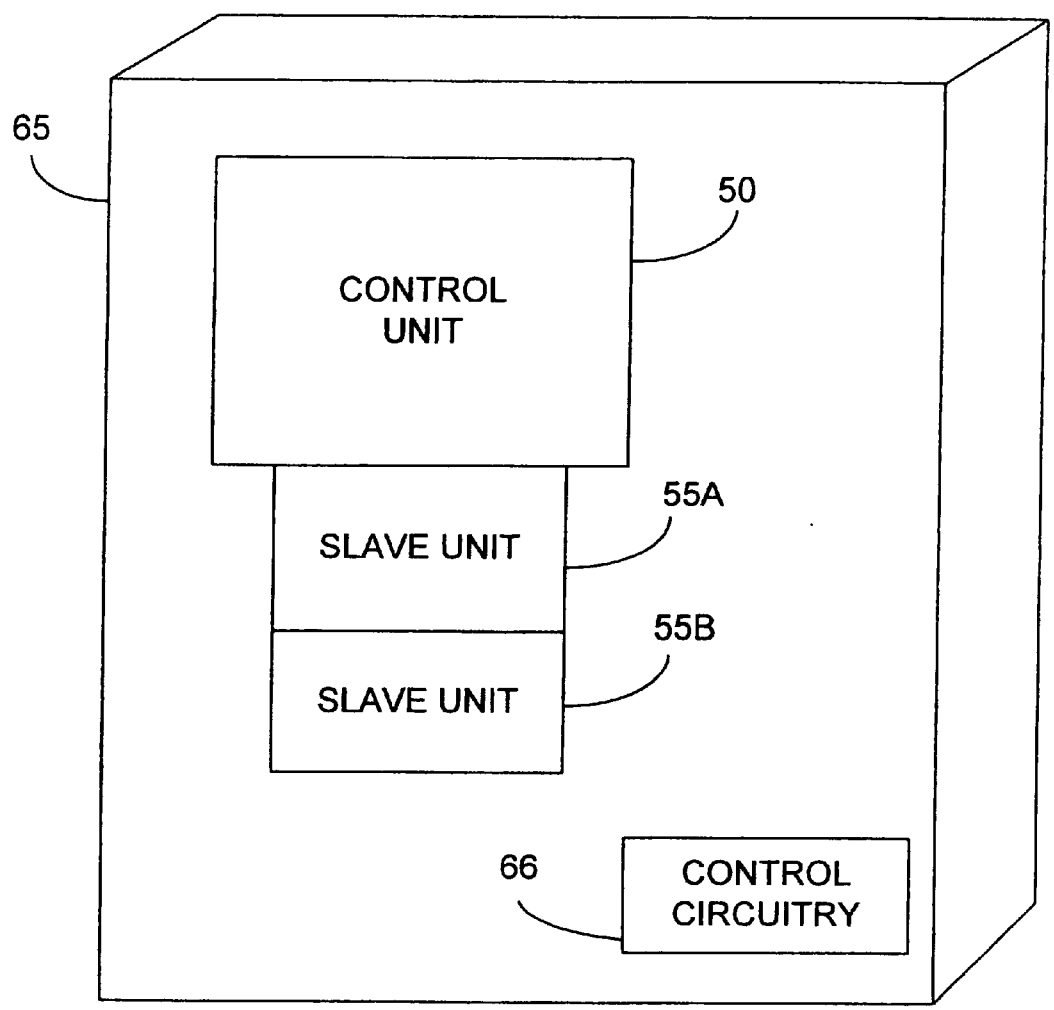
FIG. 7 is a perspective drawing that illustrates the use of a battery recharging station according to one embodiment of the present invention.

As shown in FIG. 7, when the system as shown in FIG. 3 is not in use, all components (i.e., control unit 50, slave units 55A, 55B) can be snapped together and connected to a recharging station, or dock 65. When the system components are snapped together in such a manner, the recharge path is completed via highly reliable plated contacts, and no wires are necessary to connect the system components when docked. Control circuitry 66 is provided to shut off all system components automatically upon docking.

E. Enclosure and Audio Device Interface

Figure 4:
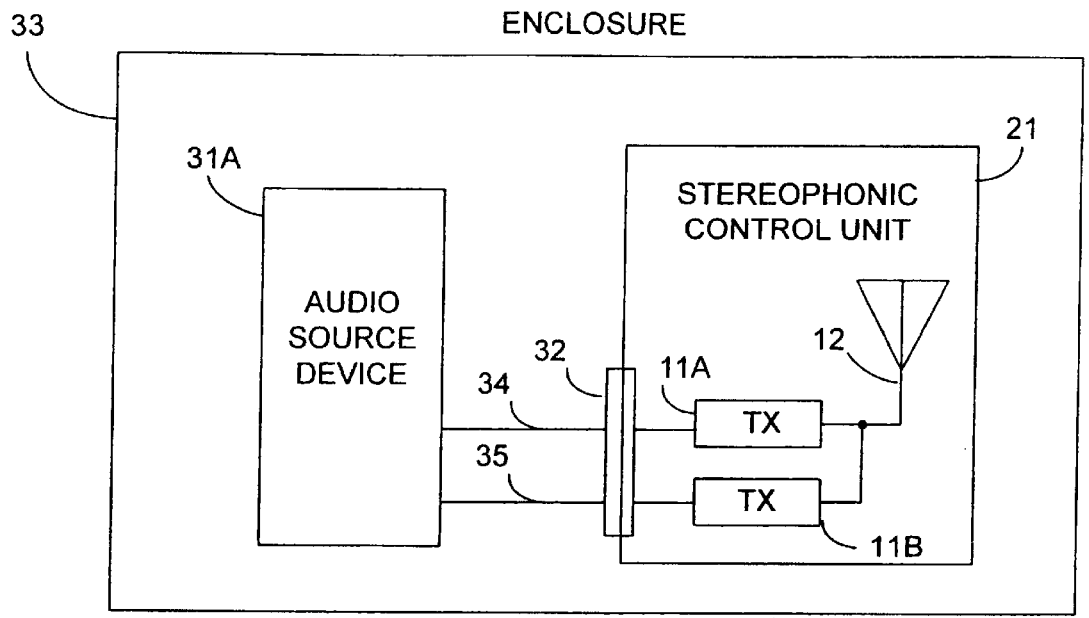
FIG. 4 is a block diagram illustrating one embodiment of the present invention in a control unit is integrated with an audio source device.
Figure 5:
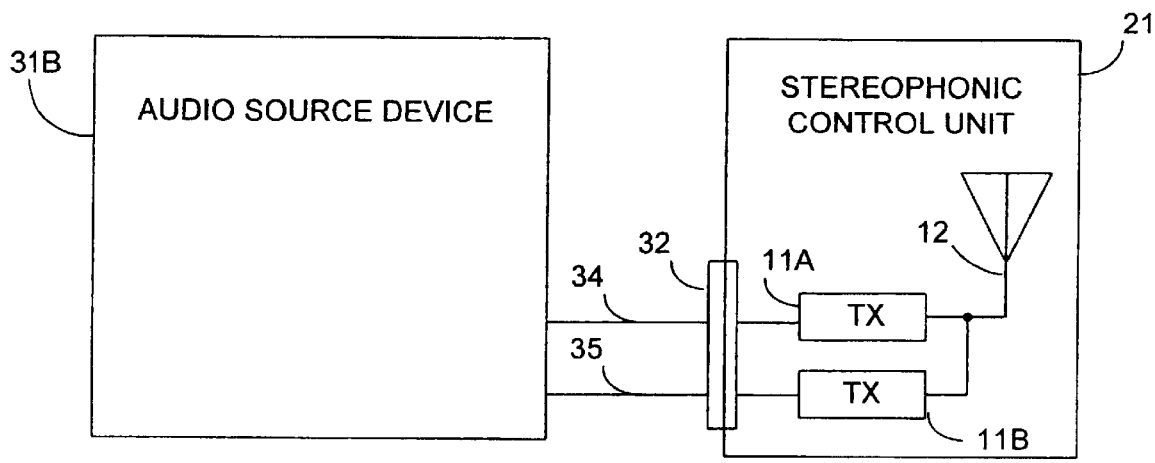
FIG. 5 is a block diagram illustrating a second embodiment of the present invention for integrating a control unit with an audio source device.

As stated above, the master control unit 10 (FIG. 1) and the stereophonic control unit 21 (FIG. 2) can be coupled to an audio or other electronic device, such as a compact disc (CD) player, commercial FM radio, audio tape player, cellular telephone, cordless telephone, computer system, or other device that provides a source of information (e.g., music, data). In one embodiment, this external device can be external to the control units 10 (FIG. 1) or 21 (FIG. 2). In another embodiment, the external device can be housed in the same compartment as the control units 10 (FIG. 1) or 21 (FIG. 2). These two embodiments are shown in FIGS. 4 and 5. As shown in FIG. 4, the stereophonic control unit 21 should be small enough that in many cases the unit 21 may be combined with a conventional stereophonic audio source device 31A (e.g., a cassette player, CD player, cellular telephone, or commercial FM radio) into a single enclosure 33. Alternatively, the stereophonic control unit 21 may be manufactured as a separate stand-alone unit that can be attached and coupled to any conventional stereophonic audio source device 31B, as shown in FIG. 5. In either case, the stereophonic output from the audio signal source 31A or 31B is connected to the input 32 of the control unit 21. In FIG. 4, the left audio signal on left signal line 34 and the right audio signal on right signal line 35 are routed from the audio source device 31A to the stereophonic control unit 21 using wires that are entirely located within the enclosure 33.

In contrast, in FIG. 5, the left audio signal on left signal line 34 and the right audio signal on the right signal line 35 can be routed from the external audio source device 31B to the stand-alone stereophonic control unit 21 using conventional audio cables, such as shielded cables with RCA-type or headphone-type connectors. Alternatively, the stereophonic control unit 21 can be adapted to snap directly into the headphone output port of the audio source device 31B. Other interconnection methods are also possible.

One embodiment of the present invention allows the system shown in FIG. 3 to be adapted for use as a hands-free extension to a portable or cellular phone handset. In this embodiment, the phone itself may be worn on or near the belt of the user, and connected via an adapter cable to the control unit. Alternatively, the phone unit and the control unit may be integrated into a single enclosure (see FIG. 4). Since the control unit operates in the HF band, it will not interfere with any of the conventional portable or cellular phone types commonly in use. As is well known in the art, such phones normally operate at 800 to 900 MHz, or 1800 to 1900 MHz, and are significantly removed in frequency from the HF range of the present invention that mutual interference is not a major concern.

FIG. 6 illustrates a particular physical configuration with respect to the user. The stereophonic control unit 21 is combined with a conventional stereophonic audio source device 31A (such as a cassette player, CD player, or commercial FM receiver) into a single enclosure 33. The enclosure 33 may be mounted on a belt 41 of the user. Earpiece receivers 22A and 22B, as described above in relation to FIG. 2, are worn on or near the ears of the user. Where a single enclosure 33 is not used, the audio source device 31A and control unit 21 are each stand-alone units coupled together and separately mounted to the belt 41 of the user. Preferably, the approximate range between the control unit and slave units should be approximately one meter, with no loss of signal during normal body or head movement. Also, to minimize mutual interference and eavesdropping, the maximum transmission range should not exceed three meters. Additionally, there should be no loss of signal quality in the presence of similar units operating nearby.

As stated earlier, bidirectional communication system according to the present invention may also be adapted for use with many other communication devices. For example, the communication system of the present invention may be adapted for use in a hands-free, wireless link to a voice-operated personal organizer, either integrated with the system of the present invention or external to it. In another application, the communication system of the present invention may be adapted for use with a personal computer that incorporates voice recognition capabilities.

The control unit in accordance with the present invention may be used in conjunction with a commercial FM broadcast receiver, as long as two design constraints are satisfied. First, the commercial FM broadcast receiver must be located at least 2 inches away from the transmitting inductive coils. Also, because one embodiment of the present invention utilizes 10.7 MHz IF stages, the commercial FM broadcast receiver must be specifically designed to minimize stray inductive coupling the IF stages. Shielded toroidal inductors may be employed for this purpose.

In one embodiment, each control unit receiver 52A, 52B as shown in FIG. 3 is designed to respond to voice band frequencies in the range of 50 Hz to 4 kHz, although other frequency bands are possible as necessary for particular applications. In the case of voice band audio, users can often tolerate significantly lower audio bandwidth. Additionally, reducing the transmission bandwidth in this manner improves the signal-to-noise ratio ("SNR") of the system. Alternatively, if the SNR is already acceptable, the system can be configured to use lower transmitter power or smaller antennas.

F. Power-Saving Techniques

In professional audio applications, where full audio bandwidth (from approximately 50 Hz to 20 kHz) is required from the earpiece 55A, 55B to the control unit 50 (see FIG. 3), other techniques may be used to keep the current drain low. For example, when ambient noise levels are high, the system can be designed to implement an adaptive frequency bandwidth. Using adaptive bandwidth techniques, the system constantly compares the level of the user's voice to the background noise level, as measured between spoken words and other sounds. If the ratio of the level of the user's voice to the background noise level falls below a specified threshold, the audio bandwidth is automatically reduced to approximately 8 kHz (as opposed to 15–20 kHz at full bandwidth), and the transmitter power is cut by 6 decibels ("dB"). In one embodiment of the present invention, this adaptive bandwidth feature can be selectively disabled, either manually by the user or automatically under software control.

A second power-saving technique that may be employed to reduce the current drain employs adaptive voice operated relays ("VOX"). Adaptive VOX is advantageously employed in continuous-connection applications where a low-fidelity "ambient" audio level is acceptable when the user is not speaking. In such a system, the VOX circuit monitors the user's voice. If the VOX circuit detects that the user has stopped speaking for a specified time interval, the system bandwidth is then slowly reduced to approximately 8 kHz, and the transmitted power is dropped by 6 dB. In one embodiment of the present invention, the specified time interval is set at 10 seconds. An advantage of adaptive VOX techniques is that this feature is transparent to the user, and can be disabled under software control.

According to one embodiment of the present invention, the slave units may be shut off automatically to conserve power if no RF carrier is detected from a matching transmitter for a predetermined period of time. This feature, known as automatic power-down mode, maximizes battery life. In one embodiment of the present invention, the specified time interval is set at ten seconds.

While in automatic power down mode, a microcontroller at the receiver periodically "wakes up" and samples the received signal strength indicator ("RSSI") signal on every channel in its tuning range to determine if a transmitter has powered-up nearby. If so, the receiver will listen for a few seconds for its matching transmitter's identification data ("ID") on each occupied channel. If a matching ID is detected, the receiver exits automatic power down mode and resumes normal operation. During this wake-up process, the audio output of the earpiece headphones is left muted to prevent undesirable audible glitches or pops from being heard by the user.

G. General Summary

In sum, the wireless system in accordance with the present invention can operate in either unidirectional or bidirectional mode, and either stereophonic or monophonic mode. Each transmitter in the master control unit modulates the high-fidelity signals that are generated by the audio source device (e.g., entertainment device or communications device) onto separate HF carriers, each operating in the 3 to 30 MHz band. In one embodiment, the channel spacing is 200 kHz, and each channel occupies a bandwidth of approximately 50 kHz. The system employs a different carrier frequency for each of the two channels to yield higher signal fidelity.

The control unit then transmits the two modulated signals using a shared transmitting antenna to the ear- or head-mounted earpiece receivers via a near-field inductively coupled wireless link. As previously described, the receiver within each earpiece demodulates and amplifies their corresponding transmitted FM signals and route the demodulated audio signals to transducers/speakers. For bidirectional communication, the slave unit may transmit signals back to the control unit.

II. Master Control Unit

Figure 8:
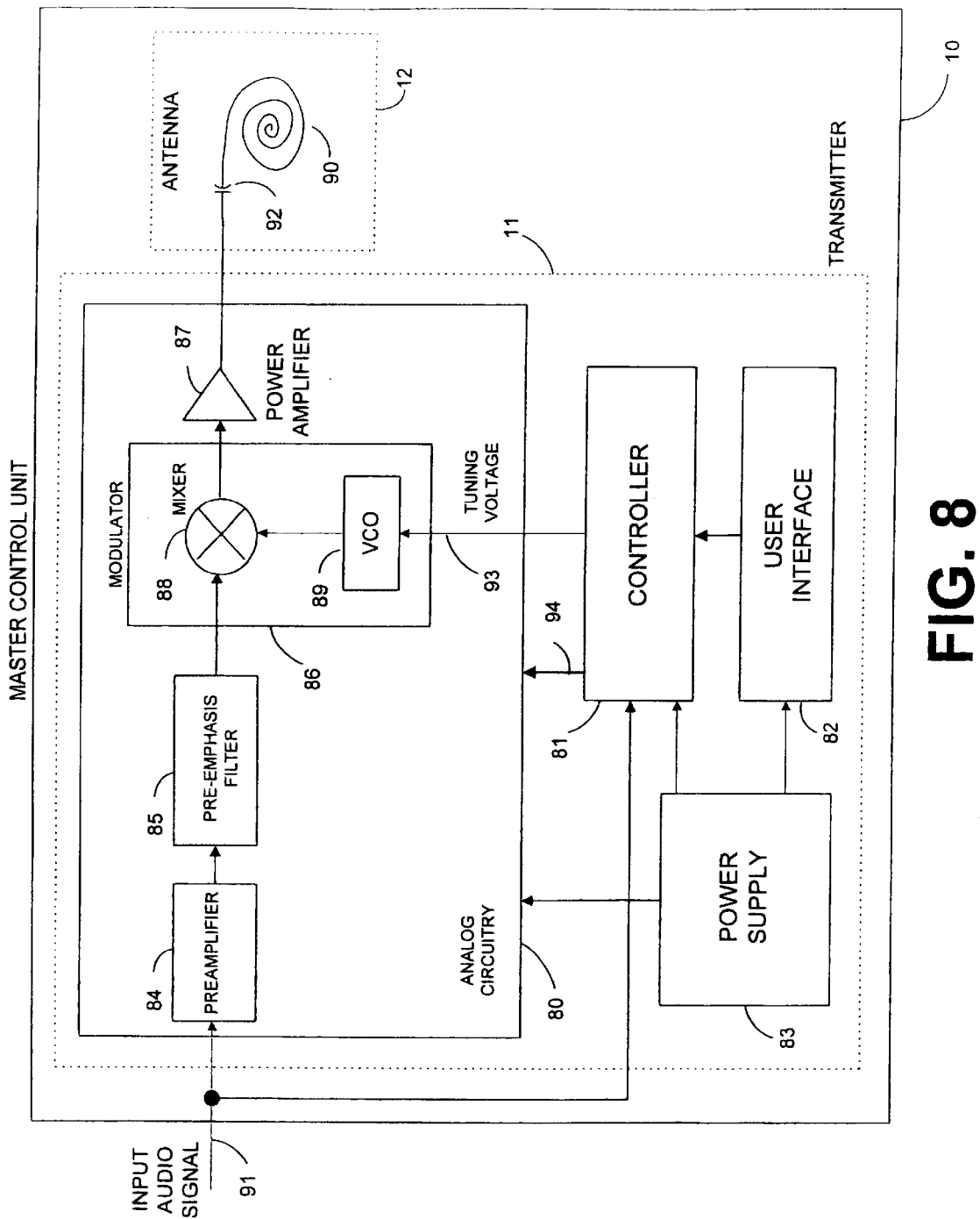
FIG. 8 is a block diagram of a master control unit transmitter in accordance with one embodiment of the present invention.

Referring now to FIG. 8, a block diagram of the master control unit 10 (see FIG. 1, where like numerals are used for like components) is illustrated in an embodiment adapted for use in a single-channel application employing an analog frequency modulation ("FM") transmission scheme. For multiple channels and stereo applications, more than one transmitter is used. For example, each of two transmitters transmits signals using a distinct carrier frequency. As is well known in the art, commercial FM transmission techniques use a single carrier frequency, along with FM MPX stereo encoding based on a 19 kHz pilot tone. However, this technique yields lower fidelity than the use of two separate carrier frequencies. The details of the multiple transmitters will be similar to the single transmitter layout shown in FIG. 8, which will be described below.

More specifically, as shown in FIG. 8, the master control unit 10 comprises a transmitter 11 and an antenna 12. An analog input audio signal 91 is routed through the transmitter 11 and into the antenna 12. As described more fully below, the transmitter 11 is configured as an analog frequency modulator.

The transmitter 11 comprises analog circuitry 80, a controller 81, user interface 82, and a power supply 83. The analog circuitry 80 portion of the transmitter 11 can further be subdivided into a preamplifier 84, a pre-emphasis filter 85, a modulator 86, and a power amplifier 87.

An input audio signal 91, such as the output of a microphone or a conventional CD player, is routed into the master control unit 10, where it is coupled to the preamplifier 84 and to the controller 81. In the case where the input audio signal 91 is generated by a microphone or other low-level signal source, the preamplifier 84 boosts the signal strength to a level appropriate for further signal processing in the transmitter 11. However, in the case of line-level input signals, such as CD player or commercial FM radio outputs, the preamplifier stage 84 may be unnecessary. Additionally, as described more fully below, routing the input audio signal 91 to the controller 81 facilitates the implementation of an automatic power-down mode.

The output of the preamplifier 84 is routed to the pre-emphasis filter 85. As is well known in the art, the pre-emphasis filter 85 boosts higher audio frequencies in order to improve the signal-to-noise ratio ("SNR") at these higher frequencies. The pre-emphasis filter 85 is optional in the transmitter 11, but if a pre-emphasis filter 85 is used, a complementary de-emphasis filter must be implemented at the matching receiver. As is well known in the art, the function of pre-emphasis and de-emphasis is to improve the SNR at high modulating frequencies.

Still referring to FIG. 8, the output of the pre-emphasis filter 85 is routed to the modulator 86, which comprises a frequency-shifting mixer 88 and a varactor-tuned voltage controlled oscillator ("VCO") 89. In one embodiment, the varactor-tuned VCO is based on a conventional Motorola MVAM108 varactor diode and the oscillator section of a Philips NE602 oscillator/mixer. This device was chosen for three reasons. First, its oscillator section is stable and requires few components. Second, because the oscillator is a low-voltage Colpitts type oscillator, the signal amplitude is low which reduces unwanted modulation of the varactor diode bias. Third, alternate embodiments of the transmitter circuit may employ the mixer 88 as a converter stage. The linearity of the varactor modulator 86 is excellent, since only a small fraction of the allowable voltage swing on the varactor diode is used.

A varactor tuning voltage signal 93 is provided by the controller 81 to the VCO 89, and causes the VCO 89 to oscillate at the desired carrier frequency. The carrier frequency is designed to lie in the HF range, spanning approximately from 3 to 30 MHz. As described more fully below, however, the transmission carrier frequencies should preferably be set in the range of 10 to 20 MHz.

The frequency-shifting mixer 88 modulates the pre-amplified and pre-emphasized input audio signal 91 onto the carrier frequency generated by the VCO 89. The mixer 88 includes two inputs: an 8 MHz signal from a crystal oscillator, and the signal from its on-chip oscillator 89, still being used as the varactor modulator, operating at approximately 4 MHz. The mixer 88 provides sum and difference outputs, but only the difference output is used, which is easy to extract with a single-stage filter. In fact, all of the filtering is provided by the series-tuned antenna circuit 12. Inter-stage filtering can marginally improve the transmitted signal quality, but does not improve the observed overall system performance. The use of a frequency-shifting mixer 88 also prevents excessive coupling between the power amplifier 87 and the VCO 89.

The output from the modulator 86 is fed to a power amplifier 87. In one embodiment, power amplifier 87 is implemented as a Linear Technology Corporation's LT1252 video amplifier integrated circuit ("IC"). The LT1252 is quite stable, exhibits a flat frequency response up to approximately 50 MHz, and can easily drive low-impedance loads, so that no inter-stage transformer is required between the mixer 88 and the amplifier 87. The power amplifier stage 87 requires relatively low power, and preferably dissipates 100 mW or less. Also, since the LT1252 can be configured as an operational amplifier ("op-amp"), its gain is predictable and readily tailored to the application of the present invention. As discussed more fully below, by employing near-field inductive coupling techniques according to the present invention, electric field radiation can be virtually eliminated, while the magnetic field of the transmitted waveform is maintained at a relatively high level.

The power amplifier 87 drives the antenna 12, which is essentially a series-tuned circuit consisting of a trimmer capacitor 92 and a spiral-wound printed circuit board ("PCB") antenna coil 90. As discussed more fully below, this coil 90 is similar to that used in the matching receiver, but approximately twice as large, taking advantage of the greater available space in the belt-mounted master control unit 10. In the transmitter, excess lead lengths must be avoided in the vicinity of the power amplifier 87 and antenna 12, since even short lengths might radiate RF energy that could cause interference or compromise FCC compliance. The radiation pattern and coupling efficiency of the transmit antenna can be preserved by removing the portion of printed circuit board ("PCB") copper ground plane immediately beneath the antenna 12. Alternatively, persons skilled in the art will recognize that the ground plane can be broken up into "fingers" or any of several other patterns that minimize magnetic losses. Similarly, metallic portions of any object to which the transmitter is attached should be oriented away from the transmitter antenna coils.

The power supply 83 provides the power necessary to operate the analog circuitry 80, the controller 81, and the user interface 82. In one embodiment, a 9-volt battery is the primary energy source in the power supply 83, and conventional voltage regulators can be used to provide the required voltage supply levels (e.g., 2.7 V) for the analog circuitry 80, the controller 81, and the user interface 82. In another embodiment, the battery is rechargeable.

As described more fully below, controller 81 supervises the operation of the master control unit 10. The transmitter 11 according to the present invention turns off automatically and enters a power-down mode if no input modulating signal is detected on either input channel for a predetermined period of time. In one embodiment of the present invention, the predetermined period of time is set at two seconds. This automatic power-down feature maximizes battery life and eliminates the need for an on-off switch at the transmitter. Once in power-down mode, the controller 81 in the control unit 12 "wakes up" and begins to sample the inputs to determine if a source device has been connected or has resumed activity. Once an active input signal is detected, the transmitter 11 powers up and resumes transmission.

Further isolation between transmitter stages is obtained by employing toroidal inductors in the control unit 10, which exhibit excellent magnetic self-shielding properties. Also, one effective means to reduce inductive coupling between receiver system elements such as the voltage controlled oscillator and magnetic antenna, is to reduce the size of the VCO inductor, especially if the inductor is toroidal. Leakage can be reduced by 10–15 dB by shrinking the toroid from 0.25 inch OD (outer diameter) to 0.12 inch OD. Thus, the smallest possible toroidal inductor should be used to reduce adjacent coupling.

Figure 10:
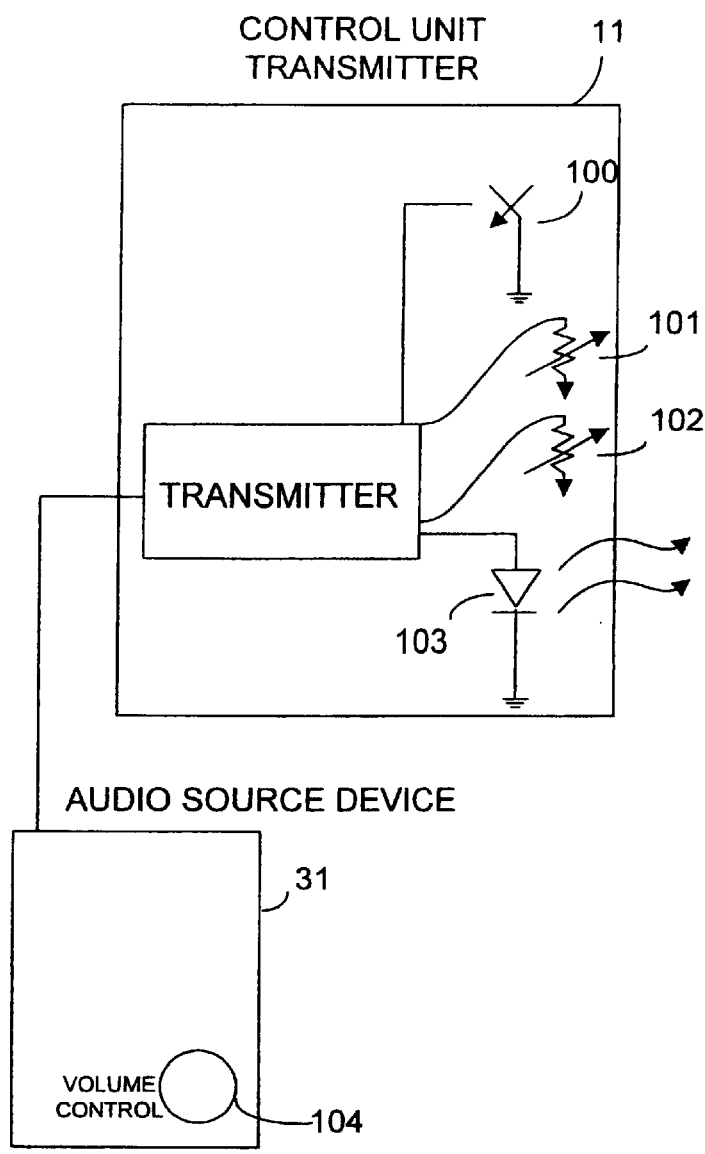
FIG. 10 is a block diagram illustrating the user interface functions and components of the control unit transmitter according to one embodiment of the present invention.

As shown in FIG. 10, user-accessible on-off switch 100 is provided on the master control unit 10. Additionally, a conventional light-emitting diode ("LED") 103 is provided on the master control unit 10 to indicate whether power is applied. Preferably, a high efficiency red LED is used to minimize current drain. In one embodiment, a current of approximately 1 mA flows through the LED 122 for moderate visibility.

The master control unit 10 also includes two conventional small trimmer potentiometers 101 and 102 for setting the left and right channel gain levels, respectively. These controls can be used to compensate for net gain variations due to the audio source, transmitter circuits, and receiver circuits. Once these controls are set, the user need only adjust the volume control 104 on the audio source device 31. In other embodiments, the transmitter volume control 104 may be incorporated in the master control unit 10. The transmitter 11 in the master control unit 10 shown in FIG. 1 embeds volume control and other user interface control information into the FM modulated signal that is transmitted to the slave unit 13.

III. Slave Unit

Figure 9:
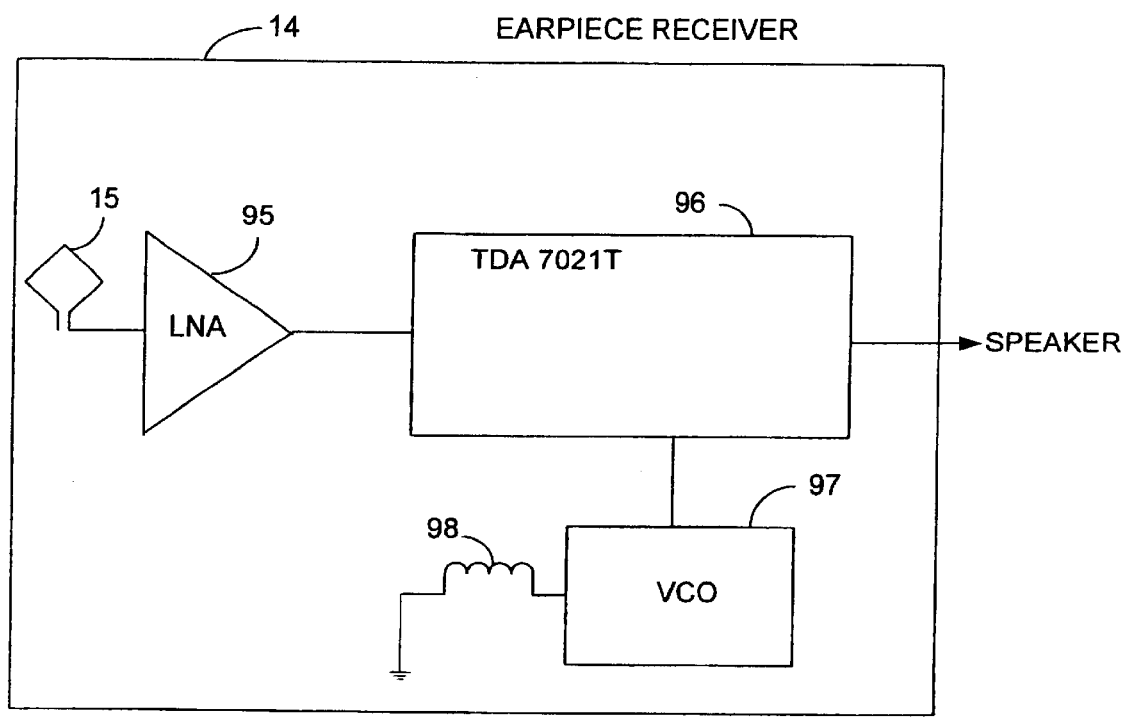
FIG. 9 is a block diagram of a slave unit receiver in accordance with one embodiment of the present invention.

Referring now to FIG. 9, the receiver 14 in the slave unit 13 (see FIG. 1) according to one embodiment of the present invention is based on the TDA7021T FM radio integrated circuit ("IC") 96, a commercially available device manufactured by Philips Semiconductors. This device is particularly well suited for use in the present invention because of its low current drain and minimum external component count. In particular, the TDA7022T incorporates a very low intermediate frequency ("IF") stage operating at 76 kHz. At such a low IF, all the requisite frequency selectivity ("Q") can be provided with simple, inexpensive, R-C (resistor-capacitor) filters. This feature eliminates the need for the large IF transformer and ceramic filter which are typically required, and thus reduces the receiver size and production cost. The only external component required is associated with the VCO 97, which sets the operating frequency of the receiver.

As discussed earlier, a very low IF stage would normally not be considered acceptable in high-performance FM stereo receivers, because image signal rejection is very difficult at such low frequencies. As a result, most commercial FM receiver ICs implement an IF of approximately 10 MHz (versus 76 kHz in accordance with one embodiment of the present invention) to facilitate image signal rejection. However, in the wireless systems according to the present invention, a low IF stage is acceptable because the 200 kHz channel spacing ensures that no signal is transmitted in the frequency band that contains the image response. Additionally, the low frequency IF stage allows for all circuit resistors to be mounted on-chip, and for all circuit capacitors to be implemented as very small and inexpensive surface-mount units.

Typically, when the IF is so low, single-signal reception is not possible. This means that the image response at a frequency equal to twice the IF frequency is simply ignored, and will contribute a small amount of noise. However, this is not a problem in the system of the present invention, because transmission channels are spaced widely enough to avoid the typical "troughs" where an image response would be problematic. According to this embodiment of the present invention, minimum channel spacing of 200 kHz is employed, identical to that used by commercial FM broadcast stations.

The Philips TDA7021T FM radio circuit includes all the functions necessary to implement an FM receiver with adequate fidelity, except an audio amplifier. In addition, it exhibits a low current drain, typically 6 mA, and operates at frequencies as low as 1.5 MHz. To allow for multiple channels, however, the receive frequencies at the slave units are preferably set in the range of 10 to 20 MHz.

Furthermore, the low IF results in undesirable in-band RF radiation from the VCO inductor. For example, at a carrier frequency of 10.000 MHz, the VCO operates at 10.000 MHz+0.07 MHz, or 10.070 MHz, which is not far enough away in frequency from 10.000 MHz to avoid pickup by the receiving antenna located very close to the VCO, typically only half an inch away. In most prior art receivers that incorporate the TDA7021T, this coupling of VCO frequency is not problematic because no RF amplifier is used ahead of the mixer. However, the present invention employs such an amplifier to improve transmission range, and the net effect is a relatively large and undesirable VCO signal that can desensitize the mixer stage of the TDA7021T. Accordingly, as shown in FIG. 9, the receiver 14 incorporates a high-gain, low-noise RF amplifier 95 ahead of the TDA7021T FM receiver IC 96. Normally, this technique is not acceptable in systems where a very wide dynamic range is required, such as in commercial FM broadcast receivers. However, in a system according to the present invention, signals will normally be relatively weak, and will vary in strength over a limited dynamic range of 20 to 30 dB. The strongest signal anticipated at the input of the mixer in the receiver IC 96 is well below the mixer's compression threshold. Moreover, the RF amplifier 95 improves system noise performance because its SNR is much better than that of the mixer at the front end of the receiver IC 96. Those skilled in the art will recognize that the noise contribution of the mixer in the receiver IC 96 will be reduced by a factor equal to the gain of the RF amplifier 95.

As shown in FIG. 9, a very small toroidal inductor 98 can be used with the VCO 97 to solve a VCO radiation issue. The small inductor size, in conjunction with very short lead lengths, greatly reduces undesired coupling to the receiving antenna. Further, the toroidal inductor shape is inherently self-shielding. Thus, this unique solution to the problem of signal coupling from the VCO to the RF amplifier results in improved receiver sensitivity and a good signal-to-noise ratio ("SNR") despite the small amount of transmitted magnetic field energy from the transmitter 11.

IV. Multichannel Systems

A. General

The HF band, spanning approximately from 3 to 30 MHz, provides several advantages for the present invention. Two major advantages include component size and multichannel implementation. First, circuit components that operate in this frequency range are relatively small and inexpensive, so that system cost and size are minimized. Second, relatively small wide-band antennas may be employed. Because the antennas are wide-band, multiple transmission channels may be implemented within a signal antenna. In one embodiment of the present invention, the channel separation is set at 200 kHz, with 50 kHz of signal bandwidth per channel.

B. Microcontroller

In multichannel systems according to the present invention, digital channel synthesis for transmit and receive frequencies may be used to facilitate a high density of users. To minimize system complexity, a frequency locked loop ("FLL") may be used to achieve such digital channel synthesis. The FLL contains two basic components: a microcontroller and a voltage controlled oscillator ("VCO"). The FLL can be implemented using a very low cost 8-pin microcontroller such as the Microchip PIC12C508.

The microcontroller performs all system control functions, including synchronization and identification, thus eliminating the need for extraneous system components. For example, the microcontroller can control the synthesized channel selection, and can be programmed to avoid tuning the system to a channel whose harmonic energy falls in the user's chosen broadcast channel.

Since the tasks allocated to the microcontroller in the slave unit are relatively simple and not computationally intensive, the microcontroller may be implemented as an inexpensive 8-bit, 8-pin, device. Preferably, however, the microcontroller includes a frequency count input. By employing such a frequency count input, the microcontroller can perform coarse frequency adjustment of the VCO via a varactor diode, verifying the resulting center frequency at the output of the VCO against the selected frequency using its counter input in a feedback control loop. It should be noted that when using this frequency control method, the transmission frequency must be adjusted using a very slow time constant to avoid interaction with FM modulation of the VCO. This coarse frequency setting is acceptable in a system according to the present invention because the receiver in the control unit at the other end of the wireless link incorporates more complex automatic fine-tuning control ("AFC").

C. Capacity

According to the stereophonic bidirectional embodiment of the present invention, up to four channels may be required per user, including two "up-link" channels and two "downlink" channels. However, when all product and embodiment variations are taken into account, the average number of channels required is actually closer to 2.5. The 0.5 channels for the downlink (slave unit to master control unit) is a slow speed digital control channel, which does not require a lot of bandwidth and need not be used all the time. With this average number of channels, the total number of users that can be accommodated in a given physical area can be calculated as follows:

$$(14 \text{ MHz} - 10 \text{ MHz})\left(\frac{1 \text{ channel}}{0.2 \text{ MHz}}\right)\left(\frac{1 \text{ user}}{2.5 \text{ channels}}\right) = 8 \text{ users}$$

Since the typical system according to the present invention covers the frequency range of 10–14 MHz, the average number of physically coincident users supported is approximately 8 users.

Furthermore, due to the inductively coupled nature of the system according to the present invention, interference between users is significantly reduced. In fact, at a distance of 4 feet from the transmitter, almost no signal is detectable. Of course, the coverage range of the system can be set (i.e., greater or less than 4 feet) as required by the particular application. The use of analog FM modulation schemes further serves to reduce interference between adjacent users due to the "capture" effect inherent in FM systems, whereby the receiver "captures" the strongest signal and weaker signals have no audible effect. Therefore, the only situation in which the system would be prevented from functioning effectively is the very rare instance where a large number of users are concentrated into a 4-foot diameter circle.

D. Channel Synchronization and Tuning

To verify that the receivers are tuned to the correct channel, each transmitter broadcasts a unique identifier at one-second intervals using a PSK-modulated 19 kHz data subcarrier. For stereophonic applications, a bit is included in the unique identifier ("ID") to differentiate the left and right channels. Receivers at both ends of the communication system (i.e., at both the control unit and the slave unit) monitor the transmitted digital data stream modulated on the 19 kHz subcarrier to detect the presence of operating commands and for the presence of the unique identifier of the matching transmitter.

In embodiments of the present invention that implement unidirectional communication only (i.e., control unit to slave unit only), such as the systems shown in FIGS. 1, 2, and 3 (for some embodiments), the slave unit has no means of communicating to its companion transmitter on the control unit that a clear channel has been secured. Therefore, channel synchronization must be achieved manually, and the user must become involved in the channel synchronization process. In other words, the user must listen for a free channel. Once a free channel has been detected, the user can then transmit signals on that free channel. The user first makes an initial channel selection at the control unit transmitter, and makes the same channel selection at the slave unit receiver. The user then listens to the audio output from the slave unit headphones or speaker. If the user hears interference on either the left or right channels (or both), the user must select a different channel on the control unit transmitter, and change the channel selection at the slave unit receiver in the same manner. This simple process is repeated until the user is satisfied that the clearest available channel (or the first available clear channel) has been selected.

In embodiments of the present invention that implement two-way communication (i.e., control unit to slave unit and slave unit to control unit), channel synchronization may be performed automatically, without user involvement or participation, by implementing bidirectional low-speed control channels in addition to the audio channels. For example, in one embodiment of the automatic channel synchronization process, the slave unit and the control unit can agree on a clear channel via a handshaking algorithm, and thus channel synchronization is transparent to the user. However, manual channel selection is also available in the two-way communication systems in the event that the automatic synchronization algorithm fails or the user desires manual override.

V. Specialized Transceiver Integrated Circuit (HFIX)

A. General System

Figure 14:
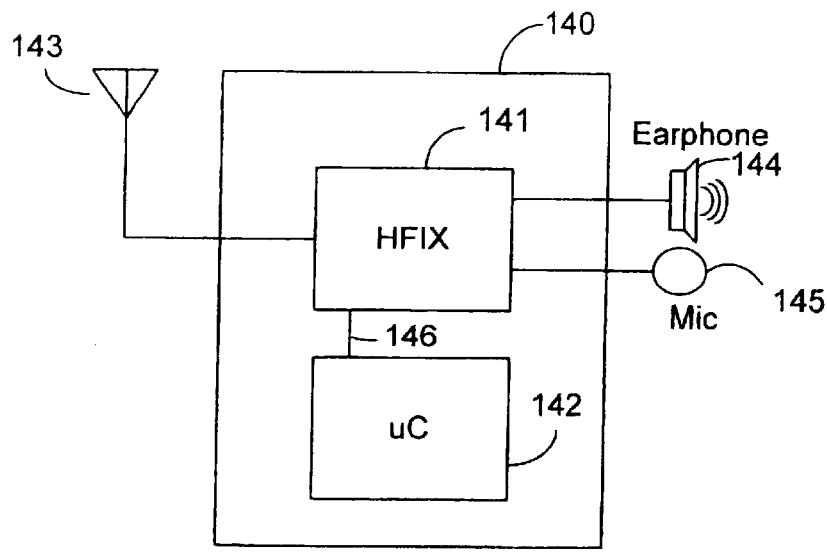
FIG. 14 shows one embodiment of the present invention in which a specialized transceiver integrated circuit (HFIX) is employed in the slave unit.
Figure 15:
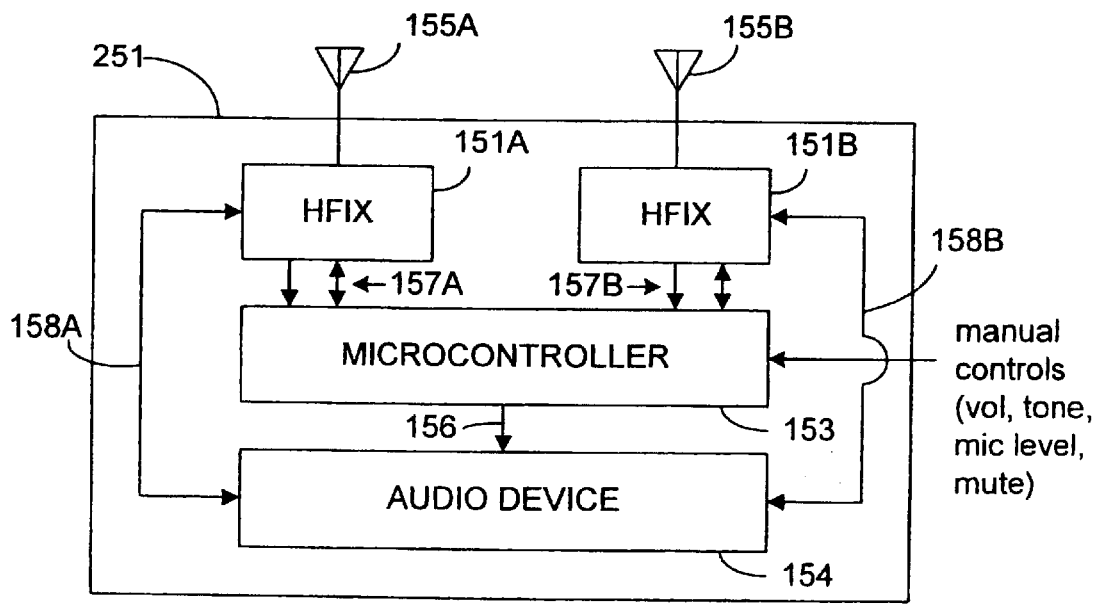
FIG. 15 shows one embodiment of the present invention in which a specialized transceiver integrated circuit (HFIX) is employed in the master control unit.

Referring now to FIGS. 14 and 15, a specialized transceiver integrated circuit in accordance with another embodiment of the present invention, designated as the "HFIX," is incorporated into the design of the control unit 150 (FIG. 15) and the slave unit 140 (FIG. 14). The HFIX is a very low power, full-duplex transceiver IC capable of transmitting and receiving wide-band, low-distortion analog FM signals in the 3 to 30 MHz range. It provides most or all of the functionality needed to implement a variety of wireless, on-body communications systems involving music, voice, or both, and can be selectively configured for one-way or two-way applications, as well as monophonic or stereophonic applications.

Also in accordance with the present invention, when the HFIX is integrated with the slave units and the control unit, the HFIX employs wireless inductive coupling and thus, the HFIX can eliminate the cumbersome wire between a belt-mounted consumer audio device and its associated headphones or headset. Furthermore, the HFIX can provide handsfree operation of a commercial communications device, such as a cellular telephone or cordless telephone. For stereophonic applications, two HFIX devices are required at each end of the wireless link. Further, with up to 20 full-duplex channels, the HFIX can provide reliable performance in high-density user environments because the "sphere" or "micro-cell" coverage area is relatively small. Typically, the radius is less than 1 meter, but other applications can extend the radius to 3 meters. The system will be designed such that for greater capacity in a densely populated area, the radio coverage will be shortened (i.e., up to 1 meter); that is, user densities can approach one person per square meter. For lower capacity in a less populated area and for special applications, the radio coverage is lengthened (i.e., up to 3 meters).

Each HFIX features an independent, wide-band analog FM transmitter and receiver capable of operating in the 3 to 30 MHz HF range. The HFIX device includes two or three separate receiver antenna inputs to allow for diversity reception schemes. The HFIX is designed to interface directly with most microphones and earphones as well as conventional line-level inputs and outputs. Additionally, an on-chip equalization ("EQ") circuit is provided for use with NEAR-PHONES™. The nominal 3-dB bandwidth of the audio frequency response is 50 Hz–15 kHz, with 65 dB signal-to-noise ratio ("SNR") and less than 1% total harmonic distortion ("THD"). The device can operate at a power supply voltage as low as 1.8 Volts to maximize battery life. At this power supply voltage, current drain may be as low as 2 mA during active reception and 100 $\mu$A during standby mode.

Up to 20 separate full-duplex audio channels are available, and the device includes an integral 1 k-baud wireless body area network ("BAN") using a phase-shift keyed ("PSK") modulated 19 kHz subcarrier. The wireless BAN facilitates remote control of all receiver functions from the transmitter, and a register-control architecture with serial data access minimizes the device input/output ("I/O") pin requirements. Additionally, transmit and receive tuning voltage output pins allow for a wider operating frequency range and more transmission channels by using external varactor tuning diodes.

TABLE 1 summarizes the electrical characteristics of the HFIX, in accordance with one embodiment of the present invention.

TABLE 1

HFIX Electrical Characteristics

| Symbol | Characteristic | Min | Typ | Max | Units |
|---|---|---|---|---|---|
| Vdd | Supply voltage | 1.8 | 3.0 | 3.6 | V |
| Idd | Supply current (Vdd = Vpa = 3 V) | | | | |
| | Standby | | 25 | 100 | µA |
| | Receive (TXENBL = 0) | | 2 | | mA |
| | Low-power transmit | | 5 | | mA |
| | High-power transmit | | 20 | | mA |
| Vcp | Charge-pump voltage | | 8 | | V |
| Icp | Current available at Vcp | | | 1 | mA |
| Vaf | AF subsystem supply voltage | 1.8 | | 8 | V |
| Vpa | Transmit RF amp external supply voltage | 1.8 | | 10 | V |
| Vrx,Vtx | Varactor tuning voltage | 0 | | Vcp | V |
| Prf | RF output power | | | | |
| | Low-power transmit | | 5 | | mW |
| | High-power transmit | | 50 | | mW |
| Frf | Operating frequency range | 2.0 | | 50 | MHz |
| Faudio | Audio frequency range | 0.050 | | 20 | kHz |
| Fsc | Host interface serial data clock speed | DC | | 1 | MHz |
| Fvco | VCO frequency range (receive and transmit sections) | 1.5 | | 50.5 | MHz |
| Fref | Synthesizer reference oscillator frequency | DC | | 5 | MHz |
| Fban | Body-area network ("BAN") data | 0.95 | | 1.05 | Kbaud |
| Fsub | Subcarrier frequency | 18.7 | | 19.3 | kHz |

It should be noted that the supply voltage for the AF amplifier and associated circuitry can be higher than Vdd if desired to maintain low distortion at high AF output levels. Similarly, Vaf can be connected to Vdd for use with most low-power earphones or earbuds.

A wireless, stereophonic application according to one embodiment of the present invention which incorporates the HFIX is shown in FIGS. 14 and 15. In FIG. 15, a small control unit 150, worn on the belt of the user or located in another suitable on-body location, incorporates two HFIX devices 151A and 151B, a microcontroller 153, and two antennas 155A and 155B. A conventional audio device 154, such as a commercially available CD player, commercial FM receiver, or cellular telephone, is also incorporated into the control unit 150.

One HFIX 151A is coupled to antenna 155A, and the other HFIX 151B is coupled to antenna 155B. Each HFIX 151A, 151B is coupled to microcontroller 153 and audio device 154. HFIX 151A is coupled to microcontroller 153 via lines 157A. HFIX 151A is also coupled to audio device 154 via lines 158A. HFIX 151B is coupled to microcontroller 153 via lines 157B. HFIX 151B is also coupled to audio device 154 via lines 158B. Lines 158A and 158B carry data messages. Lines 157A and 157B are an industry-standard I²C serial interface lines that carry control and data messages. Microcontroller 153 is coupled to audio device 154 via lines 156. Line 156 carries control messages. External manual controls such as volume, tone, microphone level, and mute are provided as inputs to microcontroller 153 via lines 152.

Two inconspicuous slave units are also provided for the other end of the wireless link. FIG. 14 shows one slave unit 140, in the form of transceiver earphone/microphone units. In other embodiments, two slave units are used, one for each ear. Slave unit 140 includes HFIX 141, microcontroller 142, earphone/speaker 144, microphone 145, and antenna 143. In this embodiment, antenna 143 is coupled to HFIX 141. The HFIX 141 is coupled to microcontroller 142 via lines 146. For the user interface, earphone/speaker 144 and microphone 145 are coupled to HFIX 141. Lines 146 carry control information.

To eliminate the need for an on-off switch at the slave unit 140, its microcontroller 142 can power the system down if no carrier is detected for a programmable time period. The receiver's audio frequency ("AF") output is automatically muted if the carrier signal strength drops below a certain level, so that microcontroller 142 can check for carrier presence at infrequent intervals, typically on the order of one second.

All HFIX functions are configured and controlled using the HFIX control registers, as detailed in TABLE 3 (see below). As shown in FIG. 15, an industry-standard I²C serial interface 157A,157B is implemented between each HFIX device 151A,151B, and 141 and its associated microcontroller, either the control unit microcontroller 153 or the slave unit microcontroller 140 to minimize the number of host microcontroller pins required. Under control of each microcontroller, serial data can be clocked in or out of each HFIX at clock speeds up to 1 MHz.

In accordance with one embodiment of the present invention, a belt-mounted HFIX transmitter (control unit) can control a companion ear-mounted HFIX receiver (slave unit). This configuration is typically used to eliminate head-mounted volume, tone, and mute controls, and to synchronize transmission channels.

According to one embodiment of the present invention, because the slave units 140 are physically very small, they do not contain their own manual volume or other controls. Moreover, such controls are often difficult to use, in this case complicated by the need for stereophonic audio channels. Also, varying environmental noise levels or custom system features may require adaptive earpiece volume control. As the name implies, adaptive volume control changes the earpiece volume as the environmental sound/noise changes. Thus, as environmental noise increases, the earpiece volume in the slave unit increases. Analogously, as the environmental noise decreases, the earpiece volume in the slave unit decreases. In one embodiment, the adaptive earpiece volume control is implemented electronically, in conjunction with ear-mounted microphones arranged for anti-VOX.

Because of the size constraints in the slave unit 140, the volume and tone controls are preferably mounted at the control unit 150, as shown in FIG. 15. Referring to FIG. 15, volume and other controls are sampled periodically by the microcontroller 153 in the control unit 150, which sends commands via the control unit transmitters 151A and 151B to the slave units, one of which is shown in FIG. 14 as slave unit 140. Referring to FIG. 14, volume and tone settings are then set by the microcontroller 142 in the slave unit 140 via programmable registers, as discussed more fully below.

In addition to the receiver volume and other controls, the control unit 150 must include an input level control to set the microphone level appropriately for the down-link channels (i.e., slave unit transmissions to control unit). As long as the microphone level at the slave unit 140 is within its linear range, the microcontroller 153 in the control unit 150 can establish the appropriate recording levels by directly controlling the HFIX receiver volume register.

Body area network ("BAN") remote packet errors as well as RSSI can be used to indicate the presence of excess interference. Upon detecting either BAN remote packet errors or RSSI above a specified threshold, the microcontroller 153 in the control unit 150 can select new operating frequencies. However, as soon as the control unit switches channels, the slave unit 140 must begin a re-synchronization process.

In an alternative embodiment, manual frequency selection can be employed instead of automatic resynchronization. A manual switch can be provided on the control unit that forces the transmitters to warn their companion receivers at the slave units that a channel change is about to occur. The new channel allocation is then transmitted, along with a suggested coordination channel to be used in the event that synchronization is lost due to signal path problems or interference.

B. HFIX

1. Functional Block Diagram of IC

Figure 16:
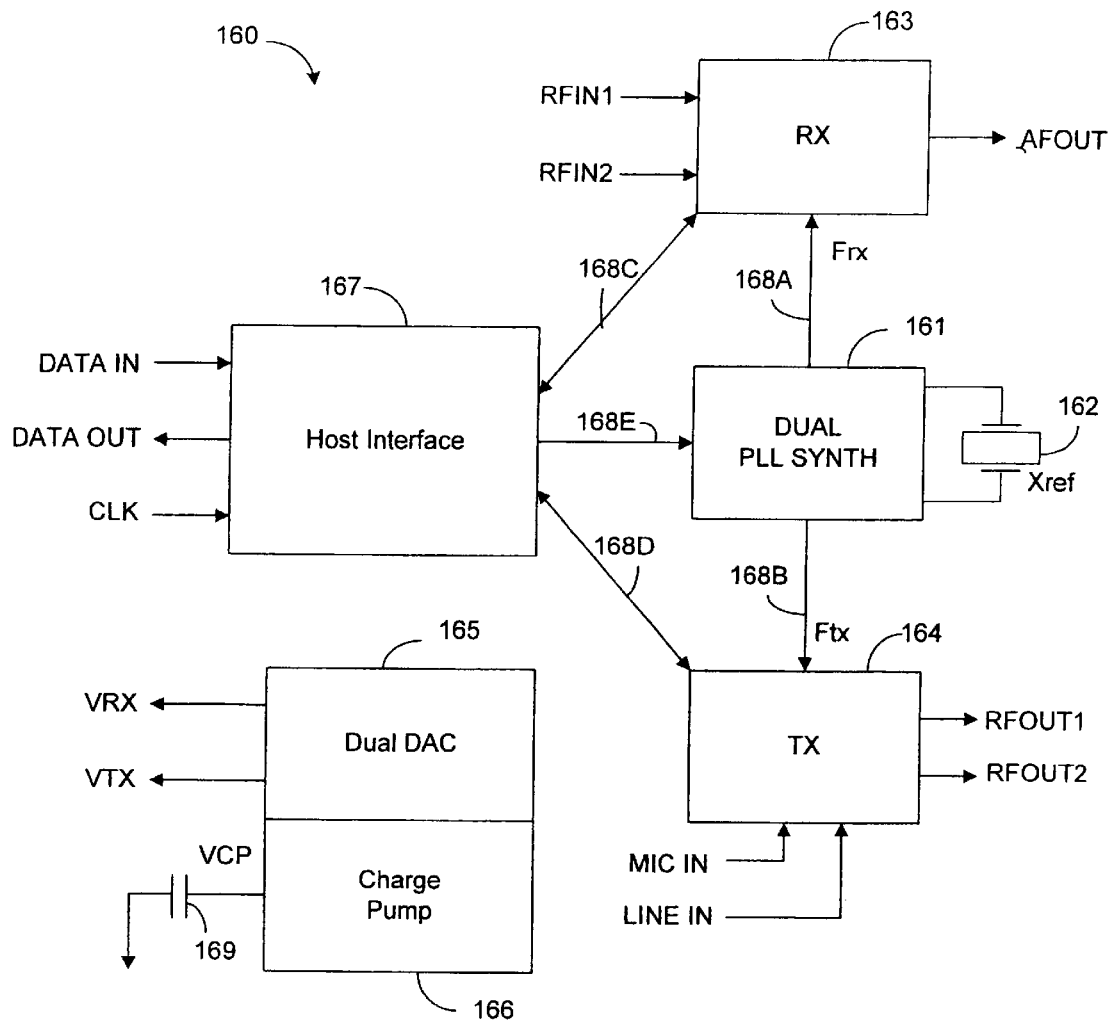
FIG. 16 shows a high level block diagram of the HFIX in accordance with one embodiment of the present invention.

Referring now to FIG. 16, a high level block diagram of the HFIX IC 160 is shown. This HFIX 160 is the same IC first shown and described with respect to FIG. 14 (HFIX 141) and FIG. 15 (151A and 151B). The HFIX 160 includes a low-noise, dual phase-locked loop ("PLL") synthesizer 161, crystal reference oscillator 162, receiver 163, transmitter 164, host interface 167, dual digital-to-analog converter (DAC) 165, and charge pump 166.

Host interface 167 receives data via the DATA IN input and clock signals via the CLK input. The host interface 167 sends out data via the DATA OUT output. The host interface 167 sends and receives data/control information to and from the receiver 163 via line 168C. Similarly, the host interface 167 sends and receives data/control information to and from the transmitter 164 via line 168D. The host interface 167 also sends control information to the dual PLL synthesizer 161 via line 168E.

The low-noise, dual PLL synthesizer 161 generates independent transmit Ftx and receive Frx local oscillator signals to the receiver 168 via line 168A and the transmitter 164 via line 168B, respectively. The synthesizers share a crystal reference oscillator 162 and reference divider (not shown), but the voltage-controlled oscillators ("VCOs"), phase comparators, and VCO dividers are separate, as described in more detail below.

The receiver 163 receives RF input signals at input ports RFIN1 and RFIN2. These ports RFIN1 and RFIN2 are coupled to separate antennas, or in the alternative, one common antenna. For a slave unit, the RFIN1 port is designated for signals coming from one transmission channel of the control unit and RFIN2 is not used. Alternatively, RFIN1 and RFIN2 are ports for two RF signals to be processed in accordance with a particular diversity scheme, as programmed and configured in the receiver 163. For the control unit, RFIN1 is designated for one RF signal coming from one slave unit, while RFIN2 is designated for the other RF signal coming from the other slave unit. The receiver 163 provides a demodulated and processed (e.g., de-emphasis, amplification) signal in the form of an audio frequency signal, in one embodiment, at the AFOUT port. This audio frequency signal is routed to a speaker (not shown) in the slave unit. In the control unit, the signal from the AFOUT port is routed to an audio device such as the line input port for a cellular telephone and/or the host interface 167 for further processing by the microcontroller 153 (see FIG. 15).

The transmitter 164 receives audio input at the port MIC IN. It can also receive data from line input at port LINE IN. After modulation and other processing (e.g., pre-emphasis, amplification), the RF signals are routed to ports RFOUT1 for one channel and RFOUT2 for the other channel. These outputs are coupled to a common antenna, or in an alternative embodiment, two separate antennas for transmission. In the slave unit, only one port (e.g., RFOUT1) is used to transmit the RF signal. In the control unit, both ports RFOUT1 and RFOUT2 are used for the two up-link channels.

The on-chip charge-pump 166 provides an 8-volt regulated reference for the two 8-bit DACs 165. The charge dump is also coupled to capacitor 169 to ground.

DAC outputs VRX and VTX are set using their corresponding registers as detailed in TABLE 3. These outputs are intended to facilitate electronic tuning of high-Q receiver and transmitter antennas. Since transmitter antenna tuning is normally performed open-loop (i.e., without an RF power output indicator), a table of DAC values for VTX with respect to frequency is typically calculated at the time of manufacture and stored in a conventional EEPROM or ROM on the host microcontroller. For receive antenna tuning, the RSSI register may provide useful feedback information.

It should be noted that the peak-to-peak voltage detected by the transmit tuning varactors (not shown) may be quite high when high transmitted power is selected, possibly leading to harmonic distortion. To minimize this effect, the minimum required tuning range may be used. For a 15 MHz carrier frequency, this range would be on the order of 600 KHz. Alternatively, back-to-back varactor diodes may also be employed. If an extremely wide transmit frequency range is to be covered, additional varactors in series or PIN diode switching of tuned circuit elements may be required. Varactor drift with temperature should be considered if high-Q antenna systems are used.

2. Receiver in the HFIX

Figure 17:
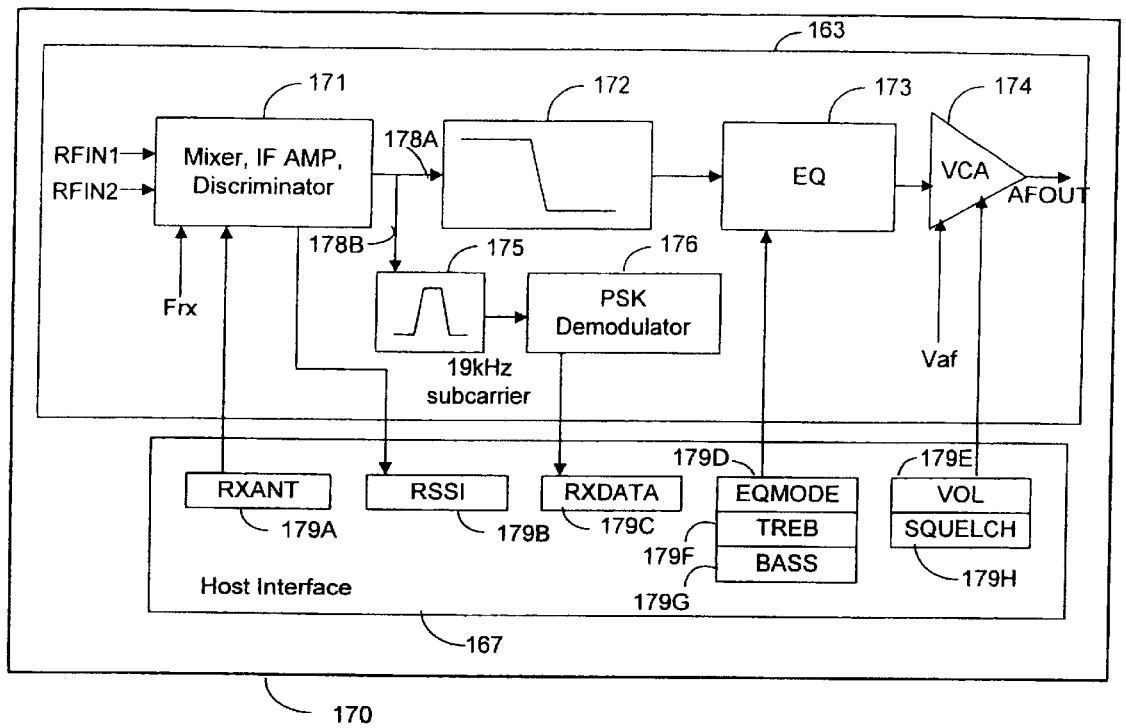
FIG. 17 shows a block diagram of the receiver portion of the HFIX.

FIG. 17 shows a receiver subsystem 170, which includes the receiver 163 and the portion of the host interface 167 that concerns the receiver. The HFIX incorporates a wide-band, analog FM receiver subsystem optimized for low-voltage, low-current operation over a broad frequency range.

The receiver subsystem 170 includes a mixer/IF amplifier/discriminator stage 171, which receives two RF signals at ports RFIN1 and RFIN2, as well as data from a RXANT register 179A from the host interface 167. Either of the two available receiving antenna inputs RFIN1 or RFIN2 can be automatically selected using the RXANT register 179A, thus facilitating the use of diversity reception schemes to eliminate undesirable multipath signals as well as selecting the optimally coupled signal.

The mixer/IF amplifier/discriminator stage 171 implements a low Intermediate Frequency ("IF") stage operating at approximately 70 kHz to facilitate the use of RC IF filters and discriminators. The ability to use RC IF filters and discriminators reduces system size and cost, while still providing excellent audio fidelity. The unnecessary resulting RF image response is eliminated through the use of an image canceling mixer/oscillator configuration. The mixer/IF amplifier/discriminator stage 171 receives the reference receive oscillator signal Frx from the dual PLL synthesizer 161 (see FIG. 16).

The mixer/IF amplifier/discriminator stage 171 also provides data to the RSSI register 179B of the host interface 167. This data is a digitized representation of the received signal strength indicator.

The output of the mixer/IF amplifier/discriminator stage 171 is routed to two circuit branches. In the first circuit branch 178A, a low-pass filter 172 removes the 19 kHz pilot subcarrier from the audio output signal. In the second branch 178B, a 19 kHz band-pass filter 175 selects the subcarrier itself for demodulation. If data is detected on the 19 kHz subcarrier, it is checked for proper framing and parity as it is shifted into the RXDATA register 179C in the host interface 167 by the PSK demodulator 176 for later use by the host through the control registers (see TABLE 3). In one embodiment of the present invention, the serial data communication protocol includes 1 start bit, 1 stop bit, 8 data bits, and odd parity. If framing and parity are correct, the DATARDY bit in the STATUS register of the HFIX is set.

The output of the lowpass filter 172 is provided to an equalization block 173, which is tailored for use with specific AF output transducers. The host interface 167 provides various data to the equalization block 173 via registers EQMODE 179D, TREB 179F, and BASS 179G. The EQMODE register 179D is used to select between normal and NEARPHONE™ EQ mode, while the TREB 179F and BASS 179G registers provide generic audio passband shaping.

Upon processing by the equalization block 173, the signal is provided to a low-distortion voltage controlled amplifier ("VCA") 174. A reference voltage signal Vaf is provided to the VCA 174. The host interface 167 provides data from the registers VOL 179E and SQUELCH 179H to the VCA 174. The final AF output level may be set via the VOL register 179E, although an external potentiometer (not shown) may also be used. Finally, a SQUELCH level register 179H is also provided.

3. Transmitter in HFIX

Figure 18:
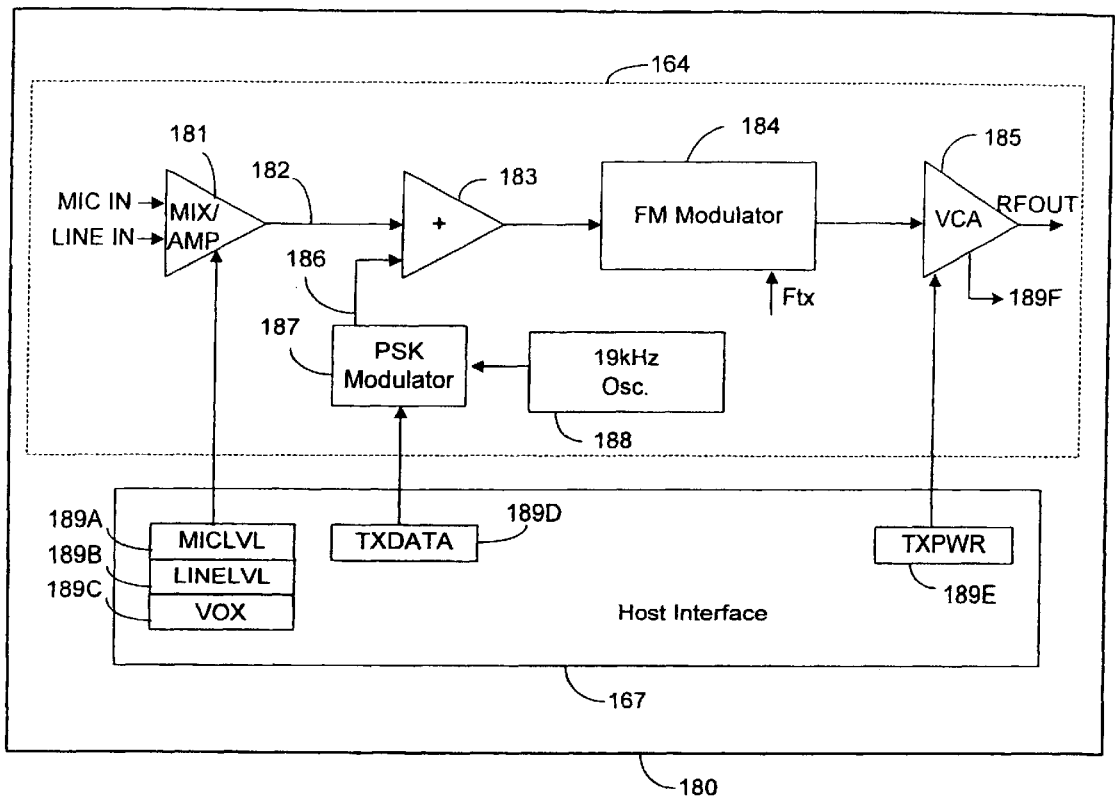
FIG. 18 shows a block diagram of the transmitter portion of the HFIX.

FIG. 18 shows a transmitter subsystem 180, which includes the transmitter 164 and the portion of the host interface 167 that concerns the transmitter. The HFIX incorporates a wide-band, analog FM transmitter subsystem optimized for low-voltage, low-current operation over a broad frequency range.

The transmitter 164 includes a mixer/amplifier stage 181, which includes a high-impedance microphone input MIC IN and a 600Ω line-level input LINE IN. The mixer/amplifier stage 181 eliminates the need for an external source selection mixer. The host interface 167 provides data from the registers MICLVL 189A, LINELVL 189B, and VOX 189C. The appropriate gain levels are set using the MICLVL 189A and LINELVL 189B registers, in lieu of or in conjunction with an external potentiometer (not shown). Transmit efficiency can be improved using a voice-operated relay ("VOX"). If the sum of the audio inputs drops below a level determined by the value stored in VOX register 189C, the transmitter will be completely disabled. If so desired, the VOX register 189C can be set to a value of 0 to leave the transmitter enabled continuously.

The output of the mixer/amplifier stage 181 is provided to a conventional audio summing circuit 183 via line 182. The other input 186 to the summing circuit 183 is provided by the output of PSK modulator 187. Control data stored in the TXDATA register 189D in the host interface 167 is modulated by the PSK modulator 187 onto a 19 kHz subcarrier generated by a fixed 19 kHz oscillator 188. The mixed, amplified AF input 182 is summed with the 19 kHz PSK-modulated subcarrier on line 186 by the summing circuit 183 and then applied to the FM modulator 184. The FM modulator 184 also receives the reference transmitter oscillator signal Ftx from the dual PLL synthesizer 161 (see FIG. 16). It should be noted that unlike commercial FM communications schemes, the 19 kHz subcarrier according to the present invention is used only for data communication purposes and does not provide FM stereo multiplex capabilities.

Data inserted into the TXDATA register 189D by the host microcontroller is immediately transmitted via analog frequency modulation ("FM") of the 19 kHz subcarrier. Transmission will always take place, even if the transmitter has been disabled or the audio input is below the current VOX threshold. The serial data format according to one embodiment of the present invention is 1 start bit, 1 stop bit, 8 data bits, and odd parity. The microcontroller is also responsible for implementing a BAN protocol, error checking, and all other communication and control functions. The BAN protocol can be an 8-bit serial on-off keyed with parity checking.

At the output of the FM modulator 184, an RF output amplifier 185 operates either as a class A (low-power, 5 mW) or class C (high-power, 50 mW) amplifier, depending on the value stored in the TXPWR register 189E in the host interface 167. Class A operation is used at low power to minimize output filtering requirements, while class C operation provides efficient high-output levels for long range operation or for use with inductive coupling. If high power is to be used, the VPA pin 189F of the HFIX IC must be connected to a DC source through a suitable RF choke (not shown) (see TABLE 2).

4. HFIX I/O Pins

TABLE 2 lists and describes all the HFIX input and output pins, in accordance with one embodiment of the present invention.

TABLE 2

HFIX input and output pins.

| Pin | Name | Description |
| --- | --- | --- |
| 20 | VDD | Supply voltage |
| 10 | VSS | Substrate and signal ground |
|  | VAF | AF subsystem supply voltage, usually connected to VDD. This pin is provided because higher voltages may be required to minimize distortion with some transducers. Note: VCP is not recommended for use as the AF amplifier supply voltage due to inadequate available current as well as switching noise. |
| 2 | VPA | Transmit power amplifier external supply pin. If high-power transmit mode is to be used, this pin must be connected to Vdd or a separate DC supply through an appropriate RF choke. The choke is effectively disconnected during low power transmit. |
| 3 | VCP | On-chip charge-pump pin. A 10 μF capacitor (type??) must be connected between Vcp and ground if the VTX and VRX varactor-tuning voltages are required. If both the VTX and VRX registers are set to 0, the charge pump circuit is disabled to |

TABLE 2-continued

HFIX input and output pins.

| Pin | Name | Description |
|---|---|---|
| 4 | RFOUT | conserve power.<br>Transmitter RF output (Z = 50Ω nominal, Po = 5mW). In low-power mode, the final amplifier stage is biased class A and is powered internally from Vdd. In high-power mode, the final amp bias is removed to force class C operation, with the VPA pin supplying the collector voltage via an RF choke. |
| 5 | RFIN1 | Receiver RF input #1 (Z = 1 kΩ) |
| 6 | RFIN2 | Receiver RF input #2 (Z – 1 kΩ) |
| 7 | VTX | Transmit antenna varactor-diode tuning voltage, 0 to Vcp. This 8-bit DAC output can be used to tune a high-Q transmit antenna system. The DAC reference voltage, Vcp, is derived from an on-chip charge pump. (See VTX register in TABLE 3.) |
| 8 | VRX | Receive antenna varactor-diode tuning voltage, 0 to Vcp. Similar to VTX (above). |
| 9 | FRX | Receiver synthesizer output (used for system test) |
| 11 | FTX | Transmitter synthesizer output (used for system test) |
| 12 | AFOUT | Receiver AF output (Z = 30 to 200Ω) |
| 13 | MICIN | Transmitter microphone input (Z = 10k). VDD can be used as the supply voltage for condenser mics. VCP is not recommended for this because of switching noise at the VCP pin. |
| 14 | LINEIN | Transmitter line-level audio input (Z = 600Ω) |
| 15 | DATAIN | Serial control data in |
| 16 | DATAOUT | Serial control data out |
| 17 | DATACLK | Serial control clock input |
| 18 | XREFIN | Synthesizer reference clock input (or crystal) |
| 19 | XREFOUT | Synthesizer reference clock output (or crystal) |

5. HFIX Control Registers

All HFIX control registers, in accordance with one embodiment of the present invention, are listed in TABLE 3. Register address and data are sent and received via the serial data lines (DATA IN, DATA OUT, and CLK) using a standard serial access protocol, such as SPI (serial peripheral interface).

TABLE 3

HFIX control registers.
The Address column shows the 6-bit Register address as ASCII hex.
In the Rd/Wrt column, [n] specifies the number of bits to be read or written.

| Register | Address | Rd/Wrt [n] | Description |
|---|---|---|---|
| STATUS | 00h | R[6] | Status register. Bits are defined as follows:<br>0 (DATARDY): 1= RXDATA register full<br>1 (CD):  1 = carrier usable (RSSI□3)<br>2 (TD):  1 = 19 kHz tone detected<br>3–5 (TST):  reserved for testing |
| TXPWR | 01h | W[1] | 1 = enable high-power transmit (Po = 50 mW max)<br>0 = disable low-power transmit (Po = 5 mW max) |
| RXANT | 02h | W[1] | 0 = select RX antenna #1<br>1 = select RX antenna #2 |
| VRX | 03h | W[8] | Sets receive antenna tuning voltage, n = 00h-FFh. Actual voltage is equal to (n/256)*Vcp. The appropriate values for VRX depend on receiver antenna circuit configuration, varactor diode used, and Vcp. Note: If both VRX and VTX are set to 00h, the charge pump is turned off to conserve power. |
| VTX | 04h | W[8] | Sets transmit ant. tuning voltage, n = 00h-0FFh. Actual voltage is equal to (n/256)*Vcp. Same considerations as VRX, above. |
| TXENBL | 05h | W[1] | 1 = enable transmitter;<br>0 = disable (power-down the transmit subsystem) |
| RXENBL | 06h | W[1] | 1 = enable receiver;<br>0 = disable receiver (power-down the receive subsystem) |
| RSSI | 07h | R[4] | Digitized RSSI value. RSSI of 00h indicates a very weak or nonexistent signal; RSSI of 0Fh indicates a very strong signal. In general, an RSSI value of less than 05h indicates a marginal wireless link. The receiver is automatically muted if RSSI is < 03h. The CD bit in the STATUS register is set if the RSSI is □ 03h. |

TABLE 3-continued

HFIX control registers.
The Address column shows the 6-bit Register address as ASCII hex.
In the Rd/Wrt column, [n] specifies the number of bits to be read or written.

| Register | Address | Rd/Wrt [n] | Description |
| --- | --- | --- | --- |
| VOL | 08h | W[8] | Volume control register. VOL = 00h is equivalent to MUTE. TREB = 80h is the volume "midrange" setting. VOL = FFh is the maximum volume. |
| TREB | 09h | W[8] | Treble control register. TREB = 00h signifies maximum treble attenuation. TREB = 80h is the treble "midrange" setting. TREB = FFh signifies maximum treble boost. |
| BASS | 0Ah | W[8] | Bass control register. BASS = 00h signifies maximum bass attenuation. BASS = 80h is the bass "midrange" setting. BASS = FFh signifies maximum bass boost. |
| SQUELCH | 0Bh | W[4] | Squelch level, 00h-0Fh. If the average AF input level to the VCA drops below the selected threshold, the AF output will be muted. A level of 00h disables the squelch circuitry. (See also RSSI.) |
| TXDATA | 0Ch | W[8] | Used to send application-specific data to a companion receiver via the wireless BAN. At the receive end, the data is stored in the RXDATA register. The transmitter must be enabled (TXENBL = 1) before writing to TXDATA. |
| RXDATA | 0Dh | R[8] | Used to retrieve application-specific data from a companion transmitter. The DATARDY bit in the STATUS register is set upon receipt of properly framed BAN data. Reading the RXDATA register clears the DATARDY bit. |
| EQMODE | 0Eh | W[1] | EQ selection (0 = normal; 1 = NearPhones). NearPhones are optimized for transparent (non-occluding) operation, and require additional gain as well as bandpass shaping. |
| VOX | 0Fh | W[4] | Sets optional VOX threshold, 00h-0Fh. If the average AF input drops below the specified level during any 2-second period, the transmitter is automatically turned off. VOX = 00h disables VOX completely, leaving the transmitter enabled continuously. (Note: The appropriate VOX threshold setting will vary with the MICLVL and LINELVL settings.) |
| MICLVL | 10h | W[4] | Sets the MICIN gain level, 00h-0Fh. Recommended settings: Low-Z (dynamic) microphones, MICLVL = 0Ch; High-Z microphones, MICLVL = 08h. |
| LINELVL | 11h | W[4] | Sets the LINEIN gain level, 00h-0Fh. The standard setting is LINELVL = 08h. |
| REFDIV | 12h | W[4] | Sets the reference divider value. |
| RXFREQ | 13h | W[10] | Receiver synthesizer frequency control register. |
| TXFREQ | 14h | W[10] | Transmitter synthesizer frequency control register. |

Figure 20:
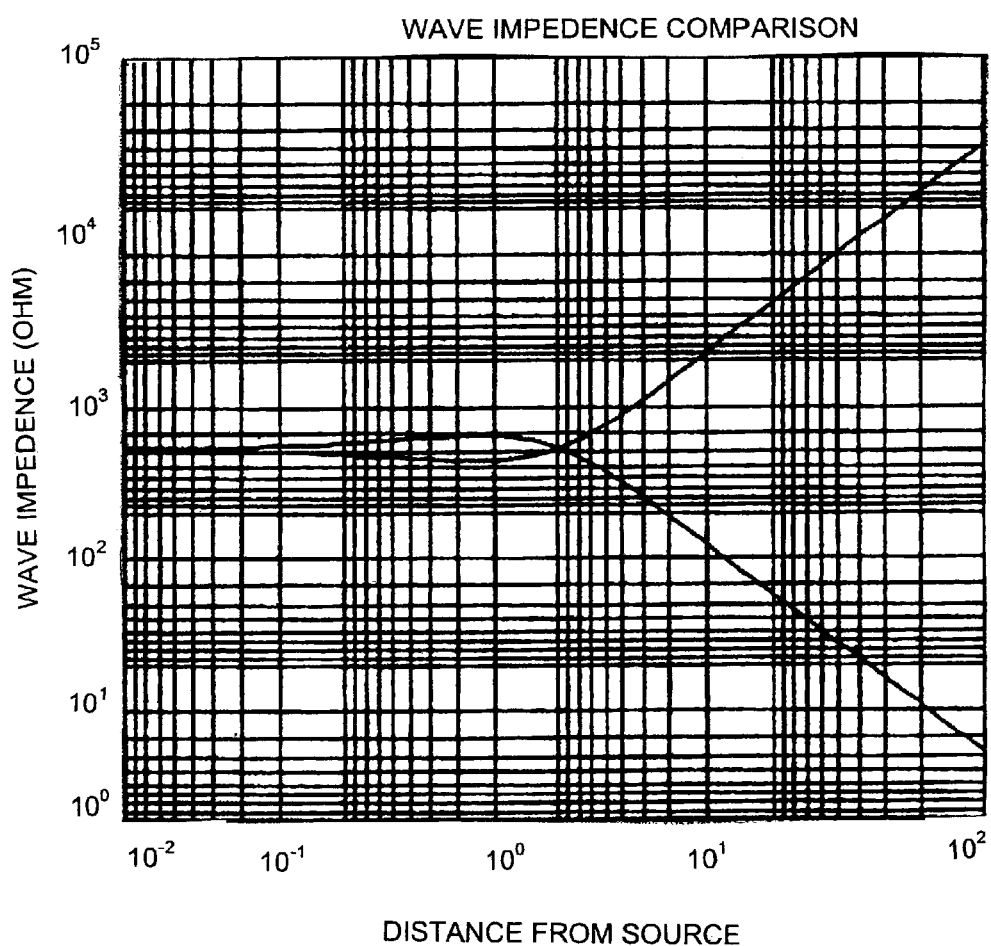
FIG. 20 is a graph illustrating a comparison of electric field predominant and magnetic field predominant wave impedance.

As shown in FIG. 20, the serial access protocol begins with a fixed 6-bit register address. As detailed in TABLE 3, a variable number of data bits is then sent or received depending on the register being addressed. For example, the RXENBL register is only one bit wide, while the RXFREQ register in the frequency synthesizer requires 10 bits.

VI. Antennas

A. General Considerations

The performance of the wireless communication system according to the present invention is dependent on the performance of the transmitting and receiving antennas. As is well known in the art, antennas and their associated circuitry are filters. Generally, filters are devices that receive an input waveform and modify its frequency spectrum to produce an output waveform. Filters use energy storage elements such as inductors and capacitors to obtain frequency discrimination. However, in any practical filter, the energy storage elements are imperfect. For example, a physical inductor has some series resistance as well as inductance, and a physical capacitor has some shunt, or leakage, resistance as well as capacitance.

The quality, or Q, of a filter is a figure of merit that quantitatively describes the frequency selectivity of the filter. For a given resonant frequency $f_o$ and a 3-dB bandwidth B, Q is defined as the ratio of $(f_o/B)$. Thus, larger values of Q indicate better frequency selectivity, since for a given resonant frequency $f_o$, the resulting 3-dB bandwidth would be smaller. Depending on the type of energy storage elements used and their physical construction, filters can be designed with different Q values at varying operating frequencies and channel bandwidths. Active filters, which typically incorporate operational amplifiers with RC circuit elements, are practical only at relatively low frequencies, since the operational amplifiers need to have a large open-loop gain over the operating bandwidth. Generally, RC active filters are generally preferred over LC passive filters at lower frequencies, because the size of LC components becomes large and the frequency selectivity Q of the inductors becomes small at lower frequency ranges. However, it is important for the Q to not become excessively high. A moderate Q allows efficient energy transfer from transmitter to receiver while providing for multiple channels within the antenna bandwidth. If the Q is too high, the resulting narrow frequency band prevents the implementation of multiple channels. If the Q is too low, the amplitude response is degraded and too many undesirable channels are included.

Although the near-field transceiver according to the present invention is essentially an inductively coupled transformer, it has a very small coupling coefficient. Therefore, once an operating frequency and bandwidth are selected, the transmitter and receiver antenna designs can be optimized independently, within their own constraints of power consumption, size, and other design considerations. However, as discussed more fully below, a mutual dependence exists with respect to selecting the optimum operating frequency.

The transmitter antenna is implemented as a coil with multiple turns through which the maximum allowable current is passed, given a specified transmitter average power and power supply voltage. A series resonant circuit designed to yield an effective Q suitable for the required bandwidth can be employed for this purpose. For example, at an operating frequency of 10 MHz and a channel bandwidth of 100 kHz, a Q of approximately 100 may be used.

The purpose of the transmitter according to the present invention is to generate the maximum possible magnetic flux change at the receiver, given the constraints imposed by the desired size, bandwidth, power consumption, and other design considerations. Thus, the primary design goal for the transmitter is to maximize the product (NSIω), i.e. the number of turns in the antenna coil (N), its area (S), the current (I) through it, and the selected operating frequency (ω).

With conventional omnidirectional antennas, signal strength decreases $1/r^6$ as the distance from the source r increases. In contrast, with directional antennas, signal strength decreases $1/r^8$ as r increases. Thus, signal strength drops off more sharply with conventional omnidirectional antennas than with directional antennas.

B. Antenna Structure

Figure 11A:
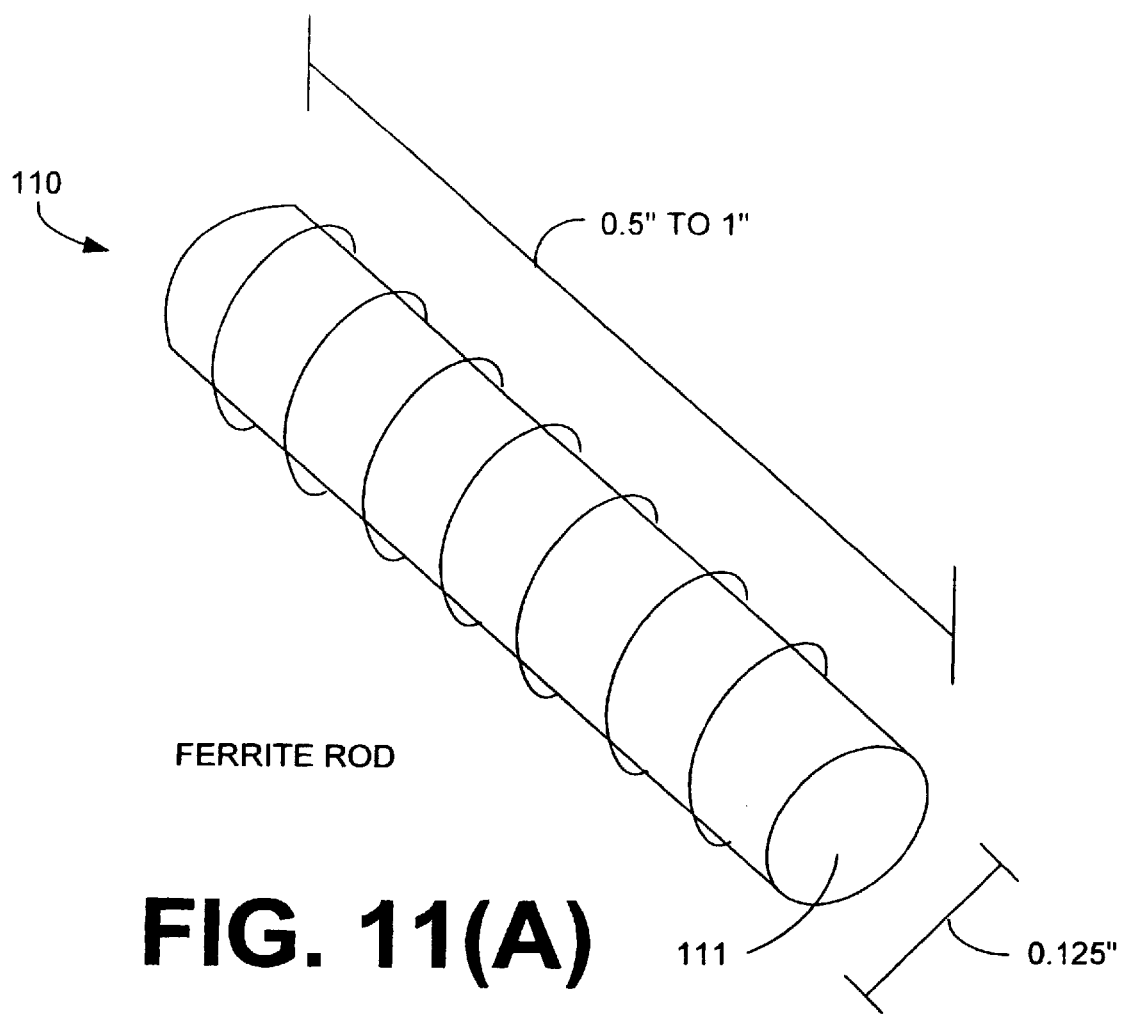
FIGS. 11(A) and 11(B) illustrate the winding of the antenna coil according to two embodiments of the invention.
Figure 11B:
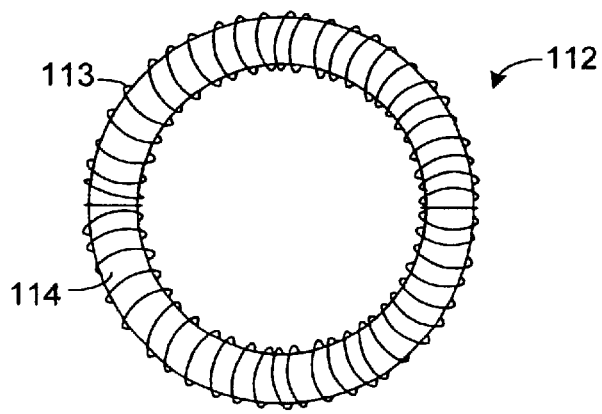

In one embodiment of the present invention, the antennas can be tuned over a wide frequency using either varactor tuning and/or PIN diode switches. Moreover, each antenna is also coaxial. Thus, as shown in FIG. 11(A), according to one embodiment of the present invention, the antenna 110 is wound on a ferromagnetic rod 111 that is 0.5 inch to 1 inch long, and approximately 0.125 inch in diameter. In one embodiment, the ferromagnetic rod 111 is a ferrite rod and the antenna 110 is a 26 AWG copper wire. This small antenna size results in a very thin overall package. Additionally, the high permeability of the ferrite rods allows for a small number of turns, which in turn keeps interwinding capacitance low and frequency selectivity Q high. However, it is important for the Q to not be excessively high. A moderate Q allows efficient energy transfer from transmitter to receiver while providing for multiple channels within the antenna bandwidth. For illustrative purposes, FIG. 11(A) shows an antenna 110 that has seven turns around ferromagnetic rod 111. In another embodiment, FIG. 11(B) shows a circular antenna 112. Antenna 112 includes coil 113 wound around a circular ferromagnetic rod 114. This antenna can be constructed by joining together the ends of the antenna 110 shown in FIG. 11(A).

C. Antenna Orientation

1. General

Since the system is inductively coupled, the transmitting and receiving antennas must be properly oriented with respect to each other. In one embodiment of the present invention, space diversity techniques are used. In another embodiment, the antennas are pivotally mounted. These antenna diversity and mounting techniques are necessary because, in one embodiment, the wireless system is designed to be worn on the body, specifically the head for the slave units and the waist for the control units.

To ensure that the inductively coupled link is optimal (i.e., the transfer of magnetic energy from one inductive circuit to another inductive circuit is maximum), the "face" of the inductors should be substantially parallel. In other words, the windings axis (i.e., about which the wire is wound) of one inductor should be substantially parallel and be spatially close to the windings axis of the other inductor. In some cases where the axes are straight lines (e.g., wire wound around a straight rod), the two axes should also be substantially parallel. If the two inductors are oriented 90 degrees with each other, they are least effective for inductive coupling.

Generally, the antennas do not have to be parallel to each other for acceptable performance. Even those antennas that are oriented at some angle less than 90 degrees will provide adequate performance where the difference is only a few decibels. Even antenna orientation of 45 degrees provides adequate SNR levels. As the antennas approach 90 degrees orientation with respect to each other, the performance decreases by as much as 20 dB SNR. Of course, as known to those skilled in the art, antenna orientations at angles greater than 90 degrees are equivalent to antenna orientation at angles less than 90 degrees. Thus, 135 degrees is equivalent to 45 degrees.

Figure 12A:
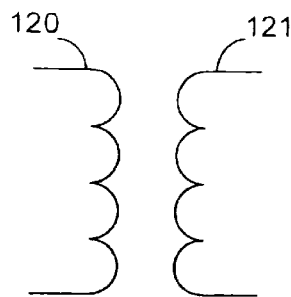
FIGS. 12(A) to 12(C) illustrate the various orientations between the transmitter antenna and the receiver antenna.
Figure 12B:
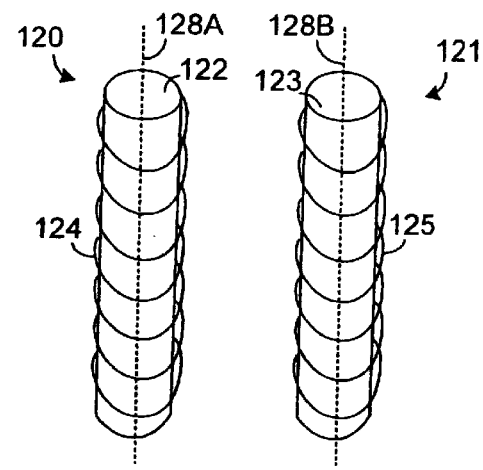

Several examples illustrate the impact antenna orientations have on SNR. FIG. 12(A) shows two inductors 120 and 121 arranged in a face-to-face manner. This figure shows the circuit symbols of these two inductors. This arrangement provides optimal energy coupling between the circuit associated with inductor 120 and the circuit associated with inductor 121. FIG. 12(B) shows the same arrangement that results in an optimal energy coupling with the antenna structure shown in FIG. 11(A). Not only are the inductors located close to each other, but they are also perfectly parallel to each other.

Figure 12C:
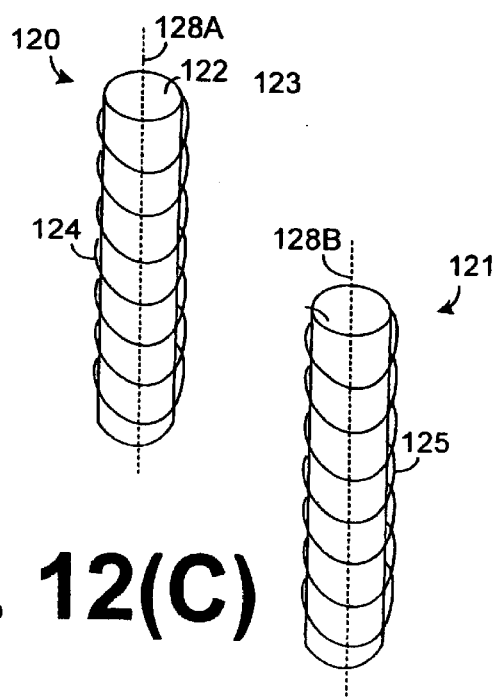

In FIG. 12(B), the first inductive antenna 120 has antenna wire 124 wound about ferromagnetic rod 122 and axis 128a. The second inductive antenna 121 has antenna wire 125 wound about ferromagnetic rod 123 and axis 128b. The axes 128a and 128b of these two inductive antennas are substantially parallel to each other, substantially coplanar, located close to each other, and the two axes are not coaxial. Here, the two inductive antennas 120 and 121 are arranged face-to-face. In FIG. 12(C), the inductive coupling provides good performance because these antennas are parallel to each other.

Figure 19A:
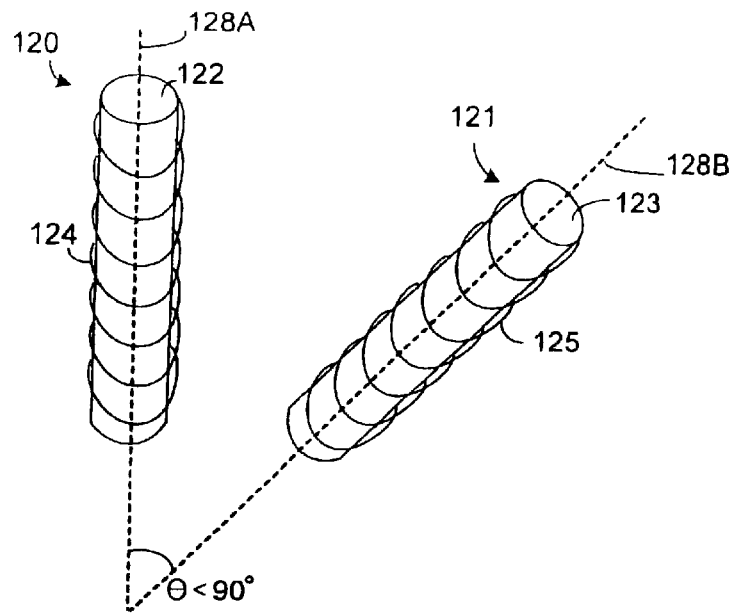
FIGS. 19(A) and 19(B) illustrate two other antenna orientation examples.
Figure 19B:
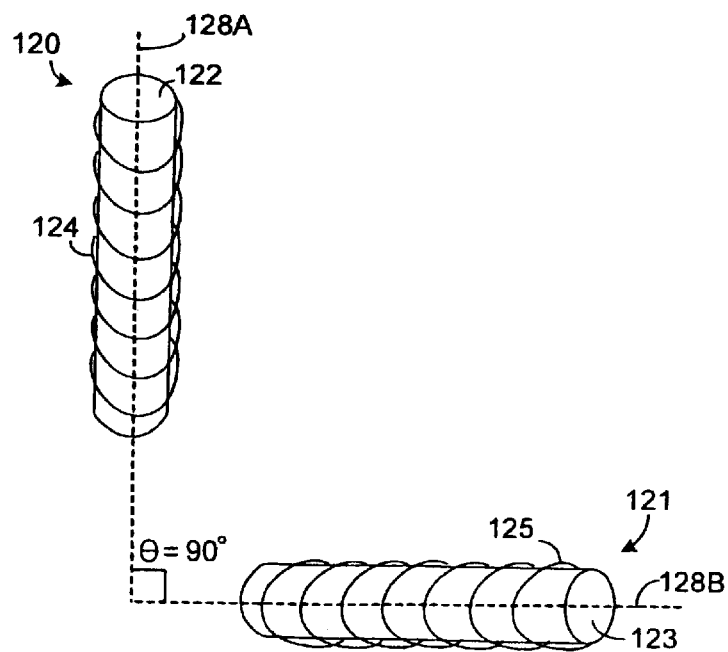

Referring now to FIGS. 19(A) and 19(B), some antenna orientations that result in sub-optimal performance are shown. These figures also use the same set of reference number used for FIGS. 12(A) to 12(C). In FIG. 19(A), the axis 128A for antenna 120 is at an angle that is less than 90 degrees from the axis 128B of antenna 123. This orientation provides adequate performance for this system. In FIG. 19(B), the axis 128A for antenna 120 is at a 90 degree angle from the axis 128B of antenna 123. This orientation provides inadequate performance as the system loses 20 dB in SNR.

In the embodiments of the present invention, the relative spacing of the two antennas is roughly less than three meters. Typically, the spacing is one meter. In actual implementation, optimal coupling may not be possible.

Although the embodiments of the present invention work best when the coupling is optimal, less than optimal antenna arrangements will also work satisfactorily.

Assume that optimal coupling may be achieved when the antenna in the control unit (worn as a belt-mounted accessory) is pointed upward and the antenna in the slave unit is pointed downward so that these two antennas are arranged in a manner such that the axes of these two antennas are perfectly parallel, such as when the user is standing. If the receiver is suspended from the ear as an earring, and is allowed to pivot so that the antenna points toward the ground independently of all head positions due to the force of gravity, optimal coupling from the transmitter to the receiver will continue to be preserved. In this case, spatial diversity schemes may not be required. However, this optimal coupling may be lost if the transmit antenna is oriented orthogonally to the receiver antenna, such as when the user goes from the standing position to the seated position. With adequate design, both antennas can be oriented so that they are never orthogonal to each other.

2. Space Diversity

Figure 13A:
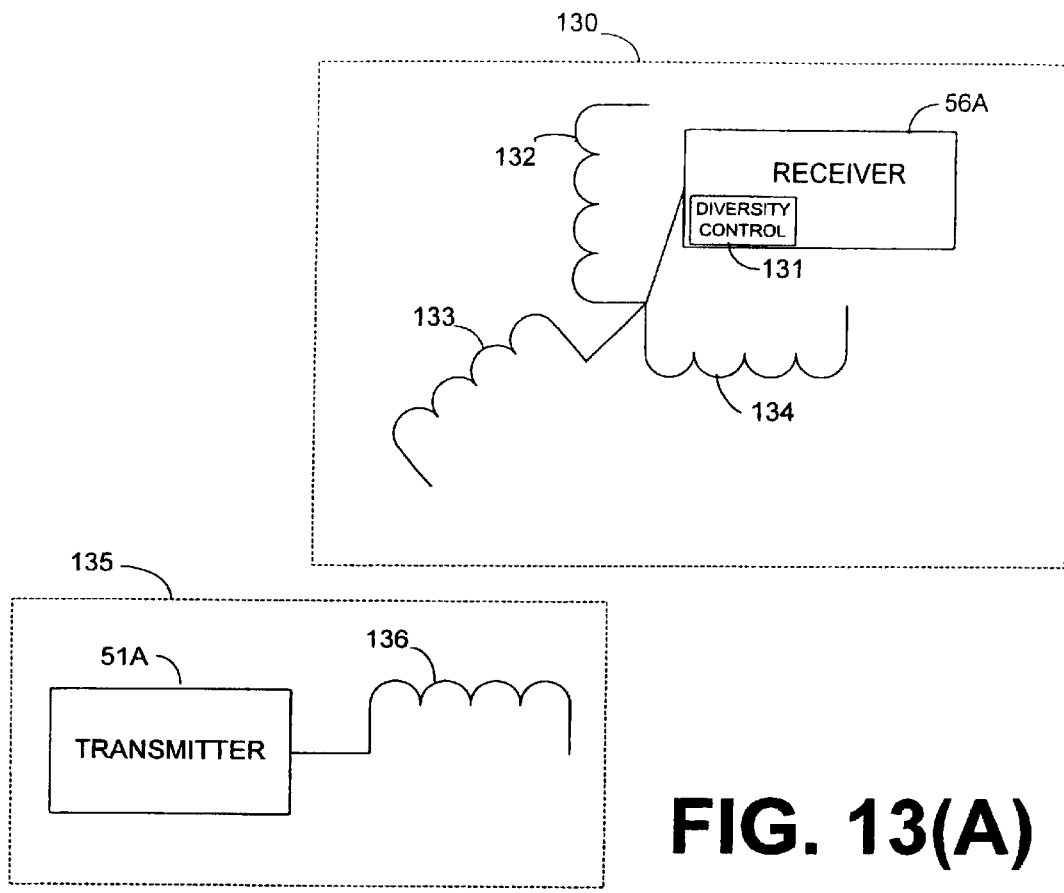
FIG. 13(A) shows a block diagram in which the receiver employs space diversity techniques.

To compensate for the non-optimal coupling that may result from body movement, space diversity schemes are implemented in some embodiments of the present invention. For simplicity, FIG. 13(A) shows the diversity scheme, but not the other details of the receiver and transmitter components. Furthermore, FIG. 13(A) shows a unidirectional system; however, other embodiments of the present invention cover diversity schemes in a bidirectional system. As shown in FIG. 13(A), slave unit 130 includes antennas 132, 133, and 134 coupled to a receiver 56A which includes a diversity controller 131. The master control unit 135 includes one antenna 136 and transmitter 51A. The three antennas 132, 133, and 134 are oriented orthogonally to each other; that is, the axis about which each antenna wire is wound is oriented 90 degrees from the other two antenna axes. The diversity controller 131 contains the switching logic necessary to select the desired high quality signal being received. Although FIG. 13(A) shows the space diversity scheme employed in the slave unit 130 only, other embodiments provide for space diversity schemes in the master control unit 135 as well.

The switching controller 131 can be programmed and configured for any of the following schemes: (1) selection diversity; (2) feedback or scanning diversity; (3) maximal ratio; and (4) equal gain. For selection diversity mode, the diversity controller 131 selects only one signal from among the three different signals received by the three antennas 132, 133, and 134. Typically, the diversity controller 131 selects the strongest signal in terms of RSSI. For feedback or scanning diversity mode, the diversity controller 131 scans the signals received from the three antennas 132, 133, and 134 in a fixed sequence until it detects a signal that satisfies a particular predetermined threshold level. Again, the threshold level is based on RSSI. The key differences between this feedback mode and the selection diversity mode are that the feedback mode uses a predetermined threshold level and the detection of each signal takes place in fixed time sequence. For maximal ratio mode, all three signals are co-phased and then weighted and summed. Thus, the diversity controller 131 produces an output that is acceptable even when individual signals are unacceptable. For equal gain mode, all three signals are co-phased and summed. The diversity controller 131 produces this summed output to the rest of the receiver circuitry. Unlike the maximal ratio mode, the diversity controller 131 does not provide any weighting of the co-phased signals.

Figure 13B:
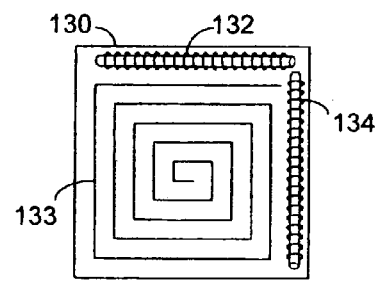
FIG. 13(B) shows the physical layout and orientation of the three space diversity antennas on the printed circuit board to maintain the small and compact size of the master control unit and the slave unit. A printed circuit board is not required in all cases.

Despite the use of three antennas, one embodiment of the present invention retains the thin package of the master control unit 135 and the slave unit 130. The physical layout of the antennas is shown in FIG. 13(B). Using like numerals for like components, the PC board of the slave unit 130 includes antennas 132, 133, and 134. Other system components (e.g., receiver, battery) are not shown for simplicity. Antennas 132 and 134 are each wound on a 0.125 inch diameter rod and placed perpendicular to each other along two edges of the PC board. The third antenna 133 is fabricated as a spiral-wound inductor on the PC board itself. Thus, the third antenna 133 is mutually orthogonal to the other two antennas 132 and 134. Note that all three antennas 132, 133, and 134 are orthogonal to each other.

D. Electromagnetic Design Considerations

To understand qualitatively and quantitatively the factors that govern an optimum design for the transmitter and receiver according to the present invention, the following discussion presents the theoretical basis for near-field inductively coupled communication systems. First, fundamental properties of the electric and magnetic fields produced by a magnetic antenna are examined, and the implications of FCC regulations are considered. Also, some design examples are presented for practical form factors for wearable systems, and the likelihood of interference from high power commercial and amateur transmitters is estimated. Finally, methods for shielding the transceiver to facilitate compliance with FCC regulations, along with maximum privacy and minimum susceptibility to interference are analyzed.

Note the following for the discussions below. The characteristics of an electromagnetic field are determined by the source, the media surrounding the source, and the distance between the source and the point of observation. In the "the near field," defined as a distance close to the source where $d<\lambda/2\pi$, the field properties are determined primarily by the source characteristics. In the "far field," defined as a distance far from the source where $d>\lambda/2\pi$, the properties of the field depend primarily on the characteristics of the medium through which the field is propagating. $\lambda$ is the wavelength of the signal being propagated.

1. System optimization

The transmitter antenna circuit can be modeled as a series resonant combination of an inductor and capacitor. In essence, the goal is to maximize the number of turns in the coil until either of two conditions are reached: (1) the coil resistance exceeds the value which will produce the desired Q or (2) the distributed capacitance of the coil makes it impossible to achieve a resonance condition with the required Q. In general, these conditions imply that lower frequencies are more desirable because more turns can be wound in the coil before distributed capacitance becomes significant.

In contrast, the rate of change of flux for a given magnetic moment at the transmitter will increase proportionally to frequency, which implies that, for a given receiver antenna coil geometry, higher frequencies are better. Thus, persons skilled in the art will appreciate that the results of the above qualitative analysis indicate that the choice of frequency is governed by several competing factors that lead to a broad optimum. Moreover, subtle effects such as distributed capacitance and parasitic coupling to adjacent conductors may play a significant role.

2. Fields from a Magnetic Dipole

As shown in FIG. 11(B), the basic antenna element 112 according to the present invention consists of a circular loop of wire 113, with a specified number of turns N around a core of ferromagnetic material 114. For a given current in the loop, the field strengths that are created vs. distance and angle must be calculated. Approximating the real antenna 112 as an ideal magnetic dipole, the transmitted field strengths can be calculated according to the methods described in *Antenna Theor*, by Collin and Zucker, (1969), the disclosure of which is incorporated herein by reference.

For N turns, the electric and magnetic fields from a magnetic dipole (i.e., when the distance is much larger than the size of the loop), are given by the following equations, expressed in rationalized MKS units:

$$E_m = \frac{-jk_0^3 \zeta_0 NSI}{4\pi}\left[\frac{j}{\rho} + \frac{1}{\rho^2}\right]e^{-j\rho}\sin\theta\hat{\phi}$$

$$B_m = \frac{\mu_0 k_0^3 NSI}{2\pi}\left[\frac{j}{\rho^2} + \frac{1}{\rho^3}\right]e^{-j\rho}\cos\theta\hat{r} - \frac{\mu_0 k_0^3 \zeta_0 NSI}{4}\left[\frac{1}{\rho} - \frac{j}{\rho^2} - \frac{1}{\rho^3}\right]e^{-j\rho}\sin\theta\hat{\theta}$$

where $E_m$=electric field from magnetic dipole
$B_m$=magnetic field from magnetic dipole
$k_0 = 2\pi/\lambda_o = \omega/c$=wave number
$\xi_o$=impedance of free space=377 Ohms
$\mu_o$=permeability of free space $=(4\pi)*10^{-7}$ Henries/meter
S=area of loop
I=current
r=radial distance to observation point (assuming r>>loop radius)
p=$k_0$r
θ=angle at observation point (zero degrees on perpendicular to loop)

Note that there are terms in both 1/r and $1/r^2$ which radiate, i.e. they have matching pairs of E and B vectors orthogonal to each other and to the radial vector. The "far field" is usually considered to include only the 1/r terms, since they dominate at distances much greater than the wavelength. For the purposes of this discussion, the other terms, in $1/r^2$ and $1/r^3$, are considered to be the "near field" even though they actually involve a mixture of radiative and non-radiative terms.

Eliminating the complex coefficients and examining the magnitude of the B-field and its vector direction yields the following set of equations:

$$B = \frac{\mu_0 k_0^3 NSI}{2\pi}\left[\left(\frac{j}{\rho^2}+\frac{1}{\rho^3}\right)\cos\theta\hat{r} - \frac{\pi}{2}\left(\frac{1}{\rho}-\frac{j}{\rho^2}-\frac{1}{\rho^3}\right)\sin\theta\hat{\theta}\right]e^{-j\rho}$$

$$|B|_{\theta=0} = \frac{\mu_0 k_0^3 NSI}{2\pi}\left[\frac{1}{\rho^4}+\frac{1}{\rho^6}\right]^{\frac{1}{2}}\hat{r}$$

$$|B|_{\theta=90°} = \frac{\mu_0 k_0^3 NSI}{4}\left[\left(\frac{1}{\rho}-\frac{1}{\rho^3}\right)^2+\frac{1}{\rho^2}\right]^{\frac{1}{2}}\hat{\theta}$$

When the $1/\rho^3$ terms dominate, at distances close to the source:

$$B = \frac{\mu_0 k_0^3 NSI}{2\pi\rho^3}\left[\cos\theta\hat{r}+\frac{\pi}{2}\sin\theta\hat{\theta}\right]e^{-j\rho}$$

$$|B|_{\theta=0} = \frac{\mu_0 k_0^3 NSI}{2\pi\rho^3}\hat{r}$$

$$|B|_{\theta=90°} = \frac{\mu_0 k_0^3 NSI}{4\rho^3}\hat{\theta}$$

It can easily be shown that at θ=38.6 degrees, the magnetic field is exactly horizontal (i.e., there is no z component).

The above discussion simplistically assumes that the transmitter according to the present invention can be accurately approximated by the fields generated by a pure magnetic dipole. In reality, the magnetic dipole is not infinitesimally small, and the mechanism through which current gets into and out of the dipole loop cannot be ignored. Additionally, the leads to the loop antenna, the antenna itself and other circuit components can also generate electric fields. To optimize the transmitter design, analyze shielding requirements, and interpret experimental measurements, the magnitude of these "parasitic" fields must therefore be estimated.

3. Fields from an Electric Dipole

Consider the fields generated by an electric dipole, which consists of a short wire (much shorter than a signal wavelength) carrying a current I (magnitude) at an angular frequency ω. For comparison, the fields for a magnetic dipole are also shown, and the geodetical coefficients are formulated to emphasize the symmetry.

$$E_e = \frac{-j\zeta_0 k_0^3}{4\pi}\left(\frac{L\lambda_o I}{\pi}\right)\left[\frac{j}{\rho^2}+\frac{1}{\rho^3}\right]e^{-j\rho}\sin\theta\hat{r} + \frac{jk_0^3 \zeta_0}{4\pi}\left(\frac{L\lambda_o I}{2\pi}\right)\left[\frac{1}{\rho}-\frac{j}{\rho^2}-\frac{j}{\rho^{32}}\right]e^{-jk\rho}\sin\theta\hat{\theta}$$

$$B_e = \frac{\mu_0 k_0^3}{4\pi}\left(\frac{L\lambda_o I}{2\pi}\right)\left[\frac{j}{\rho}+\frac{1}{\rho^2}\right]e^{-j\rho}\sin\theta\hat{\phi}$$

$$E_m = \frac{-j\zeta_0 k_0^3(NSI)}{4\pi}\left[\frac{j}{\rho}+\frac{1}{\rho^2}\right]e^{-j\rho}\sin\theta\hat{\phi}$$

$$B_m = \frac{\mu_0 k_0^3(2NSI)}{4\pi}\left[\frac{j}{\rho^2}+\frac{1}{\rho^3}\right]e^{-j\rho}\cos\theta\hat{r} - \frac{\mu_0 k_0^3(\pi NSI)}{4\pi}\left[\frac{1}{\rho}-\frac{j}{\rho^2}-\frac{1}{\rho^3}\right]e^{-j\rho}\sin\theta\hat{\theta}$$

where $E_e$=electric field from electric dipole
$B_e$=magnetic field from electric dipole
$E_m$=electric field from magnetic dipole
$B_m$=magnetic field from magnetic dipole
$k_0=2\pi/\lambda_o \omega/c$=wave number
$\xi_0$=impedance of free space =377 Ohms
$\mu_o$=permeability of free space=$(4\pi)*10^{-7}$ Henries/meter
S=area of loop
I=current
r=radial distance to observation point (assuming r>>loop radius)
ρ=$k_0$r
θ=angle at observation point (zero degrees on perpendicular to loop)

It should be noted that the reduction of magnitude with respect to radius of the electric field from the two types of sources behaves in a very similar way, although the vector directions are very different. The relative magnitude of the fields is given by the following equation.

$$\frac{|E_e|}{|E_m|} = \left(\frac{LI}{k_o}\right) / (NSI) = \frac{\lambda_o L}{2\pi NS}$$

If L is comparable to the diameter of the magnetic dipole loop, i.e.:

$$\frac{|E_e|}{|E_m|} \approx \frac{2}{\pi} \frac{\lambda_o}{NL}$$

Since ($\pi$NL) is approximately equal to the length of the wire in the magnetic dipole loop antenna, the electric fields from the two sources, if they share the same current, become roughly equal when the coil wire length equals twice the wavelength. For example, for an operating frequency of 15 MHz, a coil with 40 meters of wire must be used in order for the magnetic antenna to generate an E-field equal to that from a comparable size electric antenna. Because experimental transmitters according to the present invention actually use approximately 1 meter of wire, the parasitic E-field due to a bare electric dipole must be substantially greater than that due to a magnetic dipole.

However, the above analysis has been greatly oversimplified. It has been assumed that a short length of wire can somehow be rearranged to have a current going into and out of it, but that the leads themselves do not generate a field. In actuality, the return current for the parasitic dipole is in rather close proximity to the input current. This implies that the source should be modeled as an electric quadruple rather than a dipole. Although the physical geometries involved are complex, because the transmitter includes several current loops, induced currents, and reflections, a rough idea of the actual parasitic E-fields due to an electric quadruple can be approximated by scaling the above result for an electric dipole by applying a multiplier $$\frac{L}{r} = 2\pi \frac{L}{\lambda_o} \frac{1}{\rho}$$

This process yields the following equation:

$$\frac{|E_e|}{|E_m|} \approx \frac{2}{\pi} \frac{\lambda_o}{NL}$$

The above equation implies that at distances close-in from the source, the parasitic E-fields can actually be larger than those produced directly by a predominantly magnetic antenna. However, at a distance of 30 meters (referring to the FCC Part 15 specification) and a wavelength of 20 meters, the parasitic E-field will be only a few percent of that produced by the magnetic antenna.

4. Antenna Design Guidelines

In accordance with one embodiment of the present invention, the following antenna design guidelines should be observed. First, lead lengths to and from the antenna coil, and any other component that carries significant current at the carrier frequency, must be kept as short as possible. If longer antenna leads are unavoidable, they should be made bifilar. Finally, as discussed more fully below, electric field ("Faraday") shielding techniques should be utilized to surround the transmitter to reduce the electric field while maintaining the magnetic field.

It may be useful to look at a few examples in order to better appreciate the behavior of the fields from a pure magnetic dipole. For example, if a distance of 1 meter from the source and a frequency of 100 MHz are specified, $\lambda$=3 meters
$k_o$=2.09 m$^{-1}$
$\rho$=2.09
$1/\rho$=0.478
$1/\rho^2$=0.229
$1/\rho^3$=0.109

In this case, the far field dominates, but only by a factor of approximately 3. On the other hand, at the same distance, and a frequency of 10 MHz, the near field dominates:

$\lambda$=30 meters
$k_o$=0.209 m$^{-1}$
$\rho$=0.209
$1/\rho$=4.78
$1/\rho^2$=22.9
$1/\rho^3$=109

The near field dominates by a factor of about 20 and the $1/\rho^3$ term is the major contributor. Also, at 10 MHz, the radiation field and the near-field magnetic intensities do not become approximately equal until the distance from the source exceeds approximately 5 meters. The $1/\rho^3$ term in the B field is independent of frequency, which implies that any frequency can be employed in the near-field domain, for a given coil and current, to generate a specified magnetic field at the receiver.

Also, the angular dependence and direction of the near field given by the above equations is consistent with what would be expected and observed for a small permanent magnet. Specifically, it can be appreciated that the magnetic field has no direction at which it goes to zero, but as the observation point moves from 0 degrees to 90 degrees, the magnetic field does shift its vector from perpendicular to the plane of the loop to perpendicular in the opposite direction. Its magnitude decreases by $4/2\pi$. At $\theta$=38.6 degrees, the magnetic field passes through the point at which the field has no z component.

FCC regulations under Part 15 (i.e., 37 C.F.R. § 15.209 (a)) specify that, in the frequency range 1.705 MHz to 30.0 MHz, the electric field strength of an intentional radiator shall not exceed a value of 30 $\mu$V per meter at a measurement distance of 30 meters from the transmitter. No specific limit is given for the magnetic field strength.

The total power radiated by a single turn loop antenna is given by the following equation:

$$P_r = \frac{k_o^4 \zeta_o (S|I|)^2}{12\pi}$$

If a magnetic dipole antenna is employed, the FCC limit implies a maximum "magnetic moment" (NSI$_{max}$):

$$\Gamma_{max} \equiv (NSI)_{max} = \frac{4\pi}{\zeta_o k_o^2} \times 30 \times 30 \times 10^{-6} = \frac{30 \times 30 \times 10^{-6}}{377\pi} = 7.60 \times 10^{-7} \lambda^2 \text{ amp turns } m^{-2}$$

The maximum allowed value of the magnetic moment when constrained by FCC limits is frequency dependent, although the near magnetic field is not. For example, at 10 MHz ($\lambda$=30 meters):

$\Gamma_{max}$(10 MHz) =

$$\frac{4\pi}{377} \times \frac{1}{(0.209)^2} \times 30 \times 30 \times 10^{-6} = 6.868 \times 10^{-4} \text{ amp turns } m^{-2}$$

The FCC constraint on $\Gamma_{max}$ assumes that the antenna is free to radiate. If the antenna is confined to a "Faraday cage" which shorts out the E field while allowing the B field to pass through unscathed, the radiative components can be substantially suppressed, along with the non-radiative E fields. In this case, the magnitude of the near B field that can be generated is limited only by practical constraints on power consumption and size. The use of Faraday shields is discussed in more detail below.

Although the near-field transceiver essentially consists of an inductively coupled transformer, its coupling coefficient is very small. Therefore, the transmitter and receiver designs may be optimized independently, within their own constraints of power consumption, size, and other design factors once an operating frequency and channel bandwidth have been selected. However, a mutual dependence exists between the transmitter and the receiver in terms of selecting the optimum operating frequency.

a) Transmitter Antenna System Design

In accordance with one embodiment of the present invention, the transmitter "antenna" is a coil with multiple turns through which the maximum allowable current for a specified transmitter average power and battery voltage is passed. As discussed more fully below, this design goal usually implies the use of a series resonant circuit designed to yield an effective Q suitable to the required bandwidth. For example, at an operating frequency of 10 MHz and a signal bandwidth of 100 kHz, a Q of approximately 100 may be used.

The fundamental design goal of the transmitter is to generate the maximum possible magnetic flux change at the range of the receiver within constraints imposed by the desired size, bandwidth, and power consumption. The transmitter design goal can be expressed as maximizing the product (NSIω) (i.e., the number of turns N in the antenna coil, its area S, the current I through it, and the selected operating frequency ω). In the following discussion, the FCC limits are ignored, since they can be satisfied, if necessary, through the use of Faraday shielding, as discussed more fully below. However, other competing effects must be taken into account. If the coil diameter, coil volume, operating frequency, and driver circuit (i.e., voltage source, current source, or a hybrid) are specified, then the remaining design objectives are as follows:

1) Maximize the number of turns on the coil;
2) Maximize the effective subtended area;
3) Maximize the current through the coil;
4) Maximize the self-resonance of the coil. (In other words, its self-inductance resonating with its distributed capacitance must be above the operating frequency. Otherwise, the current cannot be maximized.)
5) Optimize the effective Q for the specified bandwidth and resistive losses;
6) Optimize coil geometry, especially as it affects distributed capacitance and skin effect;
7) Consider and optimize the use of a magnetic core that has a relative permeability greater than 1, and;
8) Minimize coupling to adjacent conducting surfaces.

The following observations regarding the qualitative behavior of the coil parameters are useful to keep in mind during the transmitter design. First, the inductance L for compact coils with a given geometry is roughly proportional to $N^2$. Also, self-resistance is proportional to the length of the conductor and therefore roughly proportional to N, the number of turns, and therefore to $L^2$. Moreover, the resistance per unit length of the conductor for typical coils at the operating frequencies of interest in the present invention will be predominantly determined by the skin-depth, and is therefore proportional to $(\omega)^{0.5}$. Additionally, the inductive reactance, $\omega L$, is also proportional to $\omega$. Therefore, $Q = \omega L / R_{eff}$ for a given coil design is roughly proportional to $(\omega)^{0.5}$. Finally, other losses, such as dielectric dissipation, may become significant at higher frequencies, roughly proportional to $\omega^3$. Therefore, the Q will reach a maximum at some frequency, and it is typical that the maximum possible Q's are on the order of 200.

The distributed capacitance of a coil depends on coil geometry, conductor placement, dielectric constant and its "filling factor," and other considerations according to a complicated relationship. Also, it is well known in the art that magnetic cores increase the inductance for a given number of turns. Thus, for a specified inductance, a lower distributed capacitance can result. Moreover, the field at a specified distance may or may not be enhanced for a given coil and current, depending on the geometry. If has been found helpful to analyze and model this behavior through the use of standard commercially available three-dimensional field analysis software.

Many of the design factors discussed above for the transmitter antenna suggest that the frequency should be chosen to be as low as possible, limited primarily by the bandwidth requirement. At low frequencies, many turns can be wound on a coil of specified size and shape before the self-resonance frequency intrudes on the ability to pump current through the coil. Further, to approach FCC transmission limits without the use of Faraday shielding, the amount of $1/\rho^3$ magnetic field that can be generated is proportional to $\lambda^2$. However, the factor $\omega$, which becomes significant because flux change is the objective, indicates that higher frequencies should actually be utilized.

In the following discussion, a transmitter output circuit is designed that operates at the FCC limit using an antenna coil whose size is within the desired belt unit diameter and volume constraints, and can be easily resonated at 10 MHz. As a starting point, the following parameters are assumed:

d=coil diameter=0.01 m (1 cm)

l=coil length=0.005 m (0.5 cm)

N=number of turns=25

S=$7.85 \times 10^{-5}$ m$^2$

L=$9.85 \times 10^{-6} \times (d^2 N^2)/(4.5d+10l)$ Henries (approximate inductance of a single layer coil, from Terman, *Radio Engineer's Handbook* (1943))

L=6.48 microHenries $\omega L$=407 Ohms

C=capacitance resonating at 10 MHz=39 pF

I=current to produce $\Gamma_{max}$=0.350 Amps

If a single layer 25 turn coil is wound in a length of 0.5 cm, the wire size that fits is #32 AWG, which exhibits a DC resistance of 0.54 ohms/meter, and a skin-effect limited resistance of 1.30 meter, yielding a net coil effective resistance of 1.02 ohms. Therefore:

$$Q = \frac{\omega L}{R} = \frac{407}{1.02} = 399$$

The value for Q does not take into account the effective source resistance of the driver circuit and other losses. Assuming for the moment that the net Q is actually closer to the bandwidth-governed upper limit of 100, the current required to produce $\Gamma_{max}$, 0.350 Amps, produce a voltage across the series resonant transmitter circuit of 1.4 Volts. This implies that a relatively low power supply voltage may be used. The resulting net power dissipation in this resonant circuit is approximately 0.49 Watts.

The above estimates were calculated for a transmitter coil with 1 cm diameter. Assuming that the same inductance is maintained as in the preceding case, TABLE 4 illustrates the effect of increasing the coil diameter.

TABLE 4

TRANSMITTER COIL SCALING AT 10 MHz
FOR FIXED INDUCTANCE 6.48 microHenries

| Coil Diam. (cm) | N | Area ($cm^2$) | Imax (mA) | Reff (Ohms) | R(Q = 100) (Ohms) | Pave (mW) |
|---|---|---|---|---|---|---|
| 1 | 25 | 0.79 | 349.8 | <4 | 4.1 | 498.1 |
| 3 | 12 | 7.07 | 81.0 | <4 | 4.1 | 26.7 |
| 5 | 9 | 19.63 | 38.9 | <4 | 4.1 | 6.1 |
| 10 | 6 | 78.54 | 14.6 | <4 | 4.1 | 0.9 |

Thus, for example, increasing the coil diameter by a factor of 3 with no further optimization results in more than a factor of 10 improvement in the average power required to produce the maximum permissible B field. The actual coil resistance is much less than 4 Ohms, but that is the equivalent resistance required to get the desired bandwidth.

Thus, the efficiency of the transmitter is significantly influenced by the antenna coil diameter. Therefore, the largest coil that will fit into the available space should be employed, up to the size for which the power dissipation becomes significantly less than that of the other parts of the system. For typical systems under consideration, this is probably on the order of 3 to 5 cm diameter.

The transmitter driver circuit may be modeled as a voltage source, a current source or a hybrid configuration of these two fundamental types. Thus far, the above exemplary calculations have assumed a carrier frequency of 10 MHz. In the following discussion, the effect of choosing a different frequency on the overall transceiver design is examined. Persons skilled in the art will appreciate that several competing effects must be taken into account.

The carrier frequency should be on the order of at least ten times the required bandwidth. A single wide-band FM channel typically has a bandwidth of approximately 100 kHz, assuming a modulation index of 5. Therefore, a single channel requires a minimum carrier frequency of approximately 1 MHz. In the present invention, a minimum of four channels are required for duplex stereo communications, and a "guard band" of one channel each is assumed. Taking all the channels into account. this implies a total bandwidth of 800 kHz, and therefore a minimum carrier frequency of 8 MHz.

In one embodiment of the present invention, the wireless system will be able to support multiple users within a small area with multiple channels. Channelization permits several transceiver systems to operate within a radius of, for example, less than approximately 3 meters, and thus, a carrier frequency several times greater than 8 MHz will be required. Therefore, transceiver designs must be evaluated at frequencies as high as 25 MHz.

As described above, the FCC limit for medium frequencies (1.705 to 30 MHz) is specified in terms of electric field strength at a distance of 30 meters. In the far field, the electric field E for a magnetic dipole is proportional to the product of the magnetic moment and the frequency squared. Since the field component of interest (i.e., the magnetic near field), is frequency independent, a low carrier frequency is advantageous in this respect. However, because the electric near field also contains a $1/r^2$ component which is equal to the far field term at a distance of $\lambda/2\pi$, this component must be taken into account for a given choice of carrier frequency, particularly when the specified 30 meter measurement range is less than or equal to $\lambda/2\pi$. Such is the case for all frequencies less than 1.6 MHz, so it is unlikely that this factor will be of significant concern.

It should also be noted that the FCC limits in the bands immediately above 30 MHz are significantly more stringent, and only permit a maximum electric field strength that is three times as high as in the lower frequency range.

b) Receiver Antenna System Design

Whereas the design goal of the transmitter is to generate as much magnetic flux change as possible at the chosen frequency, as discussed above, the receiver antenna intercepts that field and converts the time varying flux into a voltage at the terminals of a receiver amplifier.

In the following discussion, the maximum magnetic field that can be generated at a distance of 1 meter in the near field is calculated under the conditions imposed by the FCC in the medium frequency bands. Under these conditions, the maximum magnetic field is given by the following equation:

$$B_{max} = \frac{4\pi \times 10^{-7}}{2\pi} \times \Gamma_{max} \times \frac{1}{1.0^3} = 1.52 \times 10^{-13} \lambda^2 \text{ tesla}$$

Note that this maximum field does not involve details of the antenna design such as coil size or number of turns, because the ratios most significant. The "magnetic moment" appears as a multiplier in both the electric far field, which is specified in the FCC limits, and the magnetic near field.

At the receiver, it is desirable to produce the maximum possible voltage, while efficiently intercepting the magnetic field from the transmitter. If only the voltage induced in the coil was of interest, the receiver coil should have a high permeability core at the carrier frequency, as well as the maximum number of turns that can be accommodated into the specified volume. This simplistic guideline seems to be nearly independent of frequency, with self-capacitance and selection of core material the only effects to be controlled.

In the following discussion, the voltage that can be generated at the front end of a magnetically coupled receiver is estimated. Assuming that the receiver coil must fit into a space which limits the coil diameter to 0.5 cm, and it is wound with 100 turns on a ferrite core with a high permeability, the voltage induced by a magnetic field B at a frequency ω is:

$\epsilon = -(d\phi/dt)$, the induced voltage for a flux $\phi$;

$\phi = S_r NB \mu_{eff}$;

$\mu_{eff}$=the effective value of the permeability of the coil's core;

In the example given, for a rather small coil of 0.5 cm. diameter:

$D = 5 \times 10^{-3}$ m $S = 1.96 \times 10^{-5}$ $m^2$ $|B| = 1.4 \times 10^{-10}$ Tesla

N=100

$\mu_{eff}=5$ $\omega=2\pi\times 10^7$ Hertz$^{-1}$

The resulting induced voltage is:

$\epsilon=8.6\times 10^{-5}$ Volts=86 microVolts

This value is adequate for employing commercial FM devices to obtain a good SNR and low THD. As discussed more fully in the following section, optimizing the antenna circuit of the receiver can increase the voltage at the input by a substantial factor over that induced in the coil.

In the following discussion, the equivalent circuit of a receiver antenna coil connected to the input of a receiver IC is analyzed by modeling it as a resistance in parallel with a capacitor. Two circuit embodiments are used—one in which the antenna coil is resonated with a series capacitance and another with a parallel capacitor.

$e_B$=voltage induced in the antenna coil by the magnetic flux at frequency $\omega$ $e_o$=at the input of the receiver; $e_{os}$ for series resonance; $e_{op}$ for parallel resonance $R_o$=input resistance of receiver $R_L$=effective series resistance of coil $L$=inductance of coil $C_O$=input capacitance of receiver $C_r$=resonating capacitor $C_d$=distributed capacitance of coil $C_t=C_O+C_r+C_d$=total capacitance Employing circuit analysis techniques well known in the art, the set of equations relating currents and voltages are:

$$e_{os} = i_o R_o$$

$$e_{os} = -\frac{j}{\omega C_o} i_{co}$$

$$e_{os} + \frac{j}{\omega C_r} i_s = e_L$$

$$e_L = -\frac{j}{\omega C_d} i_d$$

$$e_L = e_B + (j\omega L + R_L) i_L$$

Eliminating $i_o$, $i_L$, $i_{co}$, $i_d$, $i_s$, $e_L$, and solving for $e_{os}$:

$$e_{os} = \frac{e_R C_r R_o \omega}{-j + (C_d R_L + C_r R_L + C_o R_o + C_r R_o)\omega + j(C_d L + C_r L + C_d C_o R_L R_o + C_d C_r R_L R_o + C_o C_r R_L R_o)\omega^2 - (C_d C_o L R_o + C_d C_r L R_o + C_o C_r L R_o)\omega^3}$$

$$|e_{os}|=\sqrt{Re^2[e_{os}]+Im^2[e_{os}]}$$

In the case of a parallel resonant circuit:

$$e_{op} = i_o R_o$$

$$e_{op} = -\frac{j}{\omega C_t} i_{ct}$$

$$e_{op} = e_B + (j\omega L + R_L) i_L$$

$$i_d + i_{ct} + i_o = 0$$

Eliminating $i_o$, $i_{ct}$, $i_L$, and solving for $e_{op}$:

$$e_{os} = \frac{e_B R_o}{R_L + j(L + C_t R_L R_o)\omega - (C_t L R_o)\omega^2}$$

$$|e_{op}|=\sqrt{Re^2[e_{op}]+Im^2[e_{op}]}$$

From the above examples, it can be appreciated that a parallel resonator is superior, by a substantial margin, to a series resonator when the load resistance is higher than the reactance of the coil, and a series resonator is superior when the reverse is true. It should also be noted that the receiver input voltage can be substantially higher than the voltage induced in the coil. This is a "transformer" effect taking advantage of the low effective source impedance of the coil. Thus, the optimum circuit when the coil has very high Q might be obtained by tapping the coil to form an auto-transformer.

c) Low frequency design

In the following discussion, a design example for a carrier frequency of 2 MHz is described. Such a carrier frequency may be appropriate for a narrow-band FM system embodiment that does not require multiple channels.

Assuming a transmitter coil that is the same size as that assumed above for the 10 MHz case, i.e.:

d=coil diameter=0.01 m l=coil length =0.008 m

N=number of turns=100

S=7.85×10$^{-5}$ m$^2$

L=9.85×10$^{-6}$×(d$^2$N$^2$)/(4.5d+10l) Henries=79 microHenries $\omega L$=993 Ohms C=capacitance resonating at 2 MHz=80 pF I=current to produce (NSI)$_{max}$=0.088 Amps R=33 Ohms

Q=30

I$^2$R=0.26 Watts

In the above example, the coil length was increased from 0.5 cm. to 0.8 cm. in order to accommodate 100 turns of #40 AWG wire. The power input required to produce the maximum permissible magnetic moment has been reduced by a factor of two.

At 2 MHz, the far and near electric field strengths are approximately equal at a distance of 30 meters from the transmitter, and this should be taken into account. The coefficients of the two terms are approximately equal, but they are out of phase by 90 degrees. Therefore, persons skilled in the art will recognize that the value of the maximum permissible magnetic moment should be reduced by approximately 1.4.

If the design process for a larger coil diameter is repeated, as discussed above for the 10 MHz case, the current and power dissipation are found to be substantially reduced. Assuming now that the same receiver coil design is used as was used in the 10 MHz case, the 2 MHz system produces a receiver signal that is 5 times smaller, which at first glance suggests that lower frequency transmission is not a viable option. However, the above analysis has not taken into account the practical effects of coil capacitance and resistance. Because many more turns can be employed at 2 MHz than at 10 MHz, the disadvantages of lower frequency transmission may be compensated by winding more turns on the antenna coils.

Alternatively, the receiver according to the present invention may take the form of "ear-gear," i.e., very small packages that are worn in or around the ear, perhaps integrated into eye glass frames, earrings, or hats. In this case, very small transmitter coils must be used, driven at an average power of only a few mW. The small field generated by the transmitter is compensated by using a relatively large receiver coil mounted in the belt unit.

Beginning with the calculations discussed above for a 1 cm diameter transmitter coil at 10 MHz, but reducing the drive current to a level which will reduce the power dissipation to 3 mW (chosen to be comparable to that dissipated in the audio transducers), a value for the magnetic moment is obtained which is 13 times smaller. This disadvantage may be compensated at the receiver by increasing the antenna coil diameter from 0.5 cm. to 2 cm., and maintaining the same number of turns at 100. Such an increase in coil diameter is well within the physical constraints of the belt unit.

The likelihood of interference from commercial and amateur transmitters may be estimated by comparing the magnetic fields at some distance from such sources with those produced in the near field of the system according to the present invention. The frequency independent magnitude of the magnetic field seen at the receiver at 1 meter from the source when operating at the FCC limit is therefore:

$$B_{max} = \frac{4\pi \times 10^{-7}}{2\pi} \times \Gamma_{max} \times \frac{1}{1.0^3} = 1.52 \times 10^{-13} \lambda^2 \text{ tesla.}$$

Thus, at 10 MHz, $B_{max}$ is approximately $1.3 \times 10^{-10}$ tesla.

The fields that would be typically encountered from a 100 Watt transmitter at a distance of 1000 meters can be estimated from the theoretical far field radiation from a unit electric dipole using techniques well known in the art.

$$E_f = \frac{j\zeta_0}{4\pi} \times \frac{k_0}{r} \times e^{-jk_0 r} \sin\theta \hat{\theta}$$

$$B_f = \frac{j\mu_0}{4\pi} \times \frac{k_0}{r} \times e^{-jk_0 r} \sin\theta \hat{\phi}$$

Thus, the total radiated power can be calculated at 10 MHz using the following equation:

$$P_o = \frac{k_0 \zeta_0}{12\pi}$$

This yields a value of $P_O$=0.439 Watts at 10 MHz. For a 100 Watt source, the values for E and B as given above are multiplied by a factor $$\left(\frac{k_0 \zeta_0}{12\pi}\right) = 15$$

Therefore, at a distance of 1000 meters from the source:

$$|B|=3.1 \times 10^{-10} \text{tesla}$$

This field is approximately twice as large as that produced in the near field at 1 meter from a transmitter operating at the FCC limits. Therefore, it is difficult to predict whether interference will be a serious problem, but the above estimates provide a reference from which to do a survey of the type and location of typical commercial radiators in the preferred operating bands of the present invention.

Unfortunately, Faraday shielding techniques, as described more fully below, do not assist in reducing interference effects from remote sources in the receive direction because the radiative field from a remote transmitter carries both E and B components, and the magnetic field need not travel far to pass through the shield and reach the magnetic antenna of the present invention. However, Faraday shielding may be performed regardless, because it may reduce interference from nearby peer systems according to the present invention. As discussed earlier, these systems produce a $1/\rho^3$ E-field unaccompanied by a matching B-field. Therefore, Faraday shielding will prevent those E-fields from reaching a parasitic electric antenna at the receiver front end.

In certain system configurations, the transmitter battery case may act as a shorted turn for the antenna coil, thus substantially reducing the effective Q and the magnetic field produced by the transmitter.

In one embodiment of the present invention, the battery should be placed as far from the coil as possible, oriented at right angles relative to the coil, and be implemented as several small batteries rather than a single large one. Preferably, batteries such as polymer-based lithium re-chargeable batteries should be used, because they are not surrounded by a metal case and also exhibit a low conductivity internal structure.

5. Electric Field Shielding ("Faraday Shielding")

In one embodiment of the present invention, novel Faraday shielding techniques are employed to selectively attenuate the transmitted electric field ("E-field") portion of the signal while simultaneously maintaining the transmitted magnetic field ("B-field") portion at a relatively high level.

By completely enclosing the control unit within a shielded enclosure of uniform 0.1 mm thickness, it has been found that the transmitted E-field is suppressed by 155 dB at a range of 5 millimeters from the source. At the same range, however, the B-field is only suppressed by 1.9 dB, so that 94% of the original B-field is maintained. Additionally, this shielding scheme ensures that the communication system of the present invention complies with part 15 of the FCC regulations regarding electromagnetic emissions in the HF frequency range.

Electric and magnetic fields are attenuated through a metallic shield because of reflection and absorption loss. While absorption loss is the same for both electric and magnetic fields and for near field or far field emissions, the reflection loss is dependent on the type of field and on the wave impedance. In the far field, both electric and magnetic fields form a plane wave. As a consequence, they experience the same absorption and reflection loss, and it is not possible to attenuate one component more than the other. In the near field, however, while the attenuation due to absorption loss is the same for electric and magnetic fields, the reflection loss is not the same. Thus, it is possible to attenuate the electric field more than the magnetic field with a thin metallic shield of 0.1 mm thickness.

Alternatively, if the antenna inductors are placed in series, oppositely wound, and aligned together, the E-field can be effectively canceled while maintaining the B-field. In such a system, little or no shielding is necessary to reduce E-field signal strength in the near field.

In one embodiment of the present invention, Faraday shielding is employed around the transmitter and antennas to significantly reduce electric fields while maintaining magnetic fields. The Faraday shield is structured as follows. An array of parallel, insulated wires are connected along one line and grounded at a single point. The sheet of wires is then wrapped around the source from which only the magnetic field is desirable, with an overlapping joint that is not connected. Electric field lines terminate on the conductors of the shield and are shunted to ground along a single path while the magnetic lines pass through the shield because there are no closed circuits through which induced voltages can turn into current flow.

While the antenna coil is placed within the enclosure formed by the shield, the shield should be spaced away from the antenna coil by a distance that yields a capacitance between the shield and the coil that is small compared with the series resonating capacitor. For typical coils that have been used in prototype transmitters, a simple calculation shows that the shield should be no closer than about 0.4 cm.

In the following discussion, some of the principles of electromagnetic shielding are discussed, to make a distinction between far field and near field, and electric and magnetic shielding. As explained above, the characteristics of an electromagnetic field are determined by the source, the media surrounding the source, and the distance between the source and the point of observation. In the "the near field," defined as a distance close to the source where $d < \lambda/2\pi$, the field properties are determined primarily by the source characteristics. In the "far field," defined as a distance far from the source where $d > \lambda/2\pi$, the properties of the field depend primarily on the characteristics of the medium through which the field is propagating. $\lambda$ is the wavelength of the signal being propagated.

The wave impedance of an electromagnetic field is the ratio E/H of electric field E to the magnetic field H. The ratio E/H equals the characteristic impedance of the medium (377 Ohms for free space) in the far field case. Both the electric field and the magnetic field form a plane wave and they both decrease in strength as 1/d as distance d from the source increases.

In the near field case, the wave impedance (E/H) is determined by the characteristics of the source. If the source has relatively high voltage and low current (i.e., E/H <377), the near field is predominantly magnetic. If the source has relatively high current and low voltage (i.e., E/H>377), the near field is predominantly electric. Some common examples of electric field predominant and magnetic field predominant signals are given below, using conventional vector notation:

Electric field predominant (Hertzian electric dipole):

$$\bar{E} = \frac{Z_o s}{4\pi c}\left[\frac{1}{r}\frac{di(t)}{dt}\frac{\bar{r}\times(\bar{r}\times\bar{s})}{sr^2} + \left(\frac{c}{r^2}i(t) + \frac{c^2}{r^3}\int i(t)dt\right)\left(\frac{\bar{r}\times(\bar{r}\times\bar{s})}{sr^2} + 2\frac{(\bar{s}\times\bar{r})\times\bar{r}}{sr^2}\right)\right]$$

$$\bar{H} = \frac{s}{4\pi c}\left[\frac{1}{r}\frac{di(t)}{dt} + \frac{c}{r^3}i(t)\right]\frac{\bar{s}\times\bar{r}}{sr}$$

Magnetic field predominant (Hertzian magnetic dipole):

$$\bar{E} = \frac{Z_o a}{4\pi c^2}\left[\frac{1}{r}\frac{d^2 i(t)}{dt^2} + \frac{c}{r^2}\frac{di(t)}{dt}\right]\frac{\bar{a}\times\bar{r}}{ar}$$

$$\bar{H} = \frac{a}{4\pi c^2}\left[\frac{1}{r}\frac{d^2 i(t)}{dt^2}\bar{r}\times\frac{(\bar{r}\times\bar{a})}{ar^2} + \left(\frac{c}{r^3}\frac{di(t)}{dt} + \frac{c^2}{r^3}i(t)\right)\left(\frac{\bar{r}\times(\bar{a}\times\bar{r})}{ar^2} + 2\frac{(\bar{a}\cdot\bar{r})\bar{r}}{ar^2}\right)\right]$$

A comparison of electric field predominant and magnetic field predominant wave impedance with respect to distance in $\lambda/2\pi$ is illustrated in FIG. 20. As shown in FIG. 20, both the wave impedance for an electric field (top trace) and a magnetic field (bottom trace) asymptotically approach free space impedance (377 Ohm) as the distance from the source increases.

The characteristic impedance $Z_O$ of a medium is defined as:

$$Z_o = \sqrt{\frac{j\omega\mu}{\sigma + j\omega\epsilon}}$$

where $\mu$ is the permeability of the medium ($4\pi \times 10^{-7}$ Henries/meter for free space), $\epsilon$ is the dielectric constant ($8.85 \times 10^{-12}$ Farads/meter for free space); $\sigma$ is the conductivity (5.82 Ohms/meter for copper). Typical values for the wave impedance are as follows:

Free space: $Z_O$=377 Ohms

Insulators:

$$Z_o = \sqrt{\frac{\mu}{\epsilon}},$$

because $\sigma << j\omega\epsilon$

Conductors:

$$|Z_o| = \sqrt{\frac{\omega\mu}{\sigma}}$$

(also called shield impedance), because $\sigma >> j\omega\epsilon$. Alternatively, the relative medium impedance for conductors may be expressed as:

$$|Z_s| = 3.68 \cdot 10^{-7}\sqrt{\frac{\mu_r}{\sigma_r}}\sqrt{f} \qquad (4)$$

where $\mu_r$ is the relative permeability and $\sigma_r$ is the relative conductivity with respect to copper.

The shielding effectiveness is defined as the ratio of reflected and incident radiation field expressed in dB. Two types of losses are encountered by an electromagnetic wave striking a metallic surface. The wave is partially reflected from the surface (reflection), and the non-reflected portion is attenuated as it passes through the medium (absorption). Absorption is the same for electric or magnetic field in the near field and far field. Reflection, on the other hand, is dependent on the type of field and the wave impedance. Reflection can be neglected in the case of plane waves (far field) or if the shield is thicker than a skin depth, as discussed more fully below.

When an electromagnetic wave passes through a medium, it is attenuated due to ohmic losses and heating of the material. This attenuation is exponential in nature, and governed by the following equations:

$$E_1 = E_0 e^{-x/\delta}$$

$$H_1 = H_0 e^{-x/\delta},$$

where x is the distance within the media and $\delta$ is the skin depth:

$$\delta = \sqrt{\frac{2}{\omega\mu\sigma}} \quad \text{in meters.}$$

Thus, the absorption loss through a single skin depth is 1/e, or 37%, or 9 dB. For example, the typical skin depth for gold at 10 MHz is 1 mm. As is well known in the art, the following equation is a useful approximation for the attenuation factor A:

$$A = 3.34x\sqrt{f\mu_r\sigma_r}\, dB, \quad (7)$$

with x in inches.

The reflection loss is related to the difference in characteristic impedance between the media. The intensity of the transmitted wave from a medium with impedance $Z_1$ and a medium with impedance $Z_2$ is given as:

$$E_1 = \frac{2Z_2}{Z_1 + Z_2} E_0 \quad (8)$$

$$H_t = \frac{2Z_1}{Z_1 + Z_2} H_0$$

When a wave passes through a shield, it encounters two boundaries: First, from impedance $Z_1$ to $Z_2$, and then from impedance $Z_2$ to $Z_1$. The transmitted wave, without considering multiple reflections, can therefore be expressed as:

$$E_t = \frac{4Z_1 Z_2}{Z_1 + Z_2} E_0$$

$$H_t = \frac{4Z_1 Z_2}{Z_1 + Z_2} H_0$$

If $Z_1 \gg Z_2$, the above equations collapse into the following simple relationships:

$$E_t = \frac{4Z_2}{Z_1} E_0$$

$$H_t = \frac{4Z_2}{Z_1} H_0$$

Substituting the values for the wave impedance $Z_w$ and the shield impedance $Z_s$, the reflection can be rewritten as:

$$R = 20\log\frac{|Z_w|}{4|Z_s|}\, dB. \quad (11)$$

In the case of a plane wave, the wave impedance equals the characteristic impedance of free space (377 Ohms), for both electric field predominant and magnetic field predominant signals. Therefore, in the far field the reflection becomes:

$$R = 20\log\frac{94.25}{|Z_s|}\, dB = 168 - 10\log\frac{f\mu_r}{\sigma_r}\, dB.$$

In the near field, however, the wave impedance is no longer determined by the characteristic impedance of the medium, but rather it is more dependent on the characteristic of the source antenna. If the source has high voltage and low current, the wave impedance is greater than 377 Ohms and the field is predominantly electric. If the source has high current and low voltage, the wave impedance is smaller than 377 Ohms, and the field is predominantly magnetic. Since the reflection loss is a function of the ratio between the wave impedance and the shield impedance, the reflection loss varies with the wave impedance. A high impedance (electric) field has higher reflection loss than a plane wave, while a low impedance (magnetic) field has lower reflection loss than a plane wave.

The wave impedance from a point source of electric field in near field is:

$$|Z_w|_e = \frac{1}{2\pi f \epsilon r}$$

where r is the distance of the source from the shield and $\epsilon$ is the dielectric constant. The reflection loss, according to equation (11) thus becomes:

$$R_e = 20\log\frac{1}{8\pi f \epsilon r |Z_s|}\, dB = 20\log\frac{4.5 \cdot 10^9}{f r |Z_s|}\, dB,$$

and, according to equation (4):

$$R_e = 322 - 10\log\frac{\mu_r f^3 r^2}{\sigma_r}. \quad (15)$$

Similarly, the wave impedance from a point source of magnetic field in near field is:

$$|Z_w|_m = 2\pi f \mu r,$$

where r is the distance of the source from the shield and $\mu$ is the permeability. The reflection loss, according to equation (11) becomes:

$$R_m = 20\log\frac{2\pi \mu r}{4|Z_s|}\, dB = 20\log\frac{1.9 \cdot 10^{-6} fr}{|Z_s|}\, dB,$$

and, according to equation (4):

$$R_m = 14.6 - 10\log\frac{\mu_r}{\sigma_r f r^2}. \quad (18)$$

Figure 21:
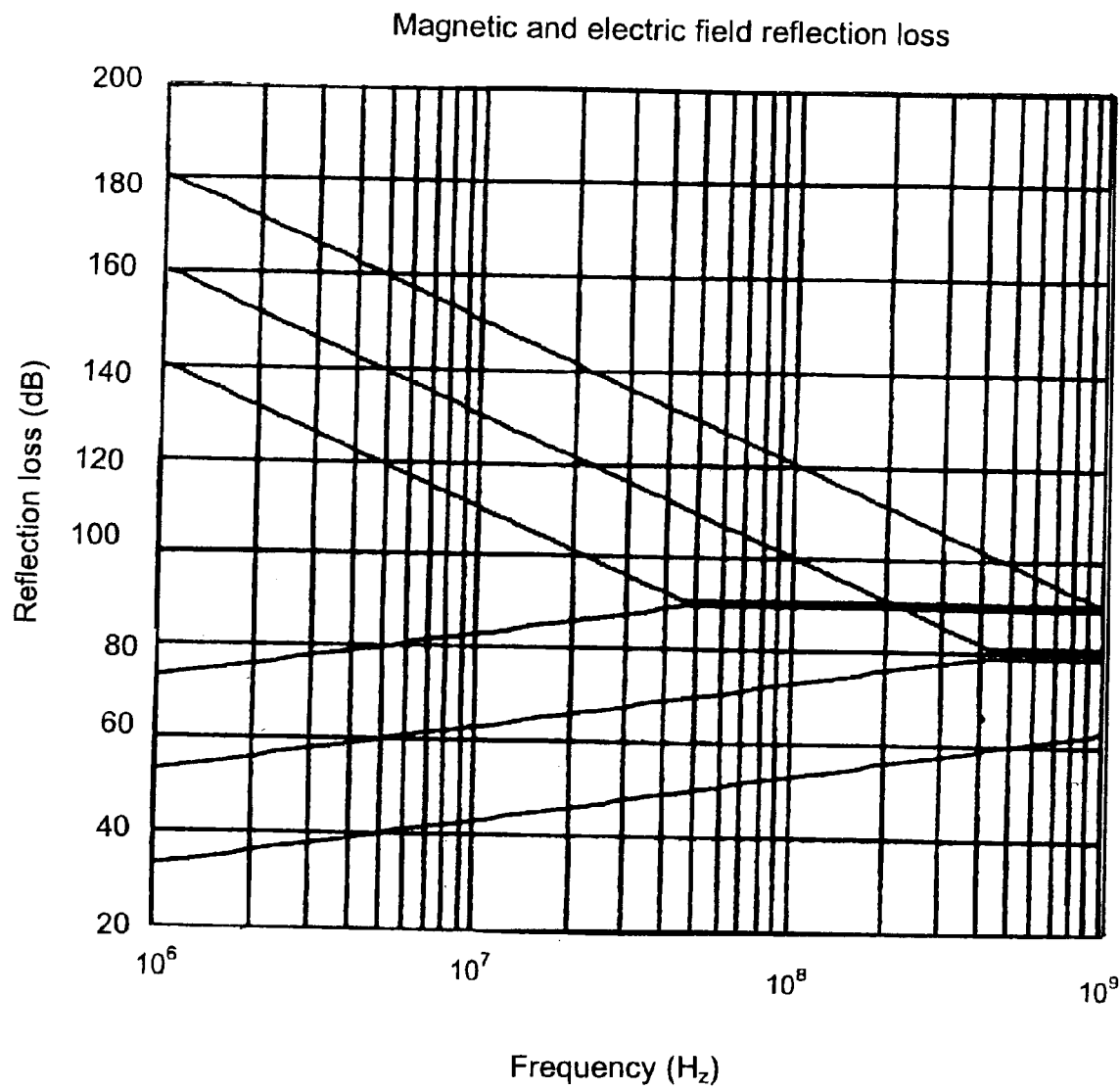
FIG. 21 is a graph that illustrates the reflection loss versus frequency for an electric field and a magnetic field for three different distances between source and shield in a shielded transmitter according to the present invention.

FIG. 21 illustrates the reflection loss versus frequency for an electric field (top to bottom) and a magnetic field (bottom to top) for three different distances between source and shield (0.01, 0.1 and 1 meter). As shown in FIG. 21, the greater the distance (0.01 to 1 meter) from the source, the more the lines get close to the center of the plot.

The ratio of electric field reflection to magnetic field reflection, shown in the separation between the lines in FIG. yy can be expressed, according to equations (15) and (18):

$$R_{em} = \frac{R_e}{R_m} = 307.4 - 10\log(f^4 r^r)\, dB. \quad (19)$$

If the shield is thin, the reflected wave from the second boundary is re-reflected off the first boundary, and then it returns to the second boundary to be reflected again. This effect can be neglected when the shield is thick, because the absorption is high, and by the time the wave reaches the second boundary it is of negligible amplitude.

For electric fields, most of the incident wave is reflected off the first boundary, as can be seen in equation pair (8), and because $Z_2 \ll Z_1$. Thus, multiple reflections can be neglected for electric fields.

For magnetic fields, most of the incident wave passes into the shield at the first boundary. Therefore, the effect of multiple reflections in the shield must be considered. The correction factor for the multiple reflection in a shield of thickness x and skin depth $\delta$ is:

$$B = 20\log(1 - e^{-x/\delta})\, dB.$$

Figure 22:
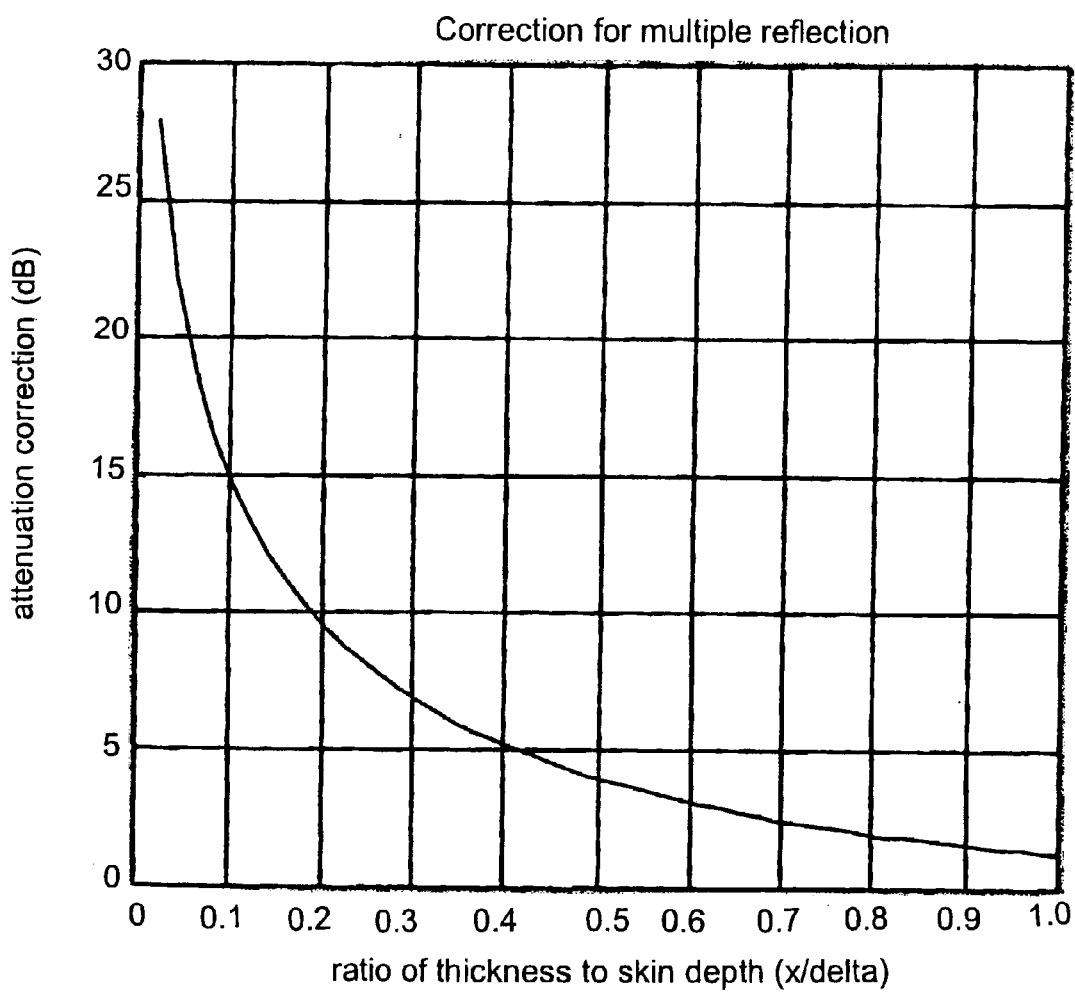
FIG. 22 is a graph that plots the correction factor in dB versus ratio of thickness to skin depth in a shielded transmitter according to the present invention.

This relationship is illustrated in FIG. 22, which plots the correction factor in dB versus ratio of thickness to skin depth.

In the following discussion, the attenuation produced to electric and magnetic fields by a gold shield 2 μm thick placed at 5 cm from a 10 MHz source is calculated. First, the absorption loss through 2 μm (=8×10$^{-5}$ inches=0.08 mils) of gold, calculated by equation (7) at 10 MHz is 8.84. Next, the electric field reflection loss, according to equation (15) is 156.47. Thus, the total electric field attenuation is 165.31.

The magnetic field reflection loss, according to equation (18) is 37.03. The correction due to multiple reflections, according to equation (19) is −35.99. Thus, the total magnetic field reflection loss is 9.88. Finally, the ratio of electric field attenuation to magnetic field attenuation is 155.43.

TABLE 5 provides additional design examples.

TABLE 5

| Thickness | Distance | Absorption | E Reflection | E Total | H Reflection | H Refl. Corrected | H | Total |
|---|---|---|---|---|---|---|---|---|
| 0.1 mm | 0.5 mm | 0.9 | 176 | 177 | 17 | 0 | .9 | 176 |
|  | 5 mm | 0.9 | 156 | 157 | 37 | 1 | 2 | 155 |
|  | 10 mm | 0.9 | 150 | 151 | 43 | 7 | 8 | 143 |
| 1 mm | 0.5 mm | 9 | 176 | 177 | 17 | 0 | 9 | 166 |
|  | 5 mm | 9 | 156 | 157 | 37 | 1 | 10 | 147 |
|  | 10 mm | 9 | 150 | 159 | 43 | 7 | 16 | 143 |

In conclusion, persons skilled in the art will appreciate that electric and magnetic fields are attenuated through a metallic shield because of reflection and absorption loss. While absorption loss is the same for electric or magnetic fields and for near field or far field emissions, the reflection loss is dependent on the type of field and on the wave impedance.

In the far field, both electric and magnetic fields form a plane wave. As a consequence, they experience the same absorption and reflection loss, and it is not possible to attenuate one component more than the other. In the near field, however, while the attenuation due to absorption loss is the same for electric and magnetic fields, the reflection loss is not the same. Thus, it is possible to attenuate the electric field more than the magnetic field with a metallic shield that is thinner than the skin depth.

VII. Industrial Applications

A. Wearable portable ("personal") systems with earpieces and belt unit
   1. Entertainment (CD or walkman type device) for music or other audio playback
      a) Stereo audio output from the walkman is connected to the input of the control unit
   2. Form of earpieces is varied
      a) One-way: earpiece, earrings, headset, hat
      b) Two-way: earmic, conventional mini-boom microphones
B. Two-tiered military applications
   1. Switchable Secure v. non-secure communications
   2. Minimize hardware at earpiece end
   3. Add bulk of hardware at control unit
      a) Encryption
C. Wireless extension of portable cellular or cordless telephones
   1. comply with local, AMPS, TDMA, GSM, CDMA, PCS
   2. "hands-free"
   3. cell phone worn on belt and coupled to control unit via an adapter cable
      a) could be integrated together
   4. invention is in HF (3 to 30 MHz) so will not interfere with any of the existing portable/cellular phone systems in the 47–50, 800–900, or 1800–1900 MHz
D. wireless extension to a portable organizer
E. enhanced pagers, including wrist watch
F. wireless LANs
G. Metricom radio modems
H. GPS
I. "smart cards" and debit cards
J. Variety of wireless control devices Accordingly, it will be appreciated that the system of the present invention provides an effective short range wireless communication system readily adapted to a variety of applications including (1) applications presently employing wireless communication techniques and (2) applications where cord coupling of the transmitter and receiver have typically been employed.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the claims as set forth below.

We claim:

1. A wireless communication system, comprising:
   a master control unit including a first control unit transmitter operating at a first carrier frequency and a control unit antenna system coupled to the first transmitter; and
   a slave unit including a first slave unit receiver operating at the first carrier frequency and a first slave unit antenna system coupled to the first slave unit receiver, wherein the control unit antenna system and the first slave unit antenna system are coupled inductively; and
   a second slave unit receiver operating at a second carrier frequency, wherein a spacing between the first carrier frequency and the second carrier frequency is approximately 200 kHz.

2. A wireless communication system, comprising:
   a master control unit including a first control unit transmitter operating at a first carrier frequency and a control unit antenna system coupled to the first transmitter; and
   a slave unit including a first slave unit receiver operating at the first carrier frequency and a first slave unit antenna system coupled to the first slave unit receiver, wherein the control unit antenna system and the first slave unit antenna system are coupled inductively;
   wherein the first slave unit receiver includes a diversity logic, and the first slave unit antenna system includes a first diversity antenna and a second diversity antenna, wherein the diversity logic processes signals received from the first diversity antenna and the second diversity antenna and provides a signal to the remainder of the first slave unit receiver in accordance with a diversity scheme; and a second slave unit receiver operating at a second carrier frequency, wherein a spacing between the first carrier frequency and the second carrier frequency is approximately 200 kHz.

3. A wireless communication system, comprising:

a master control unit including a first control unit transmitter operating at a first carrier frequency and a control unit antenna system coupled to the first transmitter; and a slave unit including a first slave unit receiver operating at the first carrier frequency and a first slave unit antenna system coupled to the first slave unit receiver, wherein the control unit antenna system and the first slave unit antenna system are coupled inductively;

wherein the first slave unit receiver includes a diversity logic, and the first slave unit antenna system includes a first diversity antenna, a second diversity antenna, and a third diversity antenna, wherein the diversity logic processes signals received from the first diversity antenna, the second diversity antenna, and the third diversity antenna and provides a signal to the remainder of the first slave unit receiver in accordance with a diversity scheme; and a second slave unit receiver operating at a second carrier frequency, wherein a spacing between the first carrier frequency and the second carrier frequency is approximately 200 kHz.

4. The wireless communication system of claim 3, wherein the diversity scheme selects the signal received from the first diversity antenna, the second diversity antenna, and the third diversity antenna that has the higher received signal strength indication (RSSI).

5. The wireless communication system of claim 3, wherein the diversity scheme processes the signals received from the first diversity antenna, the second diversity antenna, and the third diversity antenna and combines them in accordance with a predetermined weighting scheme.

6. The wireless communication system of claim 3, wherein the first diversity antenna, the second diversity antenna, and the third diversity antenna are oriented orthogonally to each other.

\* \* \* \* \*